(12) United States Patent
Mori et al.

(10) Patent No.: US 6,917,454 B2
(45) Date of Patent: Jul. 12, 2005

(54) HOLOGRAPHIC OPTICAL ELEMENT, POSITION SHIFT DETECTING APPARATUS, OPTICAL PICKUP APPARATUS, OPTICAL RECORDING MEDIUM DRIVE AND METHOD OF FABRICATING HOLOGRAPHIC OPTICAL ELEMENT

(75) Inventors: Kazushi Mori, Hirakata (JP); Mitsuaki Matsumoto, Osaka (JP); Koji Tominaga, Hirakata (JP); Atsushi Tajiri, Osaka (JP); Minoru Sawada, Yawata (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 10/237,170

(22) Filed: Sep. 9, 2002

(65) Prior Publication Data

US 2003/0067640 A1 Apr. 10, 2003

(30) Foreign Application Priority Data

Sep. 7, 2001 (JP) .......................... 2001-272667
Aug. 27, 2002 (JP) .......................... 2002-247634

(51) Int. Cl.$^7$ ................................................ G02B 5/32
(52) U.S. Cl. ..................... 359/15; 359/566; 369/112.07; 369/112.12
(58) Field of Search ................................ 359/565–566, 359/15; 369/112.06–112.07, 112.1–112.12, 112.15

(56) References Cited

U.S. PATENT DOCUMENTS

| 4,731,772 A | | 3/1988 | Lee | |
| 4,794,585 A | | 12/1988 | Lee | |
| 4,945,529 A | * | 7/1990 | Ono | 369/109 |
| 6,490,088 B1 | * | 12/2002 | Rosen | 359/558 |
| 2004/0160998 A1 | * | 8/2004 | Gruhlke et al. | 372/29.021 |

FOREIGN PATENT DOCUMENTS

| JP | 63-32743 | 2/1988 |
| JP | 3-76035 | 4/1991 |
| JP | 5-9821 | 2/1993 |
| JP | 5-9851 | 2/1993 |
| JP | 5-38374 | 6/1993 |

OTHER PUBLICATIONS

K. Tatsumi et al., "A Multi–Functional Reflection Type Grating Lens for the CD Optical Head", Proc. Int. Symp. On Optical Memory (Tokyo, Japan, 1987), Japanese Journal of Applied Physics, vol. 26, Suppl. 26–4 (1987).

J. Kedmi et al. "Optimized Holographic Optical Elements", Journal Optical Society of America, vol. 3, No. 12, pp. 2011–2018 (1986).

V. Soifer, ed., Methods for Computing Design of Diffractive Optical Elements (John Wiley & Sons, Inc., New York, 2002), pp. 27–35.

Patent Abstracts of Japan No. 63013134 dated Jan. 20, 1988/Corresponds to AE.

Patent Abstracts of Japan dated No. 58223866 dated Dec. 26, 1983/Corresponds to AF.

Patent Abstracts of Japan dated No. 01151022 dated Dec. 26, 1983/Corresponds to AG.

* cited by examiner

*Primary Examiner*—Leonidas Boutsikaris
(74) *Attorney, Agent, or Firm*—Westerman Hattori Daniels & Adrian, LLP

(57) ABSTRACT

In a holographic pattern provided in a holographic optical element, a pattern 1a twists a diffracted light beam in a clockwise direction, to form a semi-circular light spot Sa on photodetection parts A and B so as to extend over a dividing line LX in a four-segment photodetection part. A pattern 1b similarly twists the diffracted light beam in a clockwise direction, to form a semi-circular light spot Sb on photodetection parts C and D so as to extend over a dividing line LX in the four-segment photodetection part.

7 Claims, 27 Drawing Sheets

F I G. 1 2
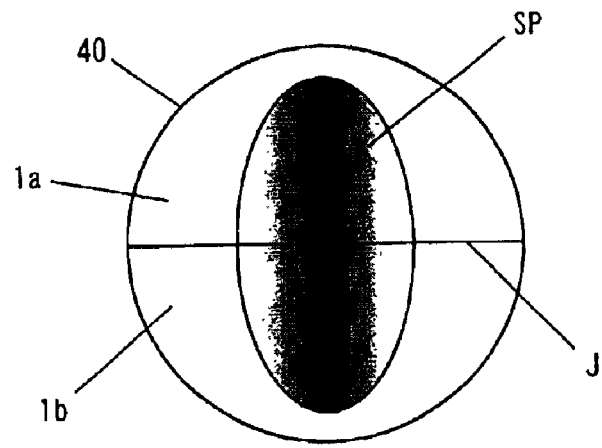
F I G. 1 3
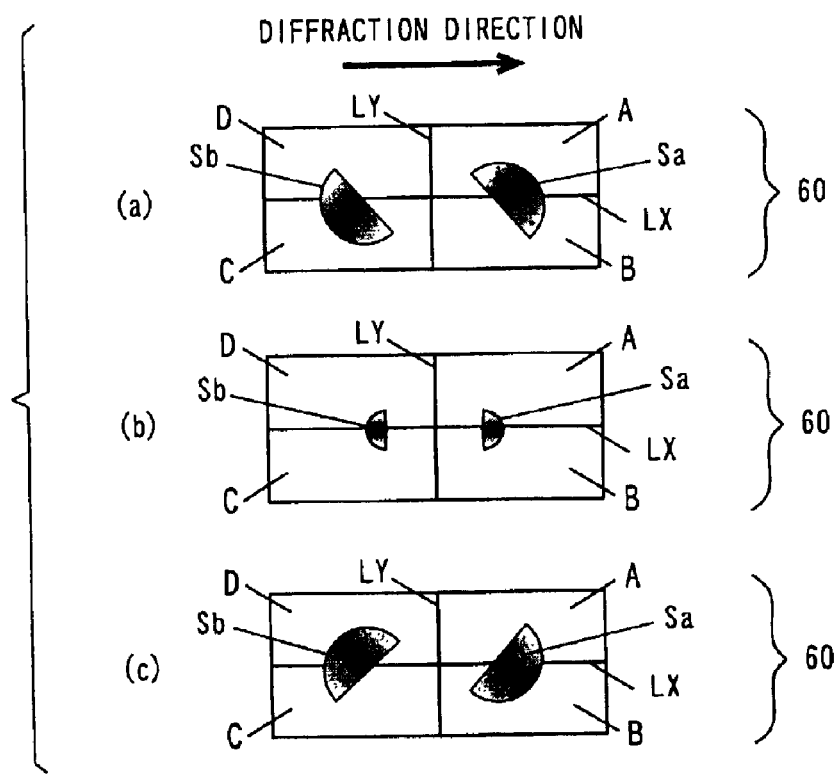

F I G. 3 9    PRIOR ART
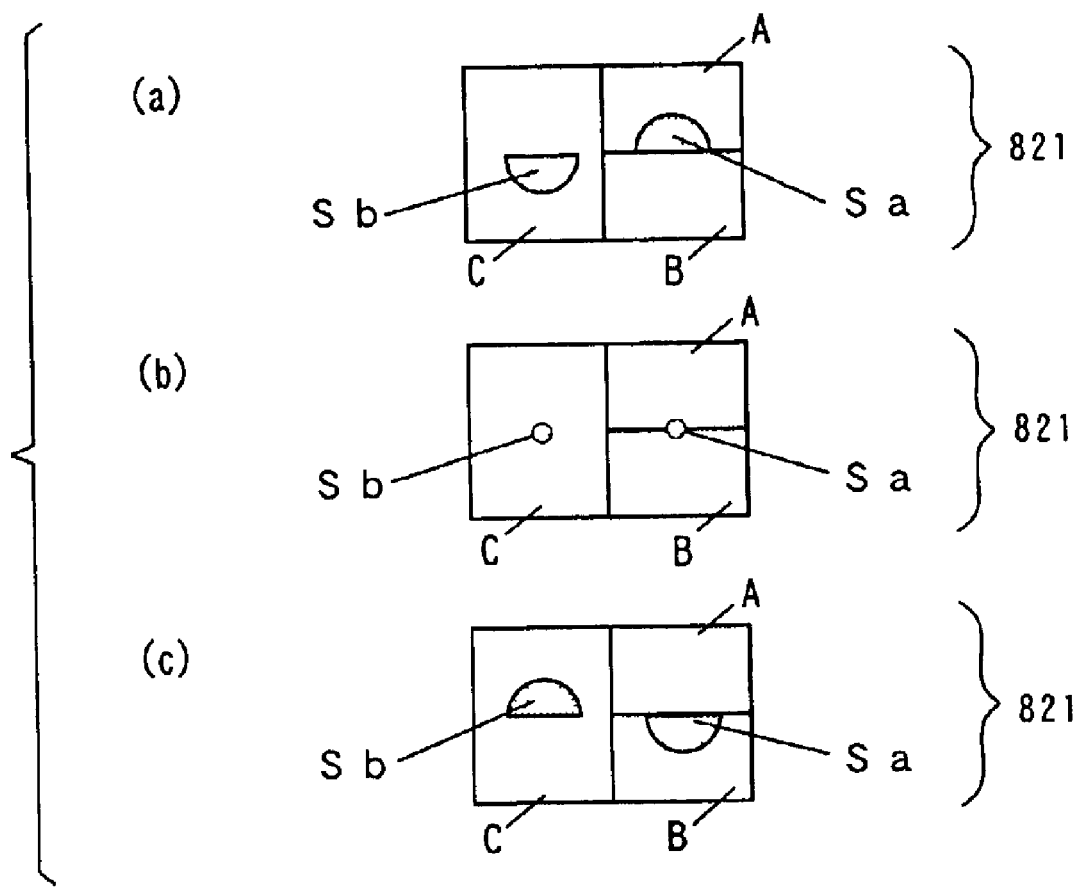

HOLOGRAPHIC OPTICAL ELEMENT, POSITION SHIFT DETECTING APPARATUS, OPTICAL PICKUP APPARATUS, OPTICAL RECORDING MEDIUM DRIVE AND METHOD OF FABRICATING HOLOGRAPHIC OPTICAL ELEMENT

BACKGROUND OF THE INVENTION

1. Field of the Invention

The present invention relates to a holographic optical element, a position shift detecting apparatus, an optical pickup apparatus, and an optical recording medium drive, and a method of fabricating the holographic optical element.

2. Description of the Background Art

An example of position shift detecting apparatuses is an optical pickup apparatus. The optical pickup apparatus is used as an optical recording medium drive such as an optical disk drive, and uses lasers to record and read information to and from an optical recording medium such as an optical disk or detect servo signals.

Examples of the servo signals are a focus error signal representing the focal shift of a light spot of the laser on the optical recording medium and a tracking error signal representing the shift of the light spot from a track on the optical recording medium. Focus errors are detected using the astigmatism method, the knife edge method which is one type of the Foucault method, or the like.

FIG. 32 is a schematic view of an optical pickup apparatus having a transmission-type holographic element disclosed in JP03-760355, A. An optical pickup apparatus 800 shown in FIG. 32 comprises a holographic unit 850 and an objective lens 807.

The optical pickup apparatus 800 has a mechanism for focus servo control according to the astigmatism method and tracking servo control according to the three-beam method. A holographic optical element 806 used herein, together with a large part of an optical pickup optical system, is formed into a unit in the holographic unit 850.

A heat sink block 804 is arranged on a stem 803, and a sub mount 802 is attached to a side surface of the heat sink block 804. A semiconductor laser device 801 is mounted on the sub mount 802. A photodetector 820 is arranged on an upper surface of the heat sink block 804. A cap 808 is provided to surround the heat sink block 804.

The holographic optical element 806 is arranged in an opening on an upper surface of the cap 808. A tracking beam generating diffraction grating 805 is provided on a lower surface of the holographic optical element 806, and a holographic pattern is formed on a holographic surface 810 on an upper surface of the holographic optical element 806.

In FIG. 32, the semiconductor laser device 801 emits a laser toward an optical disk 888. The laser emitted from the semiconductor laser device 801 is transmitted through the tracking beam generating diffraction grating 805 and the holographic optical element 806.

The laser which has been transmitted through the holographic optical element 806 is condensed on the optical disk 888 by the objective lens 807. The objective lens 807 is supported so as to be movable in a predetermined direction by an actuator 809 in order to perform a tracking operation and a focusing operation.

The optical disk 888 reflects the laser. A returned light beam (reflected light beam) which is the laser from the optical disk 888 is diffracted by a holographic pattern on the holographic surface 810, and is detected by the photodetector 820.

When the holographic optical element is used, as described above, an optical system can be formed into a unit by using the semiconductor laser device and the photodetector in a chip form, thereby making it possible to downsize the optical pickup apparatus.

FIG. 33 is a schematic view showing an example of the holographic pattern on the holographic surface 810 used in the optical pickup apparatus 800. In a holographic pattern 811, the holographic surface 810 is subjected to two types of holographic patterns 811a and 811b with a dividing line J as its boundary.

Photodetection by the photodetector 820 in a case where a diffracted light beam by the holographic optical element 806 is provided with astigmatism will be then described on the basis of FIG. 32, described above.

The holographic surface 810 shown in FIG. 32 is subjected to the holographic pattern 811 shown in FIG. 33. A representative of the optical pickup apparatus to which the astigmatism method is applied is disclosed in JP05-38374, B.

In the astigmatism method, the laser is emitted to the optical disk 888 from the semiconductor laser device 801, as described above, the laser reflected thereon is diffracted by the holographic pattern 811 formed on the holographic surface 810 of the holographic optical element 806, and its diffracted light beam impinges on the photodetector 820, whereby a signal recorded by the holographic pattern 811 is detected. Herein, astigmatism is generated in the diffracted light beam by the holographic pattern 811.

FIG. 34 is a schematic plan view showing an example of the shapes of light spots on four-segment photodetection parts in the photodetector 820 in a case where the astigmatism method is applied. The schematic plan view illustrates states in a case where the laser is out of focus on a recording medium surface of the optical disk 888 and a case where the laser is in focus when the laser impinges on the optical disk 888. Herein, the laser is out of focus on the recording medium surface of the optical disk 888, whereby the shapes of light spots based on diffracted light beams respectively incident on four-segment photodetection parts A, B, C, and D in the photodetector 820 are deformed.

In the four photodetection parts A, B, C, and D in the photodetector 820, a light spot Sa is formed by a holographic pattern 811a, and a light spot Sb is formed by a holographic pattern 811b. The shape of the light spot is deformed, as shown in FIGS. 34(a) to 34(c), by the distance between the optical disk 888 and the objective lens 807. A focus error signal FE is obtained on the basis of the light spots Sa and Sb formed on the photodetection parts A, B, C, and D.

Using respective output signals Pa, Pb, Pc, and Pd from the four-segment photodetection parts A, B, C, and D, the focus error signal FE is derived by the following equation:

$$FE=(Pa+Pc)-(Pb+Pd) \quad (1)$$

The focus error signal FE in the foregoing equation becomes positive when the distance between the optical disk 888 and the objective lens 807 is too short, and the shape of the light spot at this time is a shape shown in FIG. 34(a). When a good distance is maintained between the optical disk 888 and the objective lens 807, the focus error signal FE becomes zero, and the shape of the light spot at this time is a shape shown in FIG. 34(b). Further, the focus error signal FE becomes negative when the distance between the optical disk 888 and the objective lens 807 is too long, and the shape of the light spot is a shape shown in FIG. 34(c).

The focus error signal FE thus obtained is inputted to the actuator 809. The actuator 809 moves the objective lens 807 in the direction of the optical axis, that is, in a direction perpendicular to the recording medium surface of the optical disk 888 on the basis of the focus error signal FE, thereby correcting a condensed state.

FIG. 35 is a schematic view for explaining the principle of the astigmatism method. In the optical pickup apparatus 800, when the laser incident on the recording medium surface of the optical disk 888 is out of focus, the focal point of a reflected light beam which has been reflected from the optical disk 888 and condensed again by the objective lens 807 is shifted in the direction of the optical axis S. That is, the focal point of a diffracted light beam which has been diffracted by the holographic pattern 811 is moved in a direction P.

The focal point of the diffracted light beam having astigmatism differs between a direction Xx having an angle of 45 to the diffraction direction X and a direction Xy perpendicular to the direction Xx. Therefore, the shape of a light spot is an ellipse extending in the Xy direction at a focal point position FA in the Xx direction and an ellipse extending in the Xx direction at a focal point position FC in the Xy direction. The shape of the light spot is a circle at a position FB intermediate between the focal point position FA and the focal point position FC. Consequently, the photodetector 820 is arranged inside a focus error detection range Pf, thereby obtaining the deformation of the light spot as shown in FIG. 34.

In the astigmatism method, the light spot is greatly deformed with respect to the focal shift, so that the detection sensitivity of focus errors is high. On the other hand, however, the disadvantage of a focus error signal being unstable when the light spot on the optical disk crosses a track has been pointed out.

The cause of the above-mentioned disadvantage will be described below.

FIG. 36 is a diagram showing how the intensity distribution of a reflected light beam on a recording medium surface. The intensity distribution of the reflected light beam changes depending on the relative position among a pre-groove 881b formed on the recording medium surface, a raised land part 881a, and a light spot. In a recordable optical disk such as a CD-R (Compact Disc Recordable), a pre-groove 881b is formed on a recording medium surface, and information is recorded on a land part 881a.

The intensity distribution F of the reflected light beam is determined due to the diffracting effect by an edge of the land part 881a (or the pre-groove 881b). When a light spot of a laser is positioned at the center of the land part 881a (or the pre-groove 881b), a symmetrical, double-humped intensity distribution F shown in FIG. 36(b) is obtained. At this time, the laser is in focus on a surface of an optical disk.

On the other hand, when the light spot of the laser is shifted in either direction relative to the land part 881a (or the pre-groove 881b), an asymmetrical, double-humped intensity distribution shown in FIG. 36(a) or FIG. 36(c) is obtained depending on the direction of the shift.

This phenomenon is used for detecting a tracking error signal according to the push-pull method. The above-mentioned double-humped intensity distribution clearly appears in a far-field pattern.

In the astigmatism method, the light spot on the photodetector is large, and is near to the far-field pattern, so that it is easily affected by the double-humped intensity distribution. According to an operation of the focus error signal FE expressed by the equation (1), the effect of the double-humped intensity distribution is canceled.

In the astigmatism method, however, a light spot obtained after the laser is converged once, as shown in FIG. 35 (FIG. 35 (FA)) is detected. Therefore, the light intensity distribution changes due to the diffracting effect and the interfering effect at a convergent point, so that the effect of the double-humped intensity distribution is not canceled.

The instability of the focus error signal in the astigmatism method is considered to occur from these reasons.

The detection of focus errors in an optical pickup apparatus using the knife edge method will be then described.

The principle of the knife edge method will be described using FIGS. 37 and 38.

FIG. 37 is a schematic view for explaining the principle of the knife edge method, and FIG. 38 is a schematic view showing respective changes in the shapes of light spots condensed on two-segment photodetection parts by the knife edge method.

In FIG. 37(a), a light beam 901 is converged by a lens 900 into a focal point 902. Herein, a shielding plate 903 is arranged for the half of a region of the light beam 901, as shown in FIG. 37(b). In this case, only the half of the light beam 901 is shielded by the shielding plate 903. The state of a light beam partly shielded by an object is referred to as "shading". The "shading" causes only the half of the light beam 901 to converge into the focal point 902.

A two-segment photodetector 905 is arranged at the focal point 902. Herein, the position of the photodetector 905 is adjusted such that a light spot 920 is formed on a dividing line E between photodetection parts 910A and 910B in the two-segment photodetector 905, as shown in FIG. 38(b).

When the two-segment photodetector 905 is positioned at the focal point 902, the light spot 920 is brought into a small dot shape, as shown in FIG. 38(b). When the two-segment photodetector 905 is at a position nearer from the lens 900 than the focal point 902, a semi-circular light spot 920 is formed on the photodetection part 910B in the two-segment photodetector 905, as shown in FIG. 38(c).

When the two-segment photodetector 905 is at a position farther from the lens 900 than the focal point 902, a semi-circular light spot 920a is formed on the photodetection part 910A in the two-segment photodetector 905, as shown in FIG. 38(a).

The light spots 920a and 920b respectively formed on the photodetection parts 910A and 910B in the two-segment photodetector 905 are point-symmetric between a case where the two-segment photodetector 905 is at a position farther from the lens 900 than the focal point 902 and a case where the two-segment photodetector 905 is at a position nearer to the lens 900 than the focal point 902. Therefore, using output signals fa and fb from the photodetection parts 910A and 910B, a focus error signal FES can be found by the following equation:

$$FES = fa - fb \qquad (2)$$

It can be detected whether the two-segment photodetector 905 is positioned nearer or farther from the lens than the focal point 902 depending on whether the sign of the focus error signal FES is positive or negative.

The above-mentioned knife edge method is a method of detecting focus errors with high sensitivity. However, the shape of a light spot in a focused state is small, so that intensive losses due to the dividing line E in the two-segment photodetector 905 are large. Accordingly, some problems occur. For example, the intensity of a reproduction signal (a pit signal) is reduced, or initial alignment is difficult to adjust.

As a measure taken against the above-mentioned problems in the knife edge method, a three-segment photodetector 821 as shown in FIG. 39 has been devised, as disclosed in JP05-9821, B, etc.

FIG. 39 is a schematic plan view showing an example of the shape of a light spot on a three-segment photodetector in a case where the knife edge method is applied thereto. FIG. 39 illustrates the deformation of the light spot impinging on photodetection parts A, B, and C in the three-segment photodetector 821 in a case where the light spot is in focus on a recording medium surface and a case where it is out of focus when the knife edge method is used.

The holographic optical element in this case has the function of diffracting a reflected light beam to condense the diffracted light beam. Therefore, a holographic pattern is divided into two parts, and the two parts are respectively condensed on different points, whereby light spots which are respectively condensed in a semi-circular shape are formed when they are out of focus.

Light spots Sa and Sb on the photodetection parts A, B, and C at this time are respectively in semi-circular shapes as shown in FIGS. 39(a) and 39(c) when they are out of focus.

The light spot Sa is formed on the photodetection part A, as shown in FIG. 39(a), when the optical disk is too near, while being formed on the photodetection part B, as shown in FIG. 39(c), when the optical disk is too far. The light spots Sa and Sb in a case where they are in focus are concentrated on one point, as shown in FIG. 39(b).

A focus error signal FEN expressed by the following equation is obtained using, out of signals PA, PB, and PC outputted from the photodetection parts A, B, and C, the output signals PA and PB:

$$FEN=PA-PB \quad (3)$$

Furthermore, using the output signals PA, PB, and PC from the photodetection parts A, B, and C, a reproduction signal HF is found by the following equation:

$$HP=PA+PB+PC \quad (4)$$

In order to stably detect the reproduction signal, the one light spot Sb is mainly detected by the photodetection part C having no dividing line, and focus errors are detected at the other light spot Sa. Although the knife edge method itself is a method of detecting focus errors with high sensitivity, only the half of a light beam is used, so that the intensity of a focus error signal (S-curve amplitude) is low.

As described in the foregoing, in the astigmatism method, the light intensity distribution changes due to the diffracting effect and the interfering effect at a convergent point of light, so that the double-humped intensity distribution is not canceled. Consequently, the focus error signal becomes unstable.

Furthermore, the size of the light spot on the photodetector is uniquely determined by the focus error detection range Pf, as shown in FIG. 35. Accordingly, the size of the light spot cannot be arbitrarily set. Therefore, it is impossible to obtain a focus error signal and a reproduction signal which are sufficiently stable.

On the other hand, in the knife edge method, the size of the light spot on the photodetector in a focused state is small. Accordingly, the intensity of the reproduction signal is low, and the alignment is difficult.

Furthermore, even when a three-segment photodetector is used in order to stably detect the reproduction signal, the focus error signal is detected by the one light spot. Accordingly, the intensity of the focus error signal is low.

SUMMARY OF THE INVENTION

An object of the present invention is to provide a holographic optical element having a complicated function of diffracting an incident light beam.

Another object of the present invention is to provide a method of fabricating a holographic optical element, in which a holographic pattern having a complicated function of diffracting an incident light beam can be easily designed.

Still another object of the present invention is to provide a position shift detecting apparatus capable of arbitrarily setting the size of a light spot on a photodetector as well as stably detecting the shift in position.

A further object of the present invention is to provide an optical pickup apparatus capable of arbitrarily setting the size of a light spot on a photodetector as well as stably obtaining a focus error signal and a reproduction signal.

A still further object of the present invention is to provide an optical recording medium drive capable of arbitrarily setting the size of a light spot on a photodetector as well as stably obtaining a focus error signal and a reproduction signal.

A holographic optical element according to an aspect of the present invention comprises a diffraction surface that diffracts an incident light beam, the diffraction surface having in at least its part a holographic pattern having the function of twisting the diffracted light beam using the optical axis of the diffracted light beam as an axis of rotation.

In the holographic optical element according to the present invention, the incident light beam is diffracted by the diffraction surface, and is twisted using the optical axis of the diffracted light beam as the axis of rotation. In this case, when the twisted diffracted light beam impinges on a predetermined detection surface, a light spot on the detection surface is rotated relative to a light spot on the diffraction surface. The degree of rotation of the light spot on the detection surface changes depending on the distance from the diffraction surface to the detection surface. Consequently, focus errors in an optical pickup apparatus can be detected on the basis of the degree of rotation of the light spot on the detection surface.

In this case, there is no convergent point of the diffracted light beam short of a photodetector, resulting in no change in light intensity distribution due to the diffracting effect and the interfering effect of light at the convergent point as in the astigmatism method. Further, when the focus errors are detected using the twisting of the diffracted light beam, it is possible to arbitrarily set the size of the light spot on the detection surface. When the holographic optical element according to the present invention is used for the optical pickup apparatus, therefore, the size of the light spot on the detection surface is set to a large value, thereby making it possible to obtain a focus error signal and a reproduction signal which are sufficiently stable and are high in intensity.

The diffraction surface may be divided into a plurality of regions, at least one of the plurality of regions having the holographic pattern having the function of twisting the diffracted light beam.

In this case, the diffracted light beam impinges on a predetermined detection surface upon being twisted by at least one of the plurality of regions. Consequently, it is possible to detect the focus errors in the optical pickup apparatus on the basis of the degree of rotation of the light spot on the detection surface.

The diffraction surface may be divided into a first region and a second region, at least one of the first and second regions having the holographic pattern having the function of twisting the diffracted light beam.

When the light beam has an approximately circular cross-sectional shape, the light beam is caused to impinge on the diffraction surface so as to extend over a dividing line between the first and second regions in the diffraction surface, thereby forming on the detection surface an approximately semi-circular light spot by the first region and an approximately semi-circular light spot by the second region. In this case, it is possible to easily judge the degree of rotation of the approximately semi-circular light spot by the holographic pattern having the function of twisting the diffracted light beam in one of the first and second regions.

The first region may have a first holographic pattern having the function of twisting the diffracted light beam in one direction using the optical axis of the diffracted light beam as an axis of rotation, and the second region may have a second holographic pattern having the function of twisting the diffracted light beam in the one direction using the optical axis of the diffracted light beam as an axis of rotation.

In this case, the respective approximately semi-circular light spots by the first and second holographic patterns are rotated in the same direction on the detection surface.

The first region may have a first holographic pattern having the function of twisting the diffracted light beam in a clockwise direction using the optical axis of the diffracted light beam as an axis of rotation, and the second region may have a second holographic pattern having the function of twisting the diffracted light beam in a counterclockwise direction using the optical axis of the diffracted light beam as an axis of rotation.

In this case, the respective approximately semi-circular light spots by the first and second holographic patterns are rotated in opposite directions on the detection surface.

When the diffraction surface is defined by XY-coordinates comprising the X-axis and the Y-axis which are orthogonal to each other, and letting $(X_0, Y_0)$ be a point to be a basis on the diffraction surface, $(X, Y)$ be an arbitrary point on the diffraction surface, $f(X, Y)$ be an X-direction component of a grating vector for performing predetermined diffraction at the point $(X, Y)$ on the diffraction surface, and $g(X, Y)$ be a Y-direction component of the grating vector, the holographic pattern may be represented by a set of points $(X', Y')$ satisfying the following equation:

$$\int_{X_0}^{X'} f(X, Y_0) dX + \int_{Y_0}^{Y'} g(X', Y) dY = 2\pi M + C \quad (19)$$

or $$\int_{Y_0}^{Y'} g(X_0, Y) dY + \int_{X_0}^{X'} f(X, Y') dX = 2\pi M + C \quad (20)$$

When a Z-axis coordinate perpendicular to the diffraction surface is defined at the origin of the XY-coordinates, and letting $(X, Y, 0)$ be an arbitrary point on the diffraction surface, $(Xp(X, Y), Yp(X, Y), Zp)$ be a point on a predetermined detection surface on which a diffracted light beam diffracted by the diffraction surface impinges, $(Xr, Yr, Zr)$ be the coordinates of a light emitting point of a light source for emitting a light beam to the diffraction surface, $\lambda$ be the wavelength of the light beam, and n be the refractive index of a substrate including the holographic pattern, the X-direction component $f(X, Y)$ and the Y-direction component $g(X, Y)$ of the grating vector for performing predetermined diffraction at the point $(X, Y, 0)$ on the diffraction surface may be respectively set so as to satisfy the following equations:

$$f(X, Y) = -(2\pi/\lambda) \cdot [(X - Xp(X, Y)) \cdot \quad (16)$$
$$\{(X - Xp(X, Y))^2 + (Y - Yp(X, Y))^2 + Zp^2\}^{-1/2} -$$
$$n(X - Xr) \cdot \{(X - Xr)^2 + (Y - Yr)^2 + Zr^2\}^{-1/2}]$$

$$g(X, Y) = -(2\pi/\lambda) \cdot [(Y - Yp(X, Y)) \cdot \{(X - Xp(X, Y))^2 + \quad (17)$$
$$(Y - Yp(X, Y))^2 + Zp^2\}^{-1/2} -$$
$$n(Y - Yr) \cdot \{(X - Xr)^2 + (Y - Yr)^2 + Zr^2\}^{-1/2}]$$

When the ratio of the size of a light spot on the detection surface to the size of a light spot on the diffraction surface is taken as a reduction ratio R, a point $(Xp, Yp)$ on the detection surface obtained by moving the light beam impinging on the arbitrary point $(X, Y)$ on the diffraction surface by $x_1$ in the X-axis direction and moving the light beam by $y_1$ in the Y-axis direction, and rotating the light beam by an angle of $\beta$ centered at a point $(x_1, y_1)$ may be set so as to satisfy the following equations:

$$Xp(X,Y) = R(X^2+Y^2)^{1/2} \cos[\arctan(Y/X)+\beta]+x_1 \quad (21)$$

$$Yp(X,Y) = R(X^2+Y^2)^{1/2} \sin[\arctan(Y/X)+\beta]+y_1 \quad (22)$$

The diffraction surface has the holographic pattern designed on the basis of the foregoing equations, whereby diffracting functions "twisting", "condensing", and "translating" are added to the diffracted light beam.

A position shift detecting apparatus according to another aspect of the present invention is a position shift detecting apparatus that irradiates an object to be detected with a light beam and detects a returned light beam from the object to be detected, which comprises a light source that emits the light beam; a holographic optical element comprising a diffraction surface for diffracting the returned light beam from the object to be detected; and a photodetector that detects the returned light beam diffracted by the holographic optical element, the diffraction surface of the holographic optical element having in at least its part a holographic pattern having the function of twisting the diffracted light beam using the optical axis of the diffracted light beam as an axis of rotation, and a light spot based on the twisted diffracted light beam being formed on the photodetector.

In the position shift detecting apparatus according to the present invention, the light beam is emitted by the light source, the returned light beam from the object to be detected is diffracted by the diffraction surface of the holographic optical element, and the diffracted light beam is detected by the photodetector. Herein, the diffracted light beam impinges on the photodetector upon being twisted using the optical axis of the diffracted light beam as the axis of rotation by the holographic pattern in at least a part of the diffraction surface of the holographic optical element.

In this case, when the twisted diffracted light beam impinges on the photodetector, the light spot on the photodetector is rotated relative to the light spot on the diffraction surface. The degree of rotation of the light spot on the photodetector changes depending on the distance from the diffraction surface to the photodetector. Consequently, it is possible to detect the shift in the position in the position shift detecting apparatus on the basis of the degree of rotation of the light spot on the photodetector.

Consequently, there is no convergent point of the diffracted light beam short of the photodetector, resulting in no change in light intensity distribution due to the diffracting effect and the interfering effect of light at the convergent point as in the astigmatism method. Further, when the shift in the position is detected using the twisting of the diffracted light beam, it is possible to arbitrary set the size of the light spot on the photodetector. Consequently, the size of the light spot on the photodetector is set to a large value, thereby making it possible to sufficiently stably detect the shift in the position.

The photodetector may have a plurality of photodetection parts divided by a dividing line or dividing lines, and the holographic pattern having the function of twisting the diffracted light beam in the holographic optical element may form the light spot based on the twisted diffracted light beam so as to extend over the dividing line in the photodetector.

In this case, the light spot based on the twisted diffracted light beam is formed in the plurality of photodetection parts so as to extend over the dividing line in the photodetection part. Accordingly, it is possible to detect the degree of rotation of the light spot by comparing output signals from the plurality of photodetection parts.

The diffraction surface of the holographic optical element may be divided into a plurality of regions, at least one of the plurality of regions having the holographic pattern. The plurality of regions in the diffraction surface of the holographic optical element may form a plurality of light spots based on the diffracted light beam at positions spaced apart from each other on the photodetector, and the holographic pattern of at least one of the regions may form the light spot based on the twisted diffracted light beam so as to extend over the dividing line in the photodetector.

In this case, the plurality of light spots based on the diffracted light beam by the plurality of regions in the diffraction surface of the holographic optical element are formed at positions spaced apart from each other on the photodetector so as to extend over the dividing line or lines in the photodetector, and the diffracted light beam impinges on the photodetector upon being twisted by at least one of the plurality of regions.

Consequently, the light spots based on the twisted diffraction light beam are formed so as to extend over the dividing line or lines in the photodetector and spaced apart from each other on the photodetector. Accordingly, it is possible to more accurately detect the degree of rotation of the light spot by comparing output signals from the plurality of photodetection parts.

The diffraction surface of the holographic optical element may be divided into a first region and a second region, at least one of the first and second regions having the holographic pattern. The first and second regions in the diffraction surface of the holographic optical element may form first and second light spots based on the diffracted light beam at positions spaced apart from each other on the photodetector, and the holographic pattern of at least one of the regions may form the light spot based on the twisted diffracted light beam so as to extend over the dividing line in the photodetector.

When the light beam has an approximately circular cross-sectional shape, the light beam is caused to impinge on the diffraction surface so as to extend over the dividing line between the first and second regions in the diffraction surface, thereby forming on the photodetector an approximately semi-circular light spot by the first region and an approximately semi-circular light spot by the second region. In this case, it is possible to easily judge the degree of rotation of the approximately semi-circular light spot by the holographic pattern having the function of twisting the diffracted light beam in one of the first and second regions.

An optical recording medium drive according to still another aspect of the present invention comprises a rotation driving unit that rotates an optical recording medium; an optical pickup apparatus including a position shift detecting apparatus; an objective lens that condenses a light beam emitted from the optical pickup apparatus on the optical recording medium; a pickup driving unit that moves the optical pickup apparatus in the radial direction of the optical recording medium; a lens driving unit that moves the objective lens relative to an object to be detected; and a signal processing unit that processes an output signal from a photodetector in the optical pickup apparatus, the position shift detecting apparatus comprising a light source that emits a light beam, a holographic optical element comprising a diffraction surface for diffracting a returned light beam from the object to be detected, and a photodetector that detects the returned light beam diffracted by the holographic optical element, the holographic optical element having in at least its part a holographic pattern having the function of twisting the diffracted light beam using the optical axis of the diffracted light beam as an axis of rotation, and forming a light spot based on the twisted diffracted light beam on the photodetector.

In the optical recording medium drive according to the present invention, the optical recording medium is rotated by the rotating driving unit, the light beam emitted from the optical pickup apparatus is condensed on the optical recording medium by the objective lens, the optical pickup apparatus is moved in the radial direction of the optical recording medium by the pickup driving unit, the objective lens is moved relative to the object to be detected by the lens driving unit, and the output signal from the photodetector in the optical pickup apparatus is processed by the signal processing unit.

In this case, the above-mentioned optical pickup apparatus is used, thereby making it possible to obtain a focus error signal and a reproduction signal which are sufficiently stable and are high in intensity by setting the size of the light spot on the photodetector to a large value.

A method of fabricating a holographic optical element according to a further aspect of the present invention is a method of fabricating a holographic optical element comprising a diffraction surface having in at least its part a holographic pattern for diffracting an incident light beam, which comprises the step of representing, when the diffraction surface is defined by XY-coordinates comprising the X-axis and the Y-axis which are orthogonal to each other, and letting $(X_0, Y_0)$ be a point to be a basis on the diffraction surface, $(X, Y)$ be an arbitrary point on the diffraction surface, $f(X, Y)$ be an X-direction component of a grating vector for performing predetermined diffraction at the point $(X, Y)$ on the diffraction surface, and $g(X, Y)$ be a Y-direction component of the grating vector, the holographic pattern by a set of points $(X', Y')$ satisfying the following equation:

$$\int_{X_0}^{X'} f(X, Y_0)dX + \int_{Y_0}^{Y'} g(X', Y)dY = 2\pi M + C \tag{19}$$

or $$\int_{Y_0}^{Y'} g(X_0, Y)dY + \int_{X_0}^{X'} f(X, Y')dX = 2\pi M + C, \tag{20}$$

setting, when a Z-axis coordinate perpendicular to the diffraction surface is defined by the origin of the XY-coordinates, and letting $(X, Y, 0)$ be an arbitrary point on the diffraction surface, $(Xp(X, Y), Yp(X, Y), Zp)$ be a point on a predetermined detection surface on which a diffracted light beam diffracted by the diffraction surface impinges, (Xr, Yr, Zr) be the coordinates of a luminescent point of a light source for emitting a light beam to the diffraction surface, λ be the wavelength of the light beam, and n be the refractive index of a substrate including the holographic pattern, the X-direction component f (X, Y) and the Y-direction component g (X, Y) of the grating vector for performing predetermined diffraction at the point (X, Y, 0) on the diffraction surface, respectively, so as to satisfy the following equations:

$$f(X, Y) = -(2\pi/\lambda) \cdot [(X - Xp(X, Y)) \cdot \qquad (16)$$
$$\{(X - Xp(X, Y))^2 + (Y - Yp(X, Y))^2 + Zp^2\}^{-1/2} -$$
$$n(X - Xr) \cdot \{(X - Xr)^2 + (Y - Yr)^2 + Zr^2\}^{-1/2}]$$

$$g(X, Y) = -(2\pi/\lambda) \cdot [(Y - Yp(X, Y)) \cdot \{(X - Xp(X, Y))^2 + \qquad (17)$$
$$(Y - Yp(X, Y))^2 + Zp^2\}^{-1/2} -$$
$$n(Y - Yr) \cdot \{(X - Xr)^2 + (Y - Yr)^2 + Zr^2\}^{-1/2}];$$

and the step of forming the holographic pattern set by the equations (16), (17), (19), and (20) on the diffraction surface by a photolithographic process and an etching process.

The holographic pattern is designed on the basis of the foregoing equations, thereby making it possible to easily form on the diffraction surface a holographic pattern for providing the diffracted light beam with complicated diffraction.

The method may comprise the step of setting, when the ratio of the size of a light spot on the detection surface to the size of a light spot on the diffraction surface is taken as a reduction ratio R, and such diffraction that the light beam impinging on the arbitrary point (X, Y) on the diffraction surface is moved by $x_1$ in the X-axis direction and by $y_1$ in the Y-axis direction, and is rotated through an angle of β centered at the point $(x_1, y_1)$ is performed, the holographic pattern such that a point (Xp, Yp) on the detection surface obtained by the diffraction satisfies the following equations:

$$Xp(X,Y) = R(X^2+Y^2)^{1/2} \cos[\arctan(Y/X)+\beta]+x_1 \qquad (21)$$

$$Yp(X,Y) = R(X^2+Y^2)^{1/2} \sin[\arctan(Y/X)+\beta]+y_1 \qquad (22)$$

The holographic pattern is designed on the basis of the foregoing equations, thereby making it possible to easily form on the diffraction surface a holographic pattern for providing the diffracted light beam with complicated diffraction including "twisting", "condensing", and "translating".

The method may comprise the step of setting, when the ratio of the size of a light spot on the detection surface to the size of a light spot on the diffraction surface is taken as a reduction ratio R, and such diffraction that the light beam impinging on the arbitrary point (X, Y) on the diffraction surface is moved by $x_1$ in the X-axis direction and by $y_1$ in the Y-axis direction, is inverted with respect to a straight line parallel to the X-axis passing through the point $(x_1, y_1)$, and is further rotated through an angle of 2α a centered at the point $(x_1, y_1)$ is performed, the holographic pattern such that a point (Xp, Yp) on the detection surface obtained by the diffraction satisfies the following equations:

$$Xp(X,Y) = R(X \cos 2\alpha + Y \sin 2\alpha) + x_1 \qquad (23)$$

$$Yp(X,Y) = R(X \sin 2\alpha - Y \cos 2\alpha) + y_1 \qquad (24)$$

The holographic pattern is designed on the basis of the foregoing equations, thereby making it possible to easily form on the diffraction surface a holographic pattern for providing the diffracted light beam with complicated diffraction including "twisting", "condensing", and "translating".

The method may comprise the step of setting, when the ratio of the size of a light spot on the detection surface to the size of a light spot on the diffraction surface is taken as a reduction ratio R, and an angle which a straight line connecting the arbitrary point (X, Y) and the origin on the diffraction surface makes with the X-axis is taken as θ, and such diffraction that the light beam impinging on the arbitrary point (X, Y) on the diffraction surface is moved by $x_1$ in the X-axis direction and by $y_1$ in the Y-axis direction, and is moved, on a straight line connecting a point $(X+x_1, Y+y_1)$ and the point $(x_1, y_1)$, to a position spaced $r_1$ apart from the point $(x_1, y_1)$ is performed, the holographic pattern such that a point (Xp, Yp) on the detection surface obtained by the diffraction satisfies the following equations:

$$Xp(Y,X) = r_1 \cos\theta + x_1 \qquad (25)$$

$$Yp(X,Y) = r_1 \sin\theta + y_1 \qquad (26)$$

The holographic pattern is designed on the basis of the foregoing equations, thereby making it possible to easily form on the diffraction surface a holographic pattern for providing the diffracted light beam with complicated diffraction including "twisting", "condensing", and "translating".

An optical pickup apparatus according to a still further aspect of the present invention is an optical pickup apparatus that irradiates an optical recording medium with a light beam and detects a returned light beam from the optical recording medium, which comprises a light source that emits the light beam; a holographic optical element comprising a diffraction surface for diffracting the returned light beam from the optical recording medium; and a photodetector that detects the returned light beam diffracted by the holographic optical element, the diffraction surface of the holographic optical element having in at least its part a holographic pattern having the function of twisting the diffracted light beam using the optical axis of the diffracted light beam as an axis of rotation, and forms on the photodetector a light spot based on the twisted diffracted light beam.

In the optical pickup apparatus according to the present invention, the light beam is emitted by the light source, the returned light beam from the optical recording medium is diffracted by the diffraction surface of the holographic optical element, and the diffracted light beam is detected by the photodetector. Herein, the diffracted light beam impinges on the photodetector upon being twisted using the optical axis of the diffracted light beam as the axis of rotation by the holographic pattern in at least a part of the diffraction surface of the holographic optical element.

In this case, when the twisted diffracted light beam impinges on the photodetector, the light spot on the photodetector is rotated relative to the light spot on the diffraction surface. The degree of rotation of the light spot on the photodetector changes depending on the distance from the diffraction surface to the photodetector. Consequently, it is possible to detect a focus error signal in the optical pickup apparatus on the basis of the degree of rotation of the light spot on the photodetector.

Consequently, there is no convergent point of the diffracted light beam short of the photodetector, resulting in no change in light intensity distribution due to the diffracting effect and the interfering effect of light at the convergent point as in the astigmatism method. Further, when the shift in the position is detected using the twisting of the diffracted light beam, it is possible to arbitrarily set the size of the light spot on the photodetector. Consequently, the size of the light spot on the photodetector is set to a large value, thereby making it possible to sufficiently stably obtain a focus error signal and a reproduction signal.

The photodetector may have a plurality of photodetection parts divided by a dividing line or dividing lines, and the holographic pattern having the function of twisting the diffracted light beam in the holographic optical element may form a light spot based on the twisted diffracted light beam so as to extend over the dividing line in the photodetector.

In this case, the light spot based on the twisted diffraction light beam is formed in the plurality of photodetection parts so as to extend over the dividing line in the photodetection part, thereby making it possible to detect the degree of rotation of the light spot by comparing output signals from the plurality of photodetection parts.

The diffraction surface of the holographic optical element may be divided into a plurality of regions, at least one of the plurality of regions having the holographic pattern. The plurality of regions in the diffraction surface of the holographic optical element may form a plurality of light spots based on the diffracted light beam at positions spaced apart from each other on the photodetector, and the holographic pattern of at least one of the regions may form a light spot based on the twisted diffracted light beam so as to extend over the dividing line in the photodetector.

In this case, the plurality of light spots based on the diffracted light beam by the plurality of regions in the diffraction surface of the holographic optical element are formed at positions spaced apart from each other on the photodetector so as to extend over the dividing line or lines in the photodetector, and the diffracted light beam impinges on the photodetector upon being twisted by at least one of the plurality of regions.

Consequently, the light spots based on the twisted diffraction light beam are formed on the plurality of photodetection parts so as to extend over the dividing line or lines in the photodetector and spaced apart from each other on the photodetector, thereby making it possible to more accurately detect the degree of rotation of the light spot by comparing output signals from the plurality of photodetection parts.

The diffraction surface of the holographic optical element may be divided into a first region and a second region, at least one of the first and second regions having the holographic pattern. The first and second regions in the diffraction surface of the holographic optical element may form first and second light spots based on the diffracted light beam at positions spaced apart from each other on the photodetector, and the holographic pattern of at least one of the regions may form a light spot based on the twisted diffracted light beam so as to extend over the dividing line in the photodetector.

When the light beam has an approximately circular cross-sectional shape, the light beam is caused to impinge on the diffraction surface so as to extend over the dividing line between the first and second regions in the diffraction surface, thereby forming on the photodetector an approximately semi-circular light spot by the first region and an approximately semi-circular light spot by the second region. In this case, it is possible to easily judge the degree of rotation of the an approximately semi-circular light spot by the holographic pattern having the function of twisting the diffracted light beam in one of the first and second regions.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 12 is a schematic plan view showing a light intensity distribution on a two-segment holographic pattern;

FIG. 13 is a schematic view showing the relationship between a light spot on a holographic pattern and a light intensity distribution on a four-segment photodetection part in a photodetector;

FIG. 39 is a schematic plan view showing an example of the respective shapes of light spots on a three-segment photodetector in a case where the knife edge method is applied thereto.

DESCRIPTION OF THE PREFERRED EMBODIMENTS

In first to seventh embodiments, description is now made of an optical pickup apparatus which is an example of a position shift detecting apparatus according to the present invention. In an eighth embodiment, a position shift sensor which is an example of the position shift detecting apparatus according to the present invention.

(First Embodiment)

Figure 1:
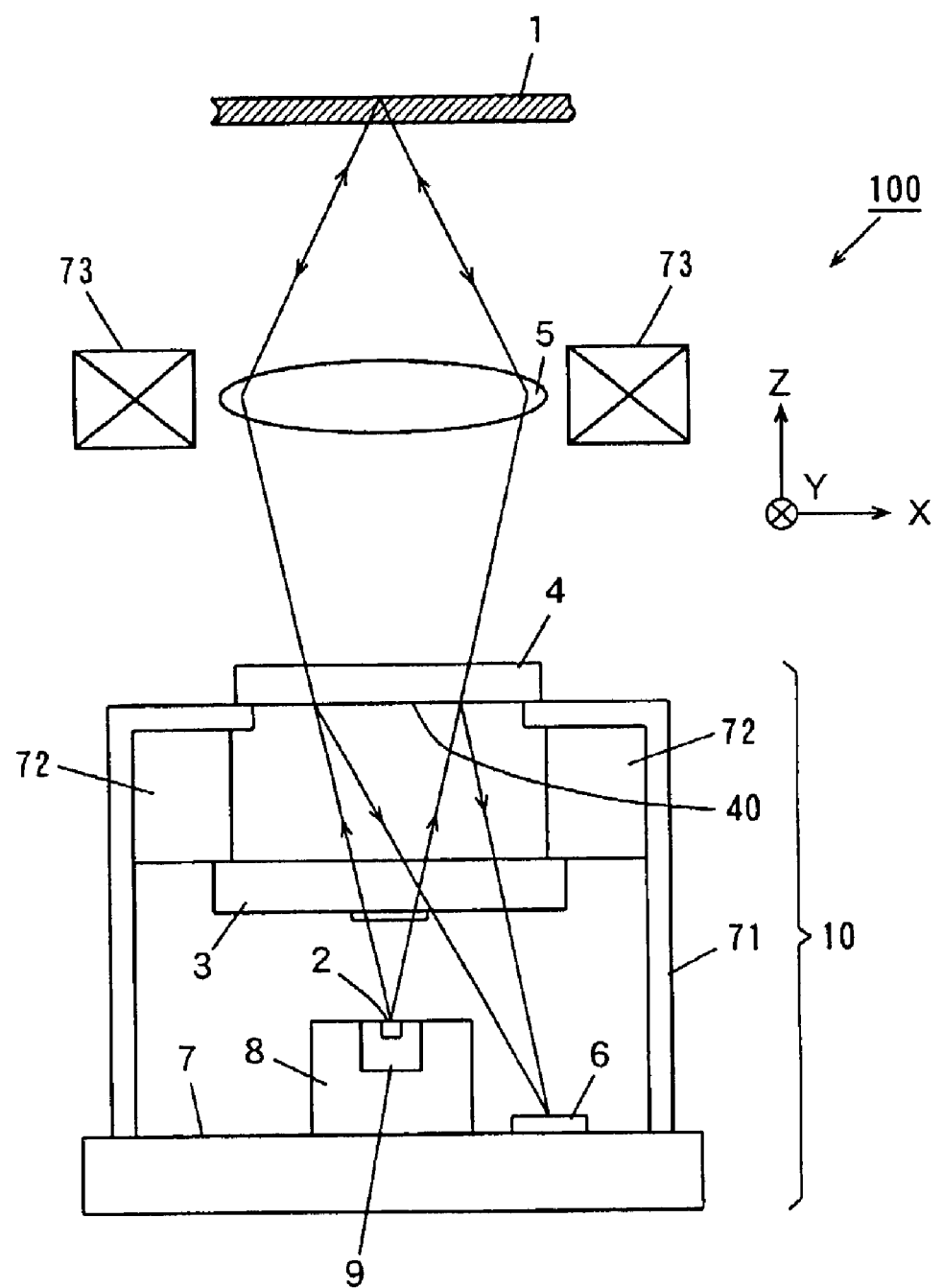
FIG. 1 is a schematic view of an optical pickup apparatus according to a first embodiment of the present invention.

FIG. 1 is a schematic view of an optical pickup apparatus according to a first embodiment of the present invention. The optical pickup apparatus 100 shown in FIG. 1 performs focus servo control and tracking servo control.

In FIG. 1, the radial direction of a reflection-type optical disk 1 such as a CD-R (Compact Disc-Recordable) is taken as the X-direction, the track direction of the optical disk 1 is taken as the Y-direction, and a direction perpendicular to a disk surface of the optical disk 1 is taken as the Z-direction.

The optical pickup apparatus 100 comprises a holographic unit 10 and an objective lens 5. The holographic unit 10 comprises a semiconductor laser device 2, a transmission-type three-beam generating diffraction grating 3, a transmission-type holographic optical element 4, and a photodetector 6.

A block 8 is provided on a stem (pedestal) 7, and a heat sink 9 is attached to a side surface of the block 8. The three-beam generating diffraction grating 3 is composed of an optical glass, an optical resin, or the like, and is arranged in a holder 71 through a spacer 72. The transmission-type holographic optical element 4 is arranged in an opening on an upper surface of the holder 71. Further, a holographic pattern 40 is formed on a holographic surface of the transmission-type holographic optical element 4.

The semiconductor laser device 2 emits a laser beam (light beam) in the Z-direction. The three-beam generating diffraction grating 3 divides the light beam emitted from the semiconductor laser device 2 into three light beams, i.e., a 0th order diffracted light beam (main light beam), a +1st order diffracted light beam (sub light beam), and a −1st order diffracted light beam (sub light beam) within a plane substantially including the Y-direction and the Z-direction. The light beams are transmitted through the transmission-type holographic optical element 4. In the figures, the three light beams are represented by a single light beam.

The objective lens 5 is supported so as to be movable in the radial direction (X-direction) of the optical disk 1 in order to perform tracking servo control and is supported so as to be movable in the vertical direction (Z-direction) in order to perform focus servo control by an actuator 73. The objective lens 5 condenses on the optical disk 1 the main light beam and the two sub light beams which are diffracted and transmitted in the 0th order through the transmission-type holographic optical element 4 as a main spot and two sub spots positioned on both sides thereof.

Figure 2:
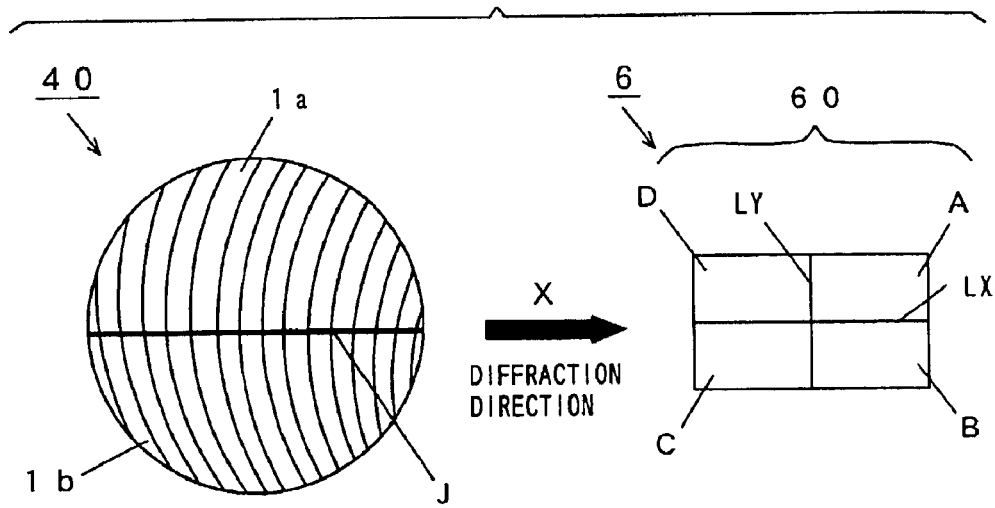
FIG. 2 is a schematic view of a holographic pattern formed on a holographic surface of a transmission-type holographic optical element and a photodetector which are used in the optical pickup apparatus according to the first embodiment of the present invention.
Figure 3:
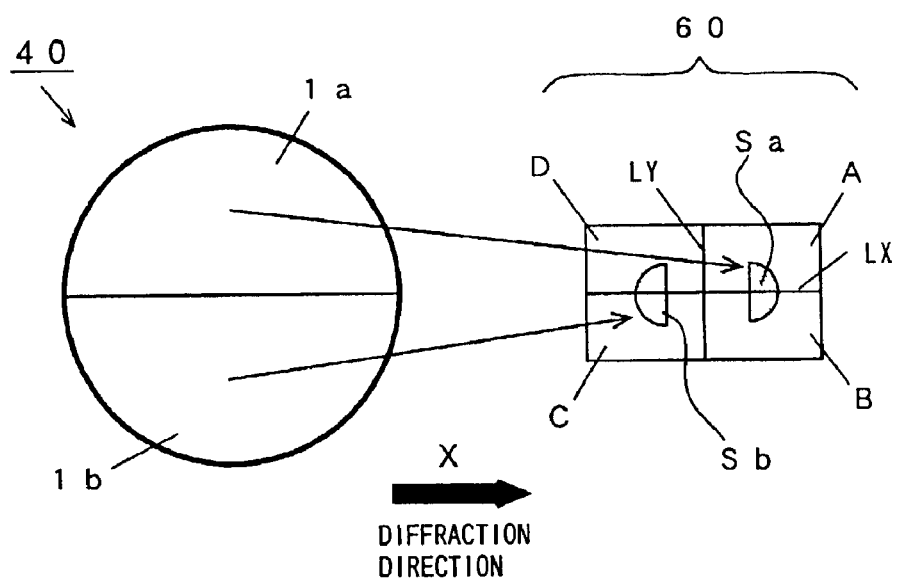
FIG. 3 is a schematic view showing a state where a reflected light beam diffracted by a holographic pattern is condensed.

FIG. 2 is a schematic view of the holographic pattern 40 formed on the holographic surface of the transmission-type holographic optical element 4 and the photodetector 6 which are used for the optical pickup apparatus 100 according to the first embodiment of the present invention. FIG. 3 is a schematic view showing a state where a returned light beam (reflected light beam) diffracted by the holographic pattern 40 is condensed on the photodetector 6.

As shown in FIG. 2, the holographic pattern 40 is divided into a pattern 1a and a pattern 1b with a dividing line J parallel to the diffraction direction (X-direction) as its boundary.

The photodetector 6 comprises a four-segment photodetection part 60. The four-segment photodetection part 60 is divided into four photodetection parts A, B, C, and D by a dividing line LX parallel to the diffraction direction (X-direction) and a dividing line LY perpendicular to the diffraction direction (X-direction).

As shown in FIG. 3, the pattern 1a twists the diffracted light beam in a clockwise direction, to form a semi-circular light spot Sa on the photodetection parts A and B so as to extend over the dividing line LX in the four-segment photodetection part 60. The pattern 1b similarly twists the diffracted light beam in a clockwise direction, to form a semi-circular light spot Sb on the photodetection parts C and D so as to extend over the dividing line LX in the four-segment photodetection part 60. In this case, the light spots Sa and Sb are formed spaced apart from each other centered with respect to the dividing line LY in the four-segment photodetection part 60.

Figure 4:
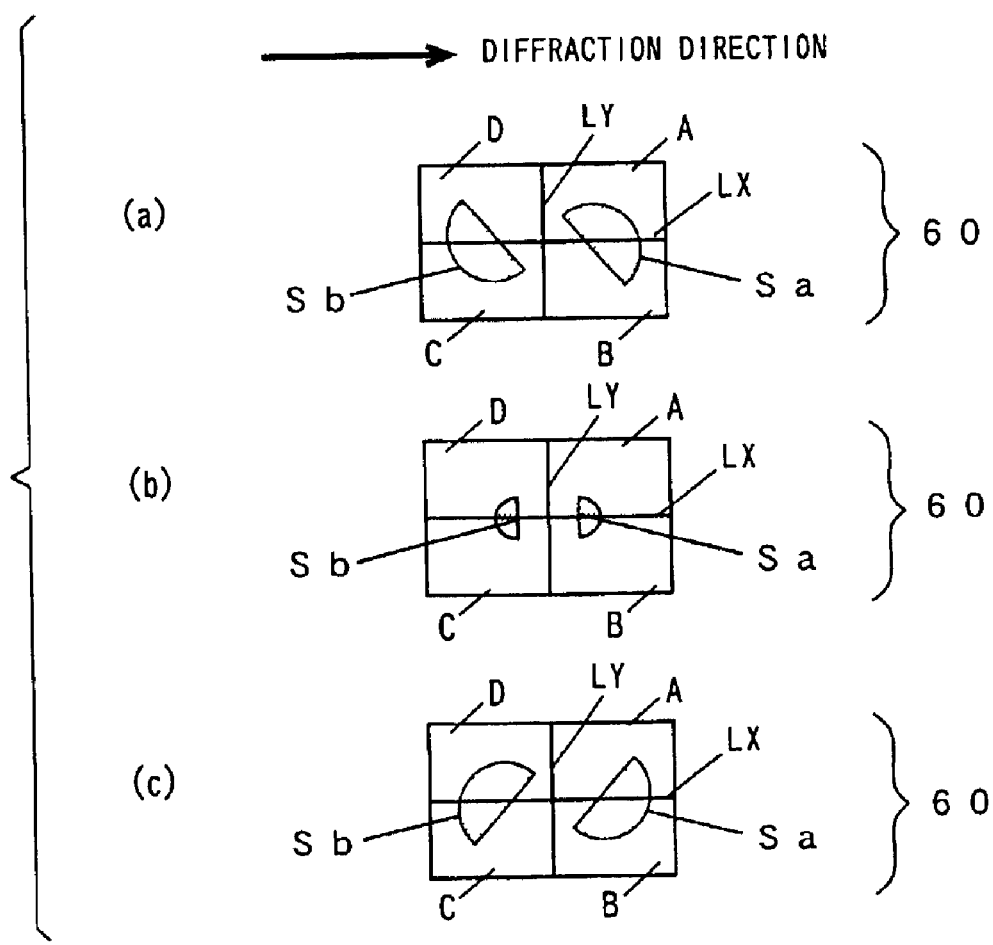
FIG. 4 is a schematic view showing respective changes in the shapes of light spots condensed on a four-segment photodetection part in the first embodiment.

FIG. 4 is a schematic view showing respective changes in the shapes of light spots condensed on the four-segment photodetection part 60 in the first embodiment.

A returned light beam (hereinafter referred to as reflected light beam) from the optical disk 1 is diffracted in the X-direction by the holographic pattern 40, and impinges on the four-segment photodetection part 60 while being twisted in a clockwise direction.

When the light beam condensed by the objective lens 5 is in focus on the optical disk 1, the diffracted light beam forms the light spots Sa and Sb in a state where it is twisted by 90°, as shown in FIG. 4(b). In this case, the respective quantities of light received in the photodetection parts A and B by the light spot Sa become equal, and the respective quantities of light received in the photodetection parts C and D by the light spot Sb become equal.

On the other hand, when the light beam condensed by the objective lens 5 is out of focus on the optical disk 1, the diffracted light beam forms the light spots Sa and Sb in a state where it is twisted by an angle different from 90°, as shown in FIGS. 4(a) and 4(c).

When the optical disk 1 is too near the objective lens 5 to exceed the focal point of the light beam, the light spots Sa and Sb are formed in a state where they are rotated through an angle smaller than 90° to the dividing line LX on the four-segment photodetection part 60, as shown in FIG. 4(a).

In this case, the quantity of light received in the photodetection part A by the light spot Sa is larger than the quantity of light received in the photodetection part B by the light spot Sa. Further, the quantity of light received in the photodetection part C by the light spot Sb is larger than the quantity of light received in the photodetection part D by the light spot Sb.

When the optical disk 1 is farther from the focal point of the light beam, the light spots Sa and Sb are formed in a state where they are rotated through an angle larger than 90° to the dividing line LX on the four-segment photodetection part 60, as shown in FIG. 4(c).

In this case, the quantity of light received in the photodetection part A by the light spot Sa is smaller than the quantity of light received in the photodetection part B by the light spot Sa. Further, the quantity of light received in the photodetection part C by the light spot Sb is smaller than the quantity of light received in the photodetection part D by the light spot Sb.

Therefore, using output signals pa, pb, pc, and pd from the photodetection parts A, B, C, and D in the four-segment photodetection part 60, a focus error signal FE is derived by the following equation:

$$FE=(pa+pc)-(pb+pd) \qquad (5)$$

That is, the focus error signal FE in the foregoing equation becomes positive when the distance between the optical disk 1 and the objective lens 5 is too short, becomes zero when a good distance is maintained between the optical disk 1 and the objective lens 5, and becomes negative when the distance between the optical disk 1 and the objective lens 5 is too long.

Furthermore, using the output signals pa, pb, pc, and pd from the photodetection parts A, B, C, and D in the four-segment photodetection part 60, a reproduction signal (pit signal) HF can be derived by the following equation:

$$HP=pa+pb+pc+pd \qquad (6)$$

Figure 5:
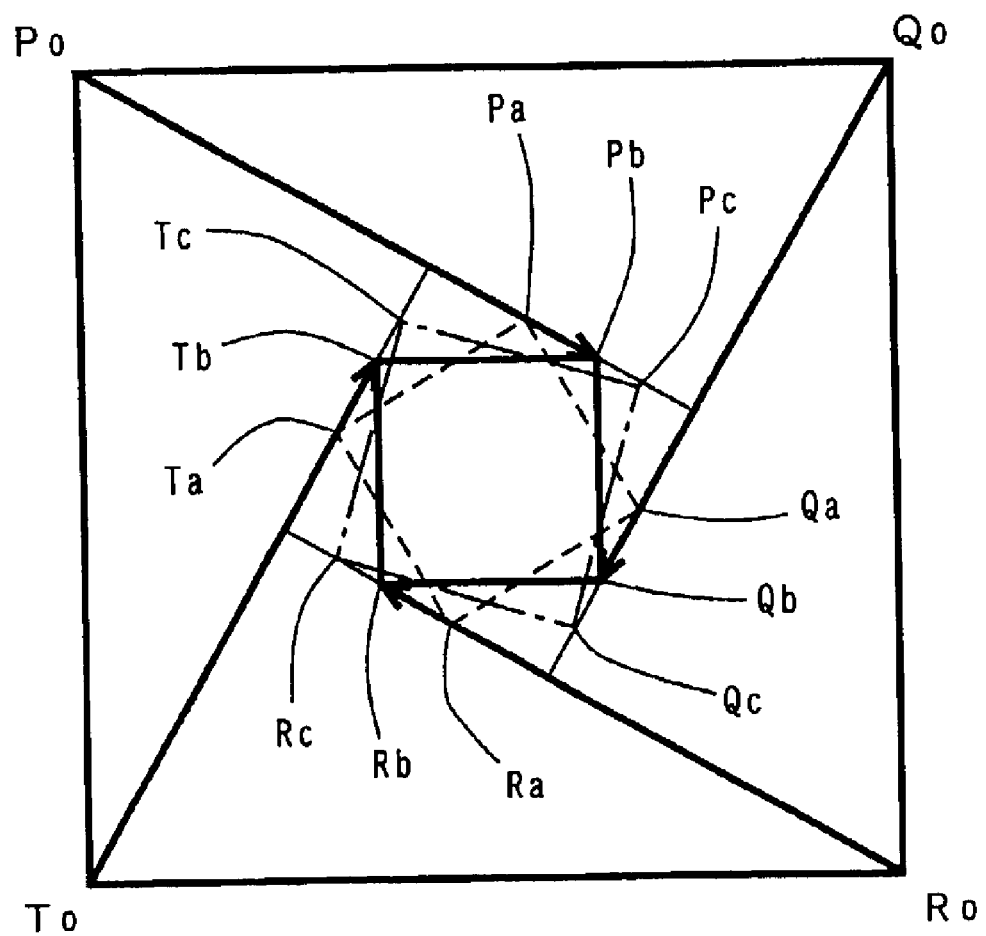
FIG. 5 is a schematic view showing the cross section of a light beam diffracted by a holographic pattern as viewed from the top.

The principle of obtaining the shape of a light spot as shown in FIG. 4 will be described using FIG. 5. FIG. 5 is a schematic view of the cross section of the light beam diffracted by the holographic pattern 40 as viewed from the top. In order to facilitate understanding, it is herein assumed that the cross section of the diffracted light beam is a square.

At the time point where the reflected light beam from the optical disk 1 has not been diffracted on the holographic pattern 40, the cross section of the reflected light beam is a square having vertexes $P_0$, $Q_0$, $R_0$, and $T_0$ (hereinafter referred to as a square $PQRT_0$). The diffracted light beam which has been transmitted through the holographic pattern 40 is rotated in a clockwise direction.

In the process of rotating the diffracted light beam, the order in which the vertex $P_0$ is rotated is Pa, Pb, and Pc in a clockwise direction. At this time, the respective orders in which the other vertexes $Q_0$, $R_0$, and $T_0$ are rotated are also similarly Qa, Qb, and Qc, Ra, Rb, and Rc, and Ta, Tb, and Tc.

When the light beam condensed by the objective lens 5 is in focus on the optical disk 1, the diffracted light beam is condensed on the photodetector 6 as a square having vertexes Pb, Qb, Rb, and Tb (hereinafter referred to as a square PQRTb).

The cross section of the diffracted light beam at a position slightly short of the position of the photodetector 6 in the above-mentioned case where the light beam is in focus (nearer to the helographic pattern 40) is a square having vertexes Pa, Qa, Ra, and Ta (hereinafter referred to as a square PQRTa). Further, the cross section of the diffracted light beam at a position slightly behind the position of the photodetector 6 in the above-mentioned case where the light beam is in focus (farther from the holographic pattern 40) is a square having vertexes Pc, Qc, Rc, and Tc (hereinafter referred to as a square PQRTc).

As described in the foregoing, the cross section of the diffracted light beam at the position slightly nearer from the position of the photodetector 6 is the square PQRTa obtained by rotating the square PQRTb in a counterclockwise direction. On the other hand, the cross section of the diffracted light beam at the position slightly farther from the position of the photodetector 6 is the square PQRTc obtained by rotating the square PQRTb in a clockwise direction.

As described in the foregoing, the focus error signal FE is detected using the rotation (twisting) of the diffracted light beam. Accordingly, the size of the light spot on the photodetector 6 does not affect the principle of operations even if it is arbitrarily set.

As described in the foregoing, in the first embodiment, the diffracted light beam is condensed on the photodetector 6 while being rotated in a clockwise direction or a counterclockwise direction (being twisted) using the optical axis of the diffracted light beam as an axis of rotation by the holographic pattern 40, thereby obtaining the focus error signal FE.

In this case, there is no convergent point of the diffracted light beam short of the photodetector 6, resulting in no change in light intensity distribution due to the diffracting effect and the interfering effect of light at the convergent point as in the astigmatism method. Further, the focus error signal FE is detected using the rotation (twisting) of the diffracted light beam, thereby making it possible to set the size of the light spot on the photodetector 6 to a large value. Consequently, it is possible to obtain a focus error signal FE and a reproduction signal HF which are sufficiently stable and are high in intensity.

In the optical pickup apparatus 100 according to the present embodiment, it is possible to employ, as a tracking error detection method, the three-beam method by further providing the photodetector 6 with two photodetection parts for detecting the sub light beams. Further, it is possible to use the push pull method using the four-segment photodetector 60 or the DPD (Differential Phase Detection) method. Alternatively, it is possible to employ a differential push pull method by further providing two two-segment photodetection parts in addition to the four-segment photodetection part 60.

(Second Embodiment)

An optical pickup apparatus according to a second embodiment is the same as the optical pickup apparatus according to the first embodiment, excluding a holographic pattern 40 in a transmission-type holographic optical element 4.

In the holographic pattern 40 in the present embodiment, a pattern 1a and a pattern 1b shown in FIG. 2 differ in a method of diffracting a light beam.

Figure 6:
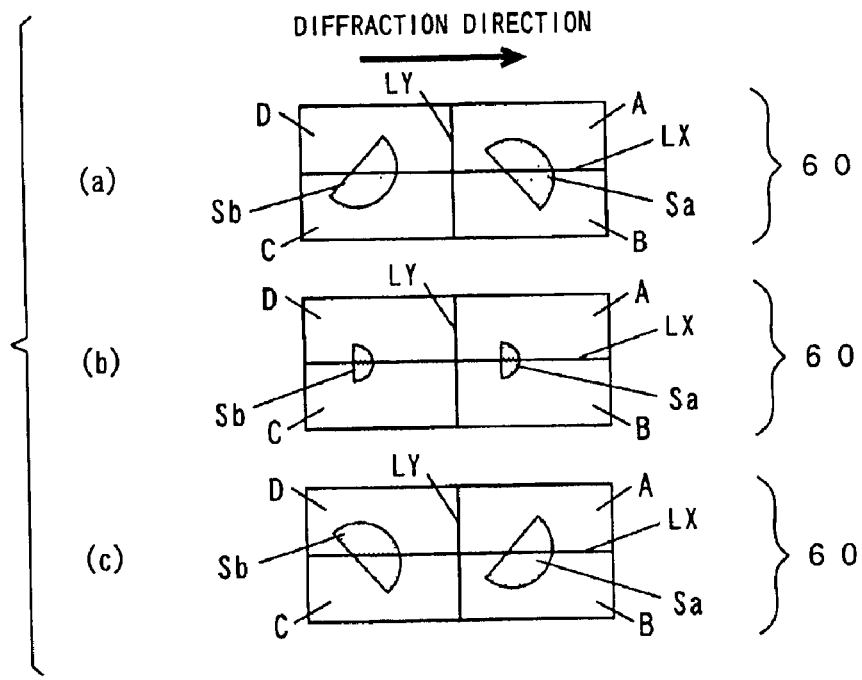
FIG. 6 is a schematic view showing respective changes in the shapes of light spots condensed on a four-segment photodetection part in a second embodiment.

FIG. 6 is a schematic view showing respective changes in the shapes of light spots condensed on a four-segment photodetection part 60 in the second embodiment.

A reflected light beam from an optical disk 1 is diffracted in the X-direction by the holographic pattern 40, and impinges on the four-segment photodetection part 60 while being twisted in a clockwise direction in the pattern 1a and twisted in a counterclockwise direction in the pattern 1b.

When the light beam condensed by an objective lens 5 is in focus on an optical disk 1, the diffracted light beam by the pattern 1a and the diffracted light beam by the pattern 1b respectively form light spots Sa and Sb in a state where it is twisted by 90° in a clockwise direction and in a state where it is twisted by 90° in a counterclockwise direction, as shown in FIG. 6(b). In this case, the respective quantities of light received in photodetection parts A and B by the light spot Sa become equal, and the respective quantities of light received in photodetection parts C and D by the light spot Sb become equal.

On the other hand, when the light beam condensed by the objective lens 5 is out of focus on the optical disk 1, the diffracted light beam forms the light spots Sa and Sb in a state where it is twisted by an angle different from 90° irrespective of the direction of rotation, as shown in FIGS. 6(a) and 6(c).

When the optical disk 1 is too near the objective lens 5 to exceed the focal point of the light beam, the light spot Sa is formed in a state where it is rotated in a clockwise direction through an angle smaller than 90° to a dividing line LX, and the light spot Sb is formed in a state where it is rotated in a counterclockwise direction through an angle smaller than 90° to the dividing line LX, on the four-segment photodetection part 60, as shown in FIG. 6(a).

In this case, the quantity of light received in the photodetection part A by the light spot Sa is larger than the quantity of light received in the photodetection part B by the light spot Sa. Further, the quantity of light received in the photodetection part C by the light spot Sb is larger than the quantity of light received in the photodetection part D by the light spot Sb.

When the optical disk 1 is farther from the focal point of the light beam, the light spot Sa is formed in a state where it is rotated in a clockwise direction through an angle larger than 90° to the dividing line LX, and the light spot Sb is formed in a state where it is rotated in a counterclockwise direction through an angle larger than 90° to the dividing line LX, on the four-segment photodetection part 60, as shown in FIG. 6(c).

In this case, the quantity of light received in the photodetection part A by the light spot Sa is smaller than the quantity of light received in the photodetection part B by the light spot Sa. Further, the quantity of light received in the photodetection part C by the light spot Sb is smaller than the quantity of light received in the photodetection part D by the light spot Sb.

Therefore, using output signals pa, pb, pc, and pd from the photodetection parts A, B, C, and D in the four-segment photodetection part 60, a focus error signal FE is derived by the following equation:

$$FE=(pa+pc)-(pb+pd) \tag{7}$$

That is, the focus error signal FE in the foregoing equation becomes positive when the distance between the optical disk 1 and the objective lens 5 is too short, becomes zero when a good distance is maintained between the optical disk 1 and the objective lens 5, and becomes negative when the distance between the optical disk 1 and the objective lens 5 is too long.

In this case, there is no convergent point of the diffracted light beam short of the photodetector 6, resulting in no change in light intensity distribution due to the diffracting effect and the interfering effect of light at the convergent point as in the astigmatism method. Further, the focus error signal FE is detected using the rotation (twisting) of the diffracted light beam, thereby making it possible to set the size of the light spot on the photodetector 6 to a large value. Consequently, it is possible to obtain a focus error signal FE and a reproduction signal HF which are sufficiently stable and are high in intensity.

(Third Embodiment)

An optical pickup apparatus according to a third embodiment is the same as the optical pickup apparatus according to the first embodiment, excluding a holographic pattern 40 in a transmission-type holographic optical element 4.

In the holographic pattern 40 in the present embodiment, a pattern 1a and a pattern 1b shown in FIG. 2 differ in a method of diffracting an incident light beam.

The method of diffracting according to one of the two types of patterns 1a and 1b is the same as that in the first embodiment, and the knife edge method is used as a method of diffracting according to the other pattern 1b.

Figure 7:
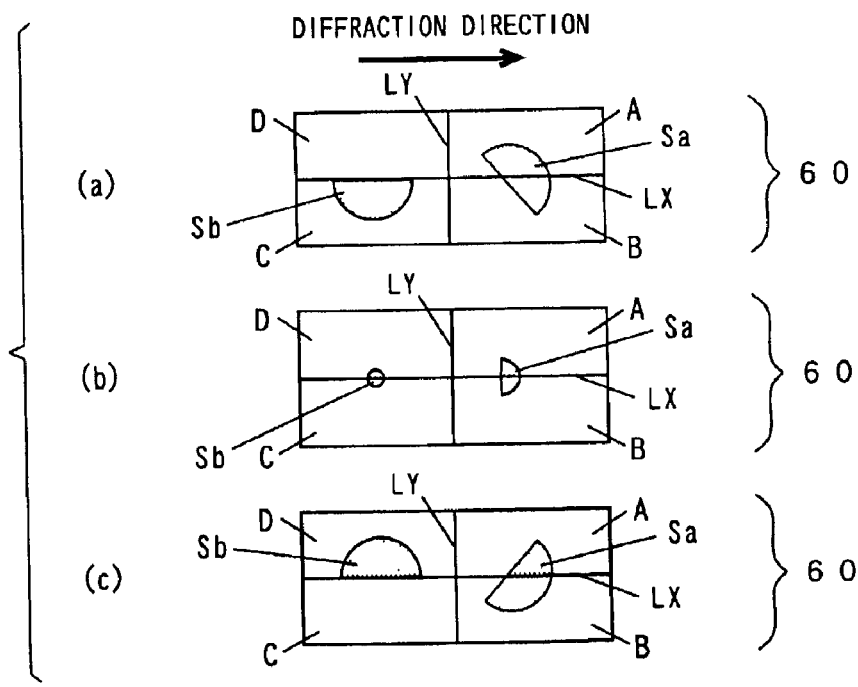
FIG. 7 is a schematic view showing respective changes in the shapes of light spots condensed on a four-segment photodetection part in a third embodiment.

FIG. 7 is a schematic view showing respective changes in the shapes of light spots condensed on a four-segment photodetection part 60 in the third embodiment.

A reflected light beam from an optical disk 1 is diffracted in the X-direction by the pattern 1a in the holographic pattern 40, impinges on the four-segment photodetection part 60 while being twisted in a clockwise direction, and is diffracted in the X-direction by the pattern 1b in the holographic pattern 40.

When the light beam condensed by an objective lens 5 is in focus on the optical disk 1, the diffracted light beam by the pattern 1a forms a light spot Sa on photodetection parts A and B so as to extend over a dividing line LX in the four-segment photodetection part 60 in a state where it is twisted by 90°, and the diffracted light beam by the pattern 1b forms a dot-shaped light spot Sb on the dividing line LX in the four-segment photodetection part 60. In this case, the respective quantities of light received in the photodetection parts A and B by the light spot Sa become equal, and the respective quantities of light received in photodetection parts C and D by the light spot Sb become equal.

On the other hand, when the optical disk 1 is too near the objecitive lens 5 to exceed the focal point of the light beam, the diffracted light beam by the pattern 1a forms the light spot Sa on the photodetection parts A and B in a state where it is rotated through an angle smaller by 90° to the dividing line LX in the four-segment photodetection part 60, and the diffracted light beam by the pattern 1b forms the light spot Sb on the photodetection part C in the four-segment photodetection part 60, as shown in FIG. 7(a).

In this case, the quantity of light received in the photodetection part A by the light spot Sa is larger than the quantity of light received in the photodetection part B by the light spot Sa. Further, the quantity of light received in the photodetection part C by the light spot Sb becomes a predetermined value, and the quantity of light received in the photodetection part D by the light spot Sb becomes zero.

When the optical disk 1 is farther from the focal point of the light beam, the diffracted light beam by the pattern 1a forms the light spot Sa on the photodetection parts A and B in a state where it is rotated through an angle larger than 90° to the dividing line LX in the four-segment photodetection part 60, and the diffracted light beam by the pattern 1b forms the light spot Sb on the photodetection part D in the four-segment photodetection part 60, as shown in FIG. 7(c).

In this case, the quantity of light received in the photodetection part A by the light spot Sa is smaller than the quantity of light received in the photodetection part B by the light spot Sb. Further, the quantity of light received in the photodetection part C by the light spot Sb becomes zero, and the quantity of light received in the photodetection part D by the light spot Sb becomes a predetermined value.

Therefore, using output signals pa, pb, pc, and pd from the photodetection parts A, B, C, and D in the four-segment photodetection part 60, a focus error signal FE is derived by the following equation:

$$FE=(pa+pc)-(pb+pd) \quad (8)$$

That is, the focus error signal FE in the foregoing equation becomes positive when the distance between the optical disk 1 and the objective lens 5 is too short, becomes zero when a good distance is maintained between the optical disk 1 and the objective lens 5, and becomes negative when the distance between the optical disk 1 and the objective lens 5 is too long.

In this case, a focus error signal having high sensitivity is obtained by the pattern 1b.

Furthermore, the focus error signal FE is detected using the rotation (twisting) of the diffracted light beam by the pattern 1a, thereby making it possible to set the size of the light spot on the photodetector 6 to a large value. Consequently, it is possible to obtain a focus error signal FE and a reproduction signal HF which are sufficiently stable and are high in intensity.

(Fourth embodiment)

An optical pickup apparatus according to a fourth embodiment is the same as the optical pickup apparatus according to the first embodiment, excluding a holographic pattern 40 in a transmission-type holographic optical element 4 and a photodetector 6.

Figure 8:
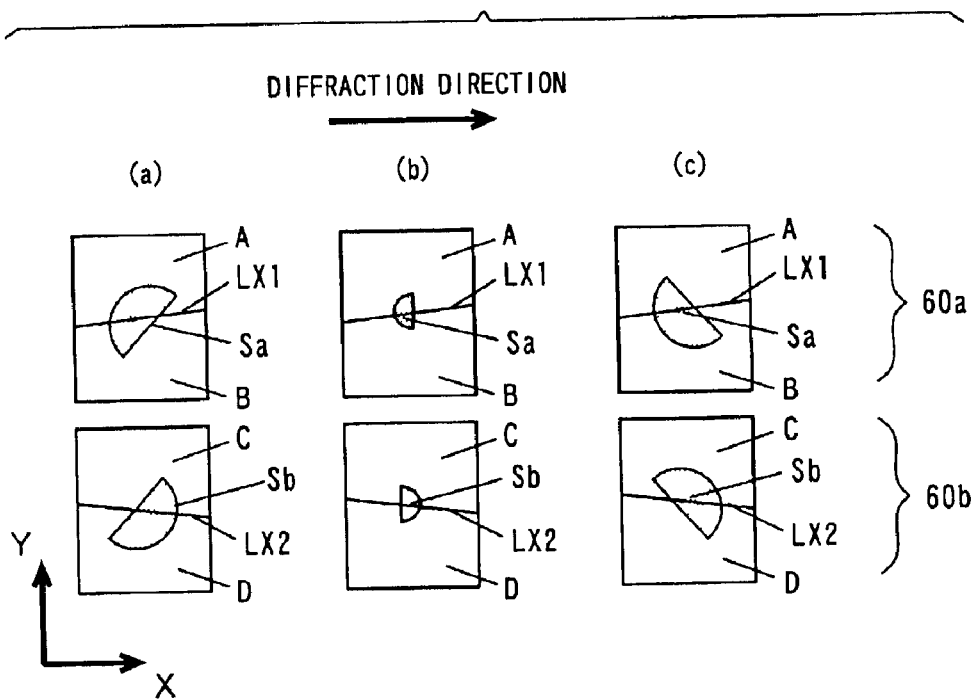
FIG. 8 is a schematic view showing respective changes in the shapes of light spots condensed on two two-segment photodetection parts in a fourth embodiment.

FIG. 8 is a schematic view showing respective changes in the shapes of light spots condensed on two two-segment photodetection parts 60a and 60b in the fourth embodiment.

The photodetector 6 in the present embodiment comprises two two-segment photodetection parts 60a and 60b arranged in a direction perpendicular to the diffraction direction (X-direction).

The two-segment photodetection part 60a is divided into two photodetection parts A and B by a dividing line LX1 slightly inclined from the diffraction direction (X-direction). The two-segment photodetection part 60b is divided into two photodetection parts C and D by a dividing line LX2 slightly inclined from the diffraction direction (X-direction). The dividing line LX1 and the dividing line LX2 are line-symmetric with respect to the X-direction.

A reflected light beam from an optical disk 1 is diffracted in the X-direction by the holographic pattern 40, and impinges on the two-segment photodetection parts 60a and 60b while being twisted in a counterclockwise direction.

When the light beam condensed by an objective lens 5 is in focus on the optical disk 1, the diffracted light beam forms a light spot Sa in a state where it is twisted by 90° in a counterclockwise direction in the two-segment photodetection part 60a, and forms a light spot Sb in a state where it is twisted by 90° in a counterclockwise direction in the two-segment photodetection part 60b, as shown in FIG. 8(b). In this case, the respective quantities of light received in the photodetection parts A and B in the two-segment photodetection part 60a by the light spot Sa become equal. Further, the respective quantities of light received in the photodetection parts C and D in the two-segment photodetection part 60b by the light spot Sb become equal.

On the other hand, when the light beam condensed by the objective lens 5 is out of focus on the optical disk 1, the diffracted light beam forms the light spots Sa and Sb in a state where it is twisted by an angle different from 90°, as shown in FIGS. 8(a) and 8(c).

When the optical disk 1 is too near the objective lens 5 to exceed the focal point of the light beam, the light spots Sa and Sb are respectively formed in a state where they are rotated in a counterclockwise direction through an angle smaller than 90° to the X-direction on the two-segment photodetection parts 60a and 60b, as shown in FIG. 8(a).

In this case, the quantity of light received in the photodetection part A in the two-segment photodetection part 60a by the light spot Sa is larger than the quantity of light received in the photodetection part B in the two-segment photodetection part 60a by the light spot Sa. Further, the quantity of light received in the photodetection part C in the two-segment photodetection part 60b by the light spot Sb is smaller than the quantity of light received in the photodetection part D in the two-segment photodetection part 60b by the light spot Sb.

When the optical disk 1 is farther from the focal point of the light beam, the light spots Sa and Sb are respectively formed in a state where they are rotated in a counterclockwise direction through an angle larger than 90° to the X-direction on the two-segment photodetection parts 60a and 60b, as shown in FIG. 8(C).

In this case, the quantity of light received in the photodetection part A in the two-segment photodetection part 60a by the light spot Sa is smaller than the quantity of light received in the photodetection part B in the two-segment photodetection part 60a by the light spot Sa. Further, the quantity of light received in the photodetection part C in the two-segment photodetection part 60b by the light spot Sb is larger than the quantity of light received in the photodetection part D in the two-segment photodetection part 60b by the light spot Sb.

Therefore, using output signals pa, pb, pc, and pd from the photodetection parts A, B, C, and D in the two-segment photodetection parts 60a and 60b, a focus error signal FE is derived by the following equation:

$$FE=(pa+pd)-(pb+pc) \quad (9)$$

That is, the focus error signal FE in the foregoing equation becomes positive when the distance between the optical disk 1 and the objective lens 5 is too short, becomes zero when a good distance is maintained between the optical disk 1 and the objective lens 5, and becomes negative when the distance between the optical disk 1 and the objective lens 5 is too long.

In this case, there is no convergent point of the diffracted light beam short of the photodetector 6, resulting in no change in light intensity distribution due to the diffracting effect and the interfering effect of light at the convergent point as in the astigmatism method. Further, the focus error signal FE is detected using the rotation (twisting) of the diffracted light beam, thereby making it possible to set the size of the light spot on the photodetector 6 to a large value. Consequently, it is possible to obtain a focus error signal FE and a reproduction signal HF which are sufficiently stable and are high in intensity.

(Fifth Embodiment)

An optical pickup apparatus according to a fifth embodiment is the same as the optical pickup apparatus according to the first embodiment, excluding a holographic pattern 40 in a transmission-type holographic optical element 4 and a photodetector 6.

The photodetector 6 in the present embodiment comprises two two-segment photodetection parts 60a and 60b arranged in a direction perpendicular to the diffraction direction (X-direction).

Figure 9:
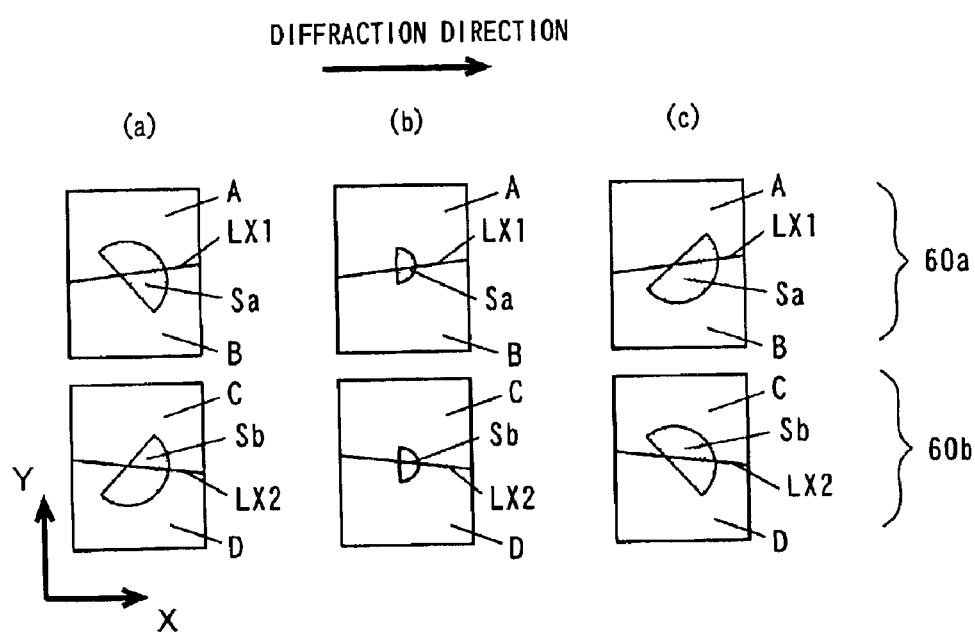
FIG. 9 is a schematic view showing respective changes in the shapes of light spots condensed on two two-segment photodetection parts in a fifth embodiment.

FIG. 9 is a schematic view showing respective changes in the shapes of light spots condensed on the two two-segment photodetection parts 60a and 60b in the fifth embodiment.

In the holographic pattern 40 in the present embodiment, the pattern 1a and the pattern 1b shown in FIG. 2 differ in a method of diffracting an incident light beam.

A reflected light beam from an optical disk 1 is diffracted in the X-direction by the holographic pattern 40, and impinges on the two-segment photodetection parts 60a and 60b while being twisted in a clockwise direction in the pattern 1a and twisted in a counterclockwise direction in the pattern 1b.

The two-segment photodetection part 60a is divided into two photodetection parts A and B by a dividing line LX1 slightly inclined from the diffraction direction (X-direction). The two-segment photodetection part 60b is divided into two photodetection parts C and D by a dividing line LX2 slightly inclined from the diffraction direction (X-direction). The dividing line LX1 and the dividing line LX2 are line-symmetric with respect to the X-direction.

The reflected light beam from the optical disk 1 is diffracted in the X-direction by the holographic pattern 40, and impinges on the two-segment photodetection parts 60a and 60b while being twisted in a clockwise direction in the pattern 1a and twisted in a counterclockwise direction in the pattern 1b.

When the light beam condensed by an objective lens 5 is in focus on the optical disk 1, the diffracted light beam forms a light spot Sa in a state where it is twisted by 90° in a clockwise direction in the two-segment photodetection part 60a, and forms a light spot Sb in a state where it is twisted by 90° in a counterclockwise direction in the two-segment photodetection part 60b, as shown in FIG. 9(b). In this case, the quantity of light received in the photodetection part A in the two-segment photodetection part 60a by the light spot Sa and the quantity of light received in the photodetection part B in the two-segment photodetection part 60a by the light spot Sa become equal.

Furthermore, the quantity of light received in the photodetection part C in the two-segment photodetection part 60b by the light spot Sb and the quantity of light received in the photodetection part D in the two-segment photodetection part 60b by the light spot Sb become equal.

On the other hand, when the light beam condensed by the objective lens 5 is out of focus on the optical disk 1, the diffracted light beam forms the light spots Sa and Sb in a state where it is twisted by an angle different from 90°, as shown in FIGS. 9(a) and 9(c).

When the optical disk 1 is too near the objective lens 5 to exceed the focal point of the light beam, the light spot Sa is formed in a state where it is rotated in a clockwise direction through an angle smaller than 90° to the X-direction, and the light spot Sb is formed in a state where it is rotated in a counterclockwise direction through an angle smaller than 90° to the X-direction, respectively, on the two-division photodetection parts 60a and 60b, as shown in FIG. 9(a).

In this case, the quantity of light received in the photodetection part A in the two-segment photodetection part 60a by the light spot Sa is larger than the quantity of light received in the photodetection part B in the two-segment photodetection part 60b by the light spot Sa. Further, the quantity of light received in the photodetection part C in the two-segment photodetection part 60b by the light spot Sa is smaller than the quantity of light received in the photodetection part D in the two-segment photodetection part 60b by the light spot Sb.

When the optical disk 1 is farther from the focal point of the light beam, the light spot Sa is formed in a state where it is rotated in a clockwise direction through an angle larger than 90° to the X-direction, and the light spot Sb is rotated in a counterclockwise direction through an angle larger than 90° to the X-direction, respectively, on the two-segment photodetection parts 60a and 60b, as shown in FIG. 9(C).

In this case, the quantity of light received in the photodetection part A in the two-segment photodetection part 60a by the light spot Sa is smaller than the quantity of light received in the photodetection part B in the two-segment photodetection part 60a by the light spot Sa. Further, the quantity of light received in the photodetection part C in the two-segment photodetection part 60b by the light spot Sb is larger than the quantity of light received in the photodetection part D in the two-segment photodetection part 60b by the light spot Sb.

Therefore, using output signals pa, pb, pc, and pd from the photodetection parts A, B, C, and D in the two-segment photodetection parts 60a and 60b, a focus error signal FE is derived by the following equation:

$$FE=(pa+pd)-(pb+pc) \quad (10)$$

That is, the focus error signal FE in the foregoing equation becomes positive when the distance between the optical disk 1 and the objective lens 5 is too short, becomes zero when a good distance is maintained between the optical disk 1 and the objective lens 5, and becomes negative when the distance between the optical disk 1 and the objective lens 5 is too long.

In this case, there is no convergent point of the diffracted light beam short of the photodetector 6, resulting in no change in light intensity distribution due to the diffracting effect and the interfering effect of light at the convergent point as in the astigmatism method. Further, the focus error signal FE is detected using the rotation (twisting) of the diffracted light beam, thereby making it possible to set the size of the light spot on the photodetector 6 to a large value. Consequently, it is possible to obtain a focus error signal FE and a reproduction signal HF which are sufficiently stable and are high in intensity.

(Sixth Embodiment)

An optical pickup apparatus according to a sixth embodiment is the same as the optical pickup apparatus according to the first embodiment, excluding a holographic pattern 40 in a transmission-type holographic optical element 4 and a photodetector 6.

Figure 10:
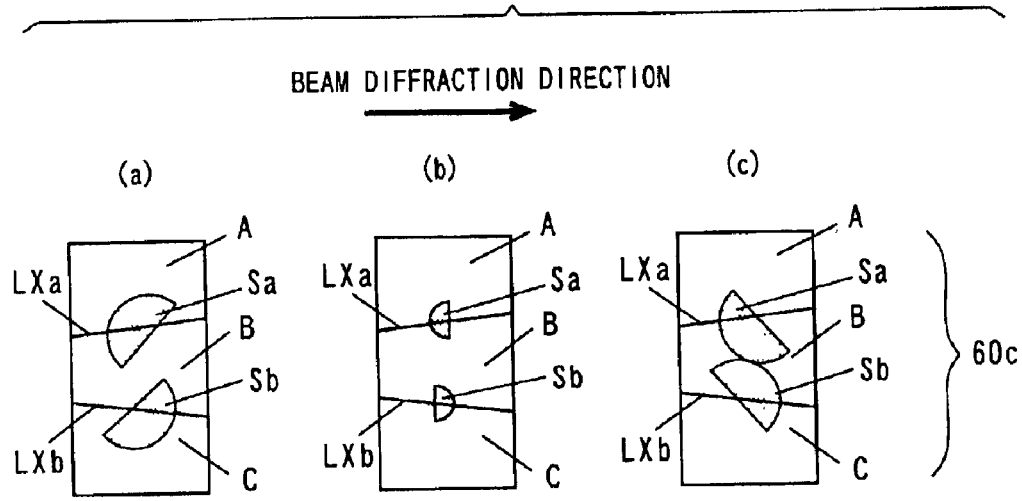
FIG. 10 is a schematic view showing respective changes in the shapes of light spots condensed on a three-segment photodetection part in a sixth embodiment.

FIG. 10 is a schematic view showing respective changes in the shapes of light spots condensed on a three-segment photodetection part in the sixth embodiment.

The photodetector 6 in the present embodiment comprises a three-segment photodetection part 60c. The three-segment photodetection part 60c is divided into three photodetection parts A, B and C by dividing lines LXa and LXb slightly inclined from the diffraction direction (X-direction). The dividing line LXa and the dividing line LXb are line-symmetric with respect to the X-direction.

A reflected light beam from an optical disk 1 is diffracted in the X-direction by the holographic pattern 40, and impinges on the three-segment photodetection part 60c while being twisted in a counterclockwise direction.

When the light beam condensed by an objective lens 5 is in focus on the optical disk 1, the diffracted light beam forms light spots Sa and Sb in a state where it is twisted by 90° in a counterclockwise direction using the X-direction as a basis in the three-segment photodetection part 60c, as shown in FIG. 10(b). In this case, the sum of the quantity of light received in the photodetection part A in the three-segment photodetection part 60c by the light spot Sa and the quantity of light received in the photodetection part C in the three-segment photodetection part 60c by the light spot Sb is equal to the quantity of light received in the photodetection part B in the three-segment photodetection part 60c by the light spots Sa and Sb.

On the other hand, when the light beam condensed by the objective lens 5 is out of focus on the optical disk 1, the diffracted light beam forms the light spots Sa and Sb in a state where it is twisted by an angle different from 90°, as shown in FIGS. 10(a) and 10(c).

When the optical disk 1 is too near the objective lens 5 to exceed the focal point of the light beam, the light spots Sa and Sb are respectively formed in a state where they are rotated in a counterclockwise direction through an angle smaller than 90° to the X-direction on the three-segment photodetection part 60c, as shown in FIG. 10(a).

In this case, the sum of the respective quantities of light received in the photodetection part A in the three-segment photodetection part 60c by the light spot Sa and the photodetection part C in the three-segment photodetection part 60c by the light spot Sb is larger than the quantity of light received in the photodetection part B in the three-segment photodetection part 60c by the light spots Sa and Sb.

When the optical disk 1 is farther from the focal point of the light beam, the light spots Sa and Sb are respectively formed in a state where they are rotated in a counterclockwise direction through an angle larger than 90° to the X-direction on the three-segment photodetection part 60c, as shown in FIG. 10(C).

In this case, the sum of the respective quantities of light received in the photodetection part A in the three-segment photodetection part 60c by the light spot Sa and the photodetection part C in the three-segment photodetection part 60c by the light spot Sb is smaller than the quantity of light received in the photodetection part B in the three-segment photodetection part 60c by the light spots Sa and Sb.

Therefore, using output signals pa, pb, and pc from the photodetection parts A, B, and C in the three-segment photodetection part 60c, a focus error signal FE is derived by the following equation:

$$FE=(pa+pc)-pb \qquad (11)$$

That is, the focus error signal FE in the foregoing equation becomes positive when the distance between the optical disk 1 and the objective lens 5 is too short, becomes zero when a good distance is maintained between the optical disk 1 and the objective lens 5, and becomes negative when the distance between the optical disk 1 and the objective lens 5 is too long.

In this case, there is no convergent point of the diffracted light beam short of the photodetector 6, resulting in no change in light intensity distribution due to the diffracting effect and the interfering effect of light at a convergent point as in the astigmatism method. Further, the focus error signal FE is detected using the rotation (twisting) of the diffracted light beam, thereby making it possible to set the size of the light spot on the photodetector 6 to a large value. Consequently, it is possible to obtain a focus error signal FE and a reproduction signal HF which are sufficiently stable and are high in intensity. Particularly, the photodetection part B is used in common for detecting the light spots Sa and Sb, thereby achieving down-sizing of the photodetector 6.

(Seventh Embodiment)

The optical positional relationship between a far-field pattern (beam section intensity distribution) spot of a laser beam emitted from a semiconductor laser device 2 shown in FIG. 1 and a two-segment holographic pattern 40 is set as follows, thereby making it possible to improve the accuracy of a focus error signal FE.

Figure 11:
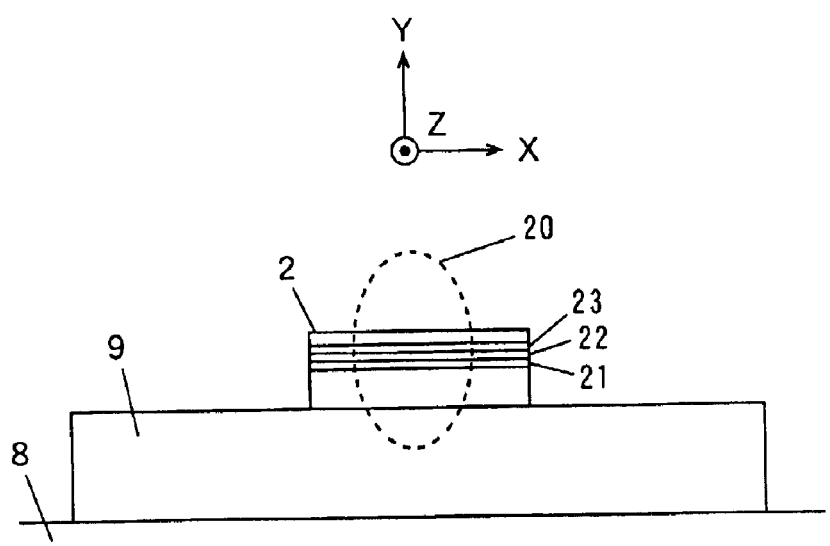
FIG. 11 is a top view of a semiconductor laser device in an optical pickup apparatus.

FIG. 11 is a top view of a semiconductor laser device 2 in an optical pickup apparatus 100 shown in FIG. 1.

As shown in FIG. 11, the semiconductor laser device 2 comprises a cladding layer 21, an active layer 22, and a cladding layer 23. The spread angle in the vertical direction of a laser beam emitted from the active layer 22 in the semiconductor laser device 2 (a direction perpendicular to the active layer 22) is generally larger than the spread angle thereof in the horizontal direction (a direction parallel to the active layer 22). As a result, a far-field pattern 20 of the laser beam is in an elliptical shape having its major axis being perpendicular to the active layer 22.

In the optical pickup apparatus 100 according to the present embodiment, the active layer 22 in the semiconductor laser device 2 is attached to a side surface of a heat sink 9 so as to be perpendicular to the Y-direction. As a result, the far-field pattern 20 of the laser beam is in an elliptical shape having its major axis being parallel to the Y-direction and its minor axis being parallel to the X-direction.

FIG. 12 is a schematic plan view showing a light intensity distribution on the two-segment holographic pattern 40, and FIG. 13 is a schematic plan view showing the relationship between a light intensity distribution on a holographic pattern 40 shown in FIG. 12 and light spots Sa and Sb on a four-segment photodetection part 60 in a photodetector 6.

As shown in FIG. 12, a light spot SP of a reflected light beam formed in the two-segment holographic pattern 40 is in an elliptical shape having its minor axis extending along a dividing line J and its major axis extending in a direction perpendicular to the dividing line J.

Consequently, the quantity of a diffracted light beam impinging on the center of each of patterns 1a and 1b in the holographic pattern 40 is larger than the quantity of a diffracted light beam impinging on both ends thereof.

Therefore, the light intensity at the center of each of the semi-circular light spots Sa and Sb formed on the four-segment photodetection part 60 is higher than the light intensity at both ends thereof, as shown in FIG. 13. Specifically, when the optical disk 1 is too near, as shown in FIG. 13(a), the difference between the quantity of light received in the photodetection part A by the light spot Sa and the quantity of light received in the photodetection part B by the light spot Sa is increased, and the difference between the quantity of light received in the photodetection part C by the light spot Sb and the quantity of light received in the photodetection part D by the light spot Sb is increased, as shown in FIG. 13(a). On the other hand, when the optical disk 1 is too far, as shown in FIG. 13(c), the difference between the quantity of light received in the photodetection part B by the light spot Sa and the quantity of light received in the photodetection part A by the light spot Sa is increased, and the difference between the quantity of light received in the photodetection part D by the light spot Sb and the quantity of light received in the photodetection part C by the light spot Sb is increased.

The light intensity is thus concentrated on a portion contributing to the focus error signal FE in the four-segment photodetection part 60, thereby making it possible to obtain a higher level of the focus error signal FE.

Figure 14:
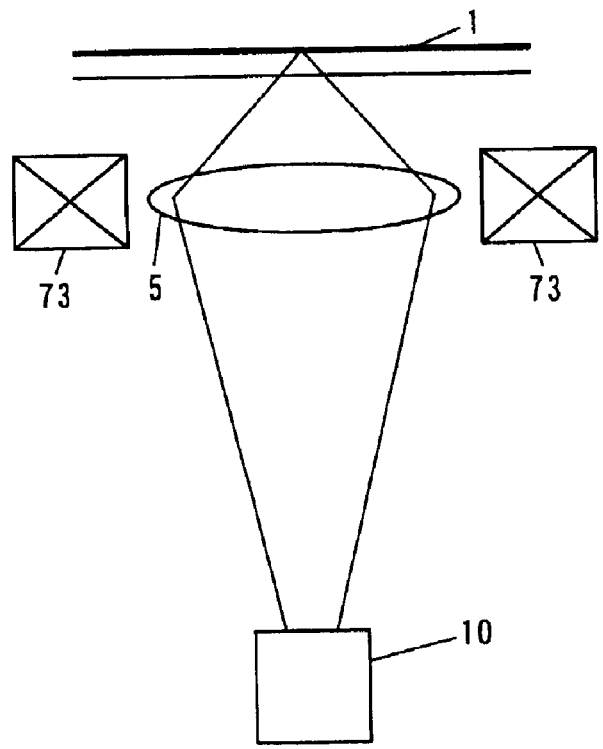
FIG. 14 is a schematic view showing a first example of the arrangement of a holographic unit in the optical pickup apparatus in each of the first to sixth embodiments.
Figure 15:
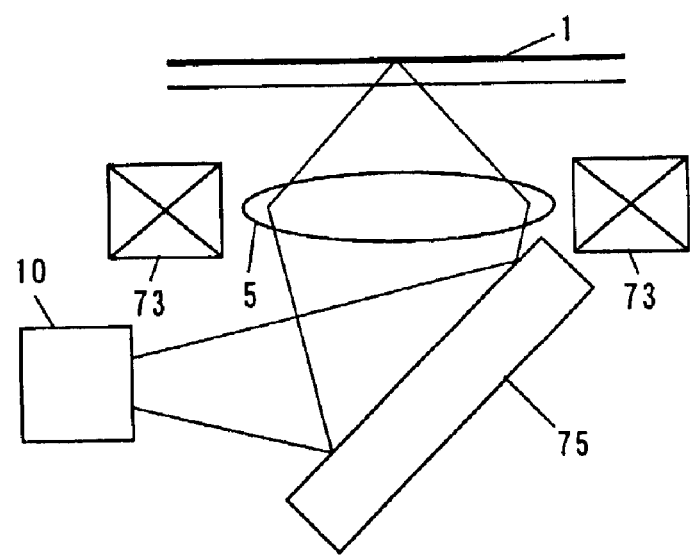
FIG. 15 is a schematic view showing a second example of the arrangement of a holographic unit in the optical pickup apparatus in each of the first to sixth embodiments.

FIG. 14 is a schematic view showing a first example of the arrangement of a holographic unit 10 in each of the optical pickup apparatuses according to the first to sixth embodiments. FIG. 15 is a schematic view showing a second example of the arrangement of the holographic unit 10 in each of the optical pickup apparatuses according to the first to sixth embodiments.

In the example shown in FIG. 14, a laser is emitted perpendicularly to an optical disk 1 from the holographic unit 10, and is condensed on a recording medium of the optical disk 1 by an objective lens 5. In the example shown in FIG. 15, a laser is emitted parallel to the optical disk 1 from the holographic unit 10, is reflected perpendicularly to the optical disk 1 by a reflecting mirror 75, and is condensed on a recording medium surface of the optical disk 1 by an objective lens 5. In the example shown in FIG. 15, the optical pickup apparatus can be reduced in thickness.

Figure 16:
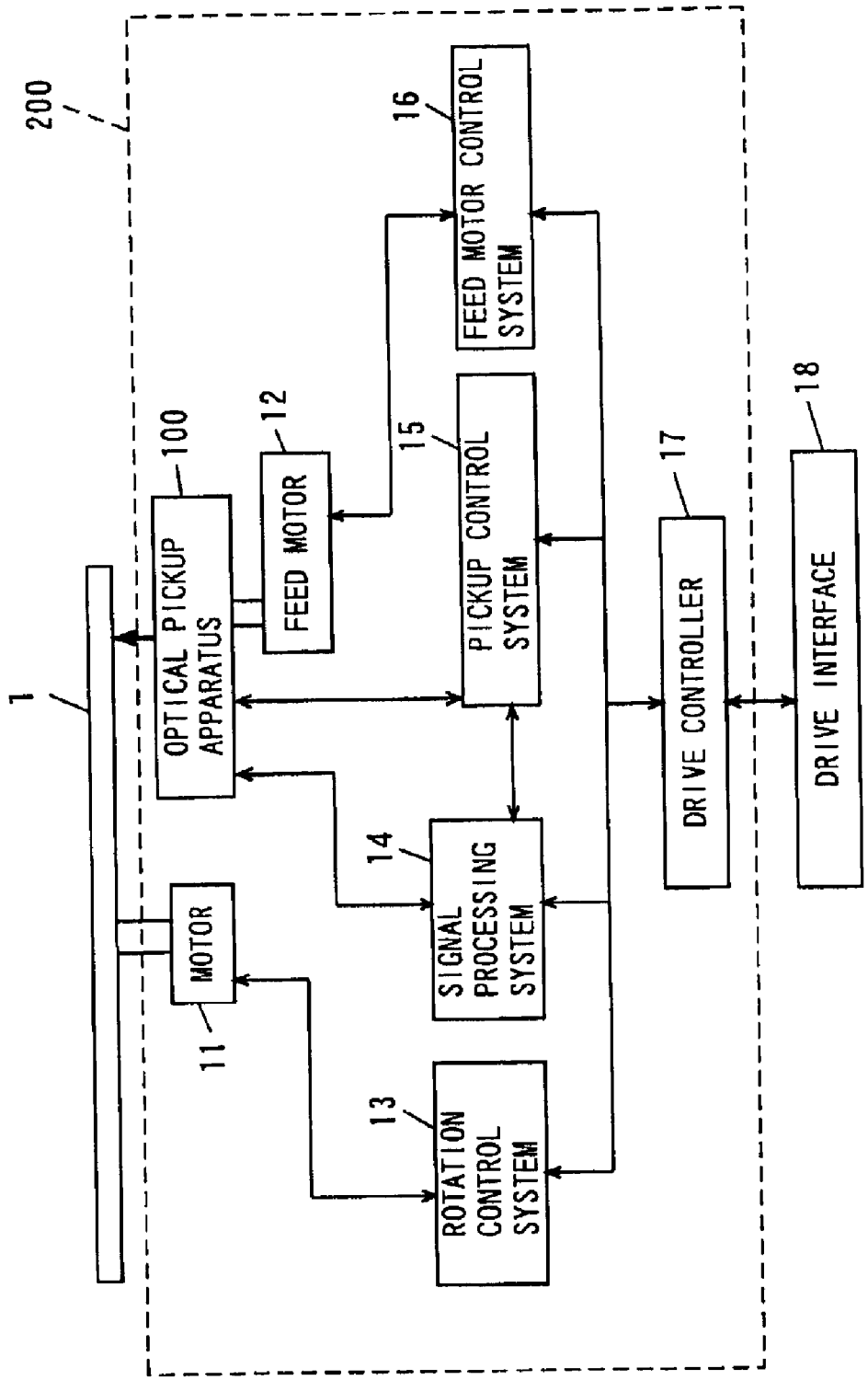
FIG. 16 is a block diagram showing the configuration of an optical recording medium drive using the optical pickup apparatus.

FIG. 16 is a block diagram showing the configuration of an optical recording medium drive 200 using the optical pickup apparatus 100 according to the above-mentioned embodiment. The optical recording medium drive 200 shown in FIG. 16 is an optical disk drive that reads information from the optical disk 1.

The optical recording medium drive 200 comprises the optical pickup apparatus 100, a motor 11, a feed motor 12, a rotation control system 13, a signal processing system 14, a pickup control system 15, a feed motor control system 16, and a drive controller 17.

The motor 11 rotates the optical disk 1 at a predetermined speed. The rotation control system 13 controls the rotating operation of the motor 11. The feed motor 12 moves the optical pickup apparatus 100 in the radial direction of the optical disk 1. The feed motor control system 16 controls the operation of the feed motor 12. The optical pickup apparatus 100 irradiates the optical disk 1 with a laser and receives a reflected light beam from the optical disk 1. The pickup control system 15 controls the projecting/photoreceiving operation of the optical pickup apparatus 100.

The signal processing system 14 calculates a reproduction signal, a focus error signal, and a tracking error signal upon receipt of an output signal from the photodetector 6 in the optical pickup apparatus 100, to feed the reproduction signal to the drive controller 17, while feeding the focus error signal and the tracking error signal to the pickup control system 15. The drive controller 17 controls the rotation control system 13, the signal processing system 14, the pickup control system 15, and the feed motor control system 16 in accordance with instructions given through a drive interface 18, and outputs the reproduction signal through the drive interface 18.

The optical recording medium drive 200 shown in FIG. 16 employs the optical pickup apparatus 100 according to the above-mentioned embodiment, thereby obtaining a focus error signal and a reproduction signal which are stable and are high in intensity. Consequently, focus servo control is performed with high accuracy, thereby obtaining a high-quality reproduction signal.

Although in the above-mentioned embodiment, the transmission-type holographic optical element is employed, a reflection-type holographic optical element may be used.

In the present embodiment, the motor 11 and the rotation control system 13 correspond to a rotation driving unit, the feed motor 12 and the feed motor control system 16 correspond to a pickup driving unit, and the signal processing system 14 corresponds to a signal processing unit.

(Eighth Embodiment)

The configuration and the operations of a position shift sensor according to an eighth embodiment will be described on the basis of FIGS. 17 and 18.

The position shift sensor according to the present embodiment detects the shift in the position of an object to be examined, for example, a product conveyed by a belt conveyer, for example.

Figure 17:
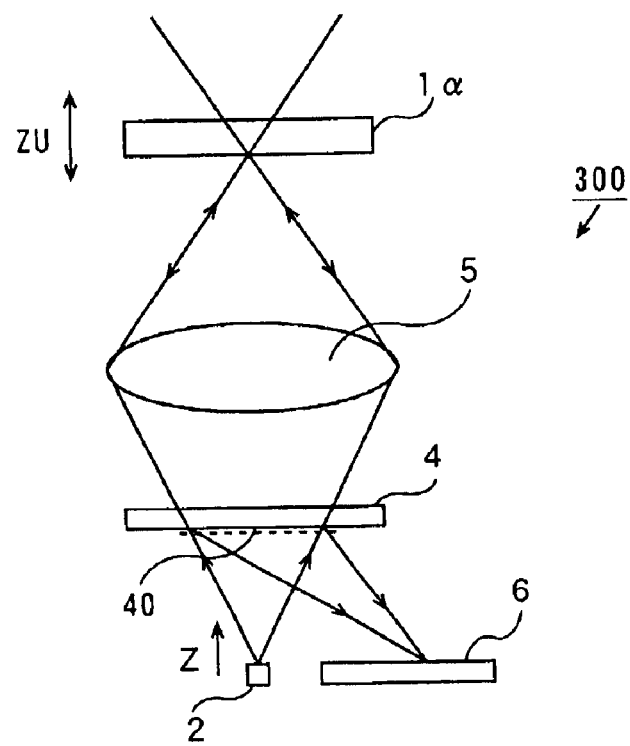
FIG. 17 is a schematic view showing the configuration of a position shift sensor according to an eighth embodiment.
Figure 18:
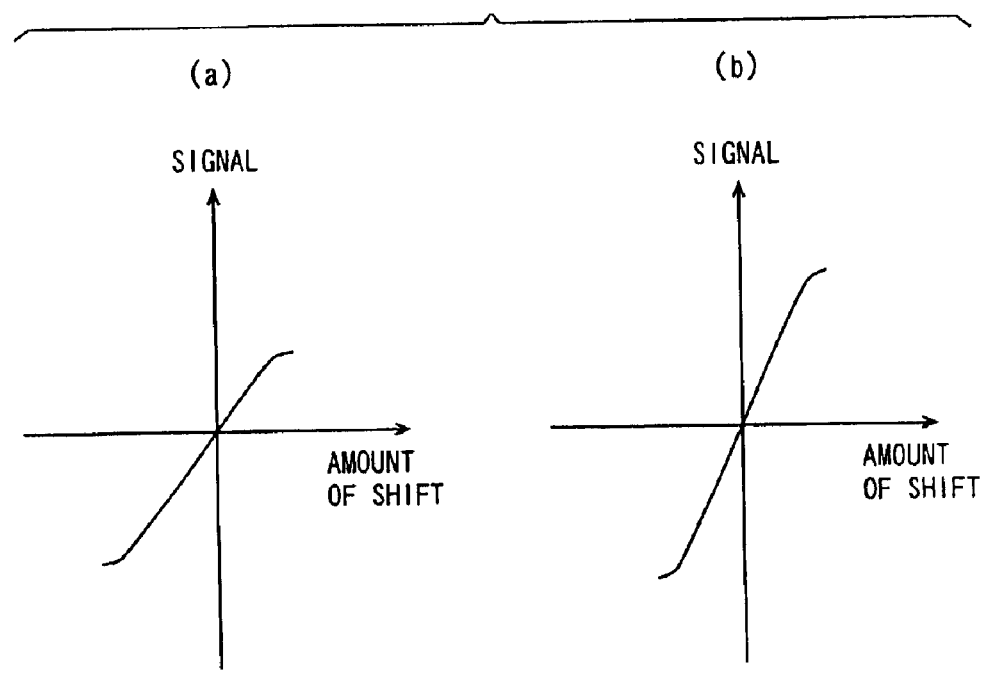
FIG. 18 is a diagram showing the relationship between an output signal from a photodetector and the amount of shift in the position of an object to be detected depending on the function of a holographic pattern.

FIG. 17 is a schematic view showing the configuration of a position shift sensor 300 according to the eighth embodiment.

In FIG. 17, the position shift sensor 300 comprises a semiconductor laser device 2, a transmission-type holographic optical element 4, an objective lens 5, and a photodetector 6. A holographic pattern 40 is formed on a holographic surface in the transmission-type holographic optical element 5.

In the above-mentioned configuration of the position shift sensor 300, the semiconductor laser device 2 emits a laser beam in a direction indicated by an arrow Z. The laser beam emitted by the semiconductor laser device is transmitted through the transmission-type holographic optical element 4, to impinge on the objective lens 5. The laser beam which has impinged on the objective lens 5 is condensed on a predetermined position of an object to be detected 1α while being transmitted through the objective lens 5.

The laser beam condensed on the object to be detected 1α is reflected on a point of incidence of the object to be detected 1α, to impinge on the objective lens 5 again. The laser beam reflected by the object to be detected 1α is transmitted through the objective lens 5, to impinge on the transmission-type holographic optical element 4. The laser beam transmitted through the transmission-type holographic optical element 4 is diffracted in a particular direction by the holographic pattern 40 in the transmission-type holographic optical element 4. The laser beam diffracted by the holographic pattern 40 impinges on the photodetector 6.

When the object to be detected 1α is shifted in a direction indicated by an arrow ZU, for example, the angle of rotation of a light spot on the photodetector 6 changes, as shown in FIG. 4. Consequently, the position shift sensor 300 judges the position of the shift in the object to be detected 1α.

The above-mentioned configuration of the photodetector 6 is the same as the configuration of the photodetector 6 in the above-mentioned optical pickup apparatus 100 according to each of the first to seventh embodiments. In the present embodiment, the holographic pattern 40 provided in the transmission-type holographic optical element 4 is the same as the holographic pattern 40 in each of the first to seventh embodiments.

The holographic pattern 40 used in the present embodiment, as described above, can diffract the incident light beam in the direction of twisting. The above-mentioned position shift sensor 300 diffracts the reflected light beam from the object to be detected 1α in the direction of twisting, and detects the diffracted reflected light beam using the photodetector 6, to detect the shift in the position. The position shift sensor 300 using the holographic pattern 40 having the function of diffracting a reflected light beam in the direction of twisting will be compared with the other optical position shift sensors.

The position shift sensor 300 according to the present embodiment uses a hologram so that the overall size thereof can be made smaller, as compared with an optical position shift sensor utilizing trigonometry.

The position shift sensor 300 according to the present embodiment has a larger allowable error at the time of fabricating a holographic pattern, so that the fabrication thereof is easier, as compared with a position shift sensor comprising a holographic pattern based on the Foucault method.

Furthermore, the position shift sensor 300 according to the present embodiment is superior in linearity of an output signal corresponding to the amount of shift, as compared with a position shift sensor utilizing a holographic pattern by the astigmatism method, as described below.

FIG. 18(a) illustrates the relationship between an output signal from a photodetector in the position shift sensor utilizing a holographic pattern by the astigmatism method and the amount of shift in the position of an object to be detected. In FIG. 18(a), a curve representing the relationship between the output signal and the amount of shift in the position is asymmetric with respect to the origin. FIG. 18(b) illustrates the relationship between an output signal from a photodetector in the position shift sensor 300 according to the eighth embodiment and the amount of shift in the position of the object to be detected. In FIG. 18(b), a curve representing the relationship between the output signal and the amount of shift in the position is symmetric with respect to the origin.

The position shift sensor 300 according to the present embodiment is thus superior in the linearity of the output signal corresponding to the amount of shift in the position, thereby making it possible to more stably detect the shift in the position without errors, as compared with the position shift sensor utilizing a holographic pattern by the astigmatism method.

(Method of Fabricating Holographic Patten)

Description is now made of a method of fabricating a holographic pattern. A method of designing the holographic pattern will be first described.

Figure 19:
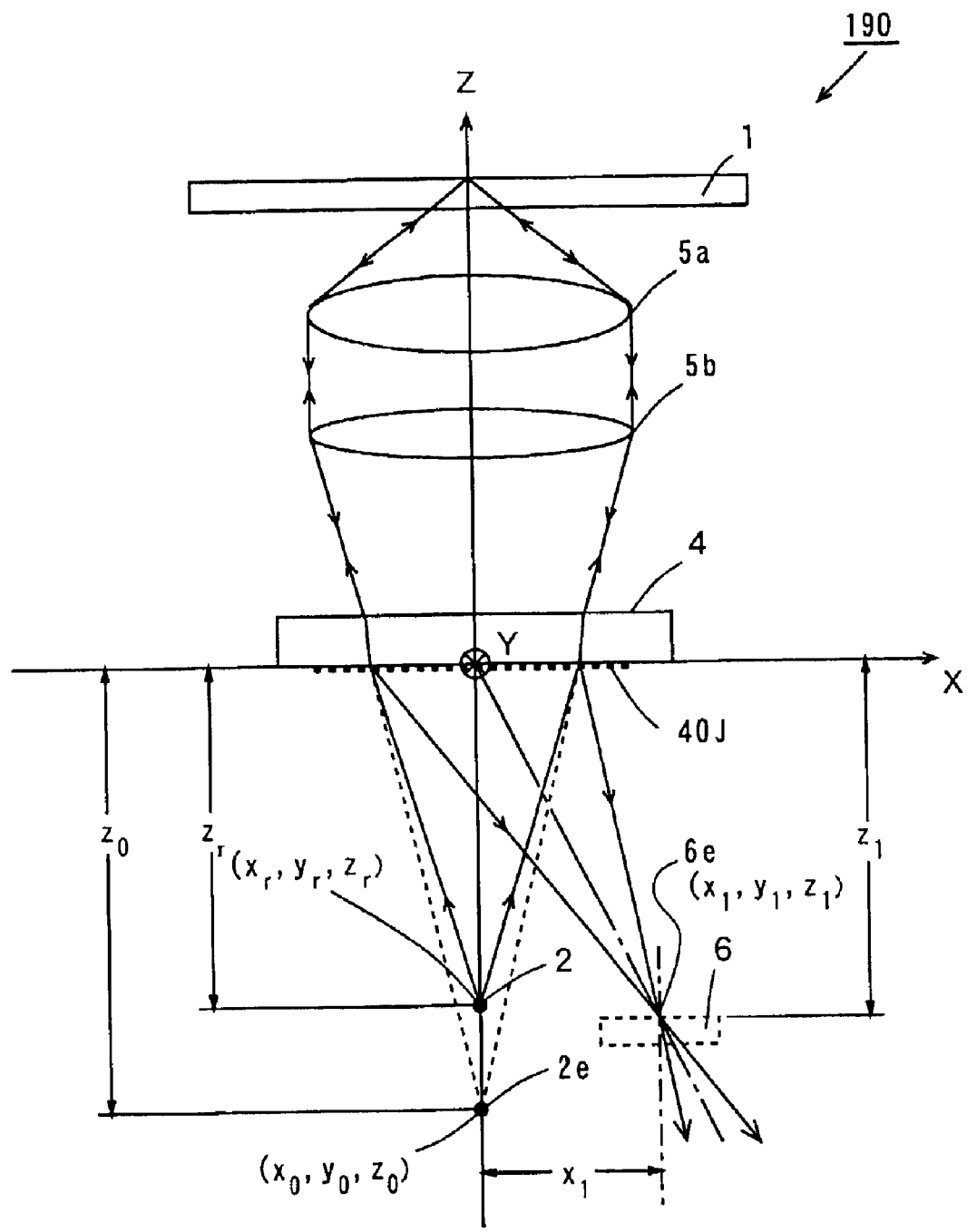
FIG. 19 is a schematic view showing the typical configuration of an optical pickup apparatus using a holographic optical element.

FIG. 19 is a schematic view showing the typical configuration of an optical pickup apparatus using a holographic optical element. A conventional method of designing a holographic pattern will be first described on the basis of FIG. 19, and the holographic pattern according to an embodiment of the present invention will be then described.

An optical pickup apparatus 190 shown in FIG. 19 comprises an optical disk 1, a semiconductor laser device 2, a holographic optical element 4, a collimator lens 5b, an objective lens 5a, and a photodetector 6. A holographic pattern 40J is formed on a holographic surface of the holographic optical element 4.

In FIG. 19, the Z-axis is defined in a direction perpendicular to the optical disk 1, and the X-axis is defined in a direction perpendicular to the Z-axis. Further, the Y-axis is defined in a direction perpendicular to an XZ plane.

In FIG. 19, a light beam emitted in the Z-axis direction from the semiconductor laser device 2 toward the optical disk 1 impinges on the optical disk 1 through the holographic optical element 4, the collimator lens 5b, and the objective lens 5a. The reflected light beam from the optical disk 1 is further transmitted through the holographic optical element 4 via the objective lens 5a and the collimator lens 5b. The reflected light beam which has been transmitted through the holographic optical element 4 is diffracted by the holographic pattern 40J, and is introduced into the photodetector 6. The holographic pattern 40J shown in FIG. 19 has the function of diffracting the reflected light beam and condensing the diffracted light beam on one point.

In FIG. 19, suppose the position where the light beam is emitted by the semiconductor laser device 2 is a laser beam source $P_r$ ($x_r$, $y_r$, $z_r$), a virtual convergent point of the reflected light beam from the optical disk 1 to impinge on the holographic optical element 4 is a virtual point 2e, and the coordinates of the virtual point 2e are ($x_0$, $y_0$, $z_0$). Further, suppose a convergent point of the reflected light beam diffracted by the holographic pattern 40J is a convergent point 6e, and the coordinates of the convergent point 6e are ($x_1$, $y_1$, $z_1$).

As described in the foregoing, the phase function $\Phi_i$ (x, y) of a light beam impinging on the holographic optical element 4 is given by the following equation:

$$\Phi_i(x,y)=k_0 n\{(x-x_0)^2+(y-y_0)^2+z_0^2\}^{1/2} \quad (12)$$

In the foregoing equation, x and y denote coordinates in a case where XY-coordinates are assumed on the holographic surface. $k_0$ denotes the wave number of a light beam, and $k_0=2\pi/\lambda$, letting $\lambda$ be its wavelength. Further, n denotes the refractive index of a substrate in the holographic optical element 4. In FIG. 19, a relationship of $Z_0=nZ_r$ holds between the Z-coordinate of the virtual point 2e and the Z-coordinate of the semiconductor laser device 2. This relationship holds, provided that the holographic pattern 40J is formed on a surface, on the side of a laser light source, of the transmission-type holographic optical element 4, as shown in FIG. 19.

On the other hand, the phase function $\Phi_d$ (x, y) of a laser beam diffracted by the holographic pattern 40J is given by the following equation:

$$\Phi_d(x,y)=k_0\{(x-x_1)^2+(y-y_1)^2+z_1^2\}^{1/2} \quad (13)$$

In the foregoing equation, x and y denote coordinates in a case where XY-coordinates are assumed on the holographic surface, as in the equation (12). $k_0$ denotes the wave number of a light beam, and $k_0=2\pi/\lambda$, letting $\lambda$ be its wavelength.

The pattern function of the holographic pattern 40J is given by the following equation by using the foregoing equations (12) and (13):

$$\phi_d(x,y)-\phi_i(x,y)=2m\pi+C \quad (14)$$

(x, y) in the foregoing equation denote coordinates in a case where XY-coordinates are assumed on the holographic surface, and a set of (x, y) satisfying the foregoing equation

(14) is a holographic pattern. In the foregoing equation (14), m is an integer, and is taken as a grating number. The grating number indicates a number assigned to each of lines (grating lines) in a pattern for interfering with an incident light beam.

As described in the foregoing, according to the equation (14), it is possible to easily obtain a holographic pattern having the function of condensing an incident light beam on one point. In the conventional example, however, when a holographic pattern having a function other than the function (astigmatism, etc.) of condensing the light beam on one point is designed, a polynomial is added to the left side of the equation (14). In this case, in order to obtain a holographic pattern having a desired function, simulation calculation for optimizing a coefficient in each term of the polynomial which is added to the left side must be repeated. Consequently, it has not been conventionally easy to analytically find an equation for obtaining a holographic pattern.

A method of designing a holographic pattern according to an embodiment of the present invention will be then described. According to a method of designing a holographic pattern, described later, a light beam impinging on an arbitrary point can be diffracted toward a desired point on a light receiving surface of a photodetector composed of a photodiode in accordance with a predetermined rule.

The holographic pattern has a phase type periodic structure, and is provided with a periodically rugged pattern on the substrate surface. The pattern is designed on the basis of a grating vector K or the like, described later, and is expressed with an equation consisting of the grating vector K.

Herein, a path of a light ray which is emitted from the laser light source in the optical pickup apparatus to finally impinge on the holographic surface and the light receiving surface of the photodetector is paid attention to, thereby changing the X-direction component and the Y-direction component of the grating vector K for performing predetermined diffraction into an equation.

Figure 20:
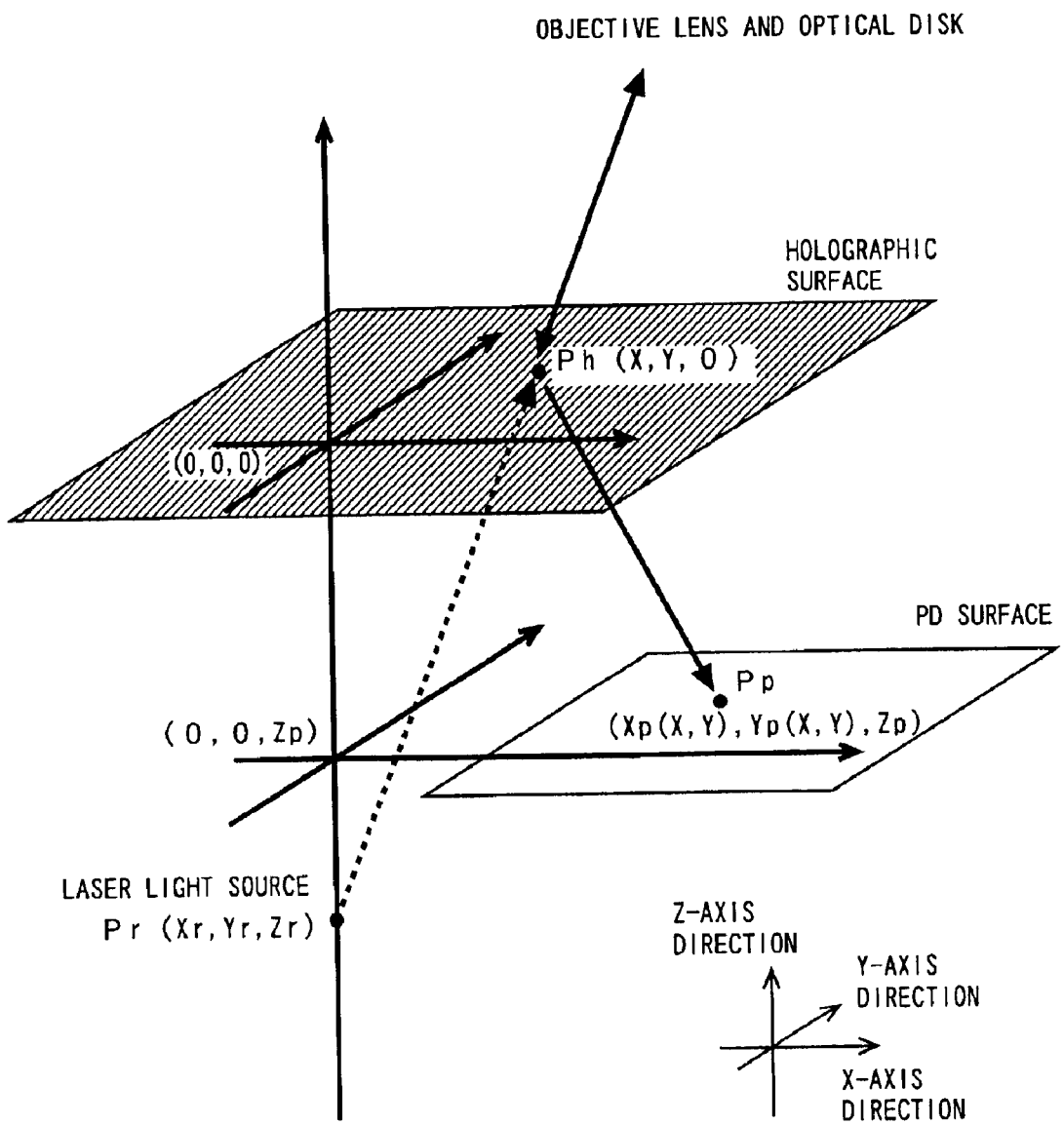
FIG. 20 is a schematic view showing a propagation path of a light ray emitted from a laser light source.

FIG. 20 is a schematic view showing a propagation path of a light ray emitted from a laser light source. Herein, a propagation path of a light ray in the optical pickup apparatus 100 shown in FIG. 1 is illustrated. FIG. 20 shows how a light ray emitted from a laser light source Pr (Xr, Yr, Zr) is transmitted through the transmission-type holographic optical element 4, to impinge on the optical disk 1 through the objective lens 5, and a reflected light ray from the optical disk 1 is then diffracted at a point Ph (X, Y, 0) on the holographic surface, to impinge on a point Pp (Xp(X, Y), Yp(X, Y), Zp) on the light receiving surface of the photodetector.

Herein, when the X-direction component of a grating vector K, described later, for performing predetermined diffraction is denoted by f (X, Y), and the Y-direction component thereof is denoted by g (X, Y), the X-direction component f (X, Y) and the Y-direction component g (X, Y) of the grating vector K for performing predetermined diffraction in the above-mentioned circumstances are expressed by the following equations, which are derived by geometrical consideration:

$$f(X, Y) = -k_0 \big[(X - Xp(X, Y)) \cdot \qquad (16)$$
$$\{(X - Xp(X, Y))^2 + (Y - Yp(X, Y))^2 + Zp^2\}^{-1/2} -$$
$$n(X - Xr) \cdot \{(X - Xr)^2 + (Y - Yr)^2 + Zr^2\}^{-1/2}\big]$$

-continued
$$g(X, Y) = -k_0 \big[(Y - Yp(X, Y)) \cdot \{(X - Xp(X, Y))^2 + \qquad (17)$$
$$(Y - Yp(X, Y))^2 + Zp^2\}^{-1/2} -$$
$$n(Y - Yr) \cdot \{(X - Xr)^2 + (Y - Yr)^2 + Zr^2\}^{-1/2}\big]$$

In the foregoing equations (16) and (17), $k_0$ denotes the wave number of a light beam. Herein, when $k_0$ is expressed by an equation, $k_0 = 2\pi/\lambda$. $\lambda$ denotes the wavelength of the light beam.

In the foregoing equations (16) and (17), suppose that converged light beam is incident on the transmission-type holographic optical element 4. When it is assumed that parallel light beam is incident on the transmission-type holographic optical element 4, the second term on the right side "$-n(X-Xr) \cdot \{(X-Xr)^2+(Y-Yr)^2+Zr^2\}^{-1/2}$" is not required in the foregoing equation (16), and the second term on the right side "$-n(Y-Yr) \cdot \{(X-Xr)^2+(Y-Yr)^2+Zr^2\}^{1/2}$" is not similarly required in the foregoing equation (17).

Furthermore, in the foregoing equations (16) and (17), n denotes the refractive index of a substrate in the holographic optical element 4. The refractive index n of the substrate is used, as expressed by the equations (16) and (17), in a case where the thickness of the substrate in the transmission-type holographic optical element 4 is considered and a case where the holographic pattern 40 is formed on a surface, on the side of the laser light source, of the transmission-type holographic optical element 4. Consequently, the refractive index n of the substrate in the equations (16) and (17) is not required when it is assumed that the thickness of the substrate in the transmission-type holographic optical element 4 is zero.

When the holographic pattern 40 is formed on a surface, on the side of the optical disk, of the transmission-type holographic optical element 4, the first term on the right side "$(X-Xp(X-Y)) \cdot \{(X-Xp(X-Y))^2+(Y-Yp(X,Y))^2+Zp^2\}^{-1/2}$" of the equation (16) and the first term on the right side "$(Y-Yp(X,Y)) \cdot \{(X-Xp(X,Y))^2+(Y-Yp(X,Y))^2+Zp^2\}^{-1/2}$" of the equation (17) must be multiplied by the refractive index n of the substrate, and the refractive index n by which the second term on the right side of the equation (16) and the second term on the right side of the equation (17) are multiplied must be eliminated. Further, in this case, the effective positions of the converging point of the reflected light beam from the optical disk and of the light receiving surface of the photodetector in the Z-axis direction are changed due to the effect of the substrate, so that "$Z_0$" and "Zp" must be corrected.

The equations (16) and (17) expressing the X-direction component f (X, Y) and the Y-direction component g (X, Y) of the grating vector K for performing predetermined diffraction, described above, are respectively integrated, thereby making it possible to design the holographic pattern 40. Various types of equations, described above, can be also applied to the design of another holographic pattern.

Figure 21:
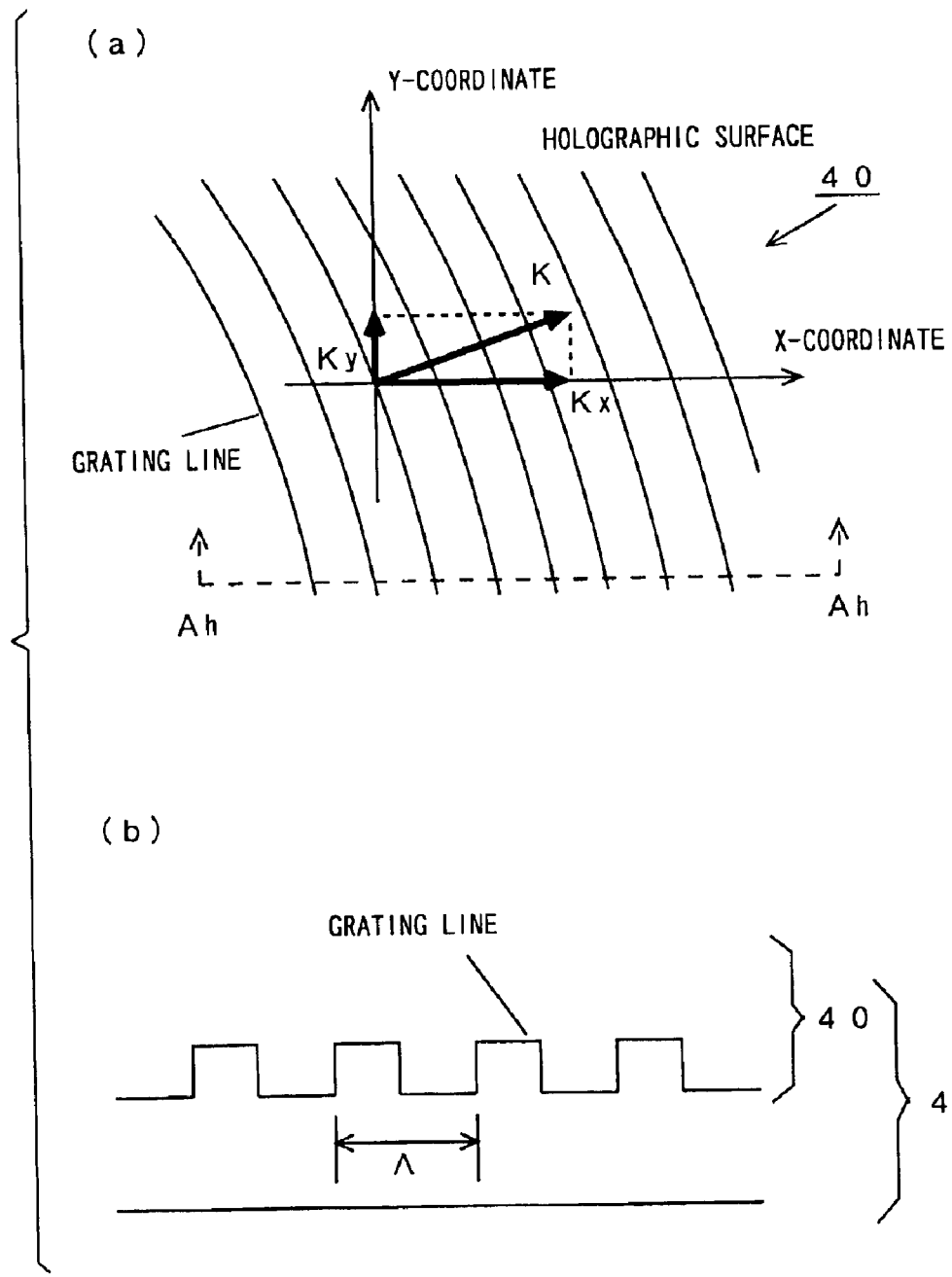
FIG. 21 is a an explanatory view of a grating vector in a holographic pattern.

Description is now made of the grating vector K. FIG. 21(a) is a plan view of a holographic surface having the holographic pattern 40 formed thereon, which illustrates a grating vector K in a case where the holographic surface is defined by XY-coordinates. Further, the X-direction component Kx (=f (X, Y) and the Y-direction component Ky (=g (X, Y)) of the grating vector K are also illustrated. A grating line is a planar set of specified positions (points) in one period of a rugged pattern shown in FIG. 21(b).

FIG. 21(b) is a cross-sectional view taken along a line Ah-Ah in FIG. 21(a), which illustrates the cross-sectional shape of the transmission-type holographic optical element 4 having the holographic pattern 40.

The grating vector K is a vector perpendicular to a set of gratings (grating lines) providing an incident light beam with particular diffraction. The magnitude of the grating vector K is expressed by the following equation, letting Λ be the period of the grating lines:

$$|K| = 2\pi/\Lambda \tag{18}$$

The relationship between the grating vector K and the grating line, described above, will be then described.

The holographic surface is defined by XY-coordinates, and it is assumed that a macroscopic diffraction direction is the X-axis direction. Herein, the Z-axis direction is a direction perpendicular to an XY plane, that is, the holographic surface.

At an arbitrary point (X, Y) on the holographic surface, the X-direction component Kx of the grating vector K for performing desired diffraction, as described above, is taken as f (X, Y), and the Y-direction component Ky is taken as g (X, Y). In this case, a holographic pattern is derived as a set of points (X', Y') satisfying the following equations (19) and (20), described below, on the basis of a constant point ($X_0$, $Y_0$) on the holographic surface. Herein, a set of points (X', Y') denotes the grating line of the holographic pattern:

$$\int_{X_0}^{X'} f(X, Y_0) dX + \int_{Y_0}^{Y'} g(X', Y) dY = 2\pi M + C \tag{19}$$

$$\int_{Y_0}^{Y'} g(X_0, Y) dY + \int_{X_0}^{X'} f(X, Y') dX = 2\pi M + C \tag{20}$$

In both the equations (19) and (20), M is an integer, and C is a constant.

In the equation (19), in the following first term on the left side indicates a phase difference in the X-direction of a grating period from the constant point ($X_0$, $Y_0$) in the XY plane which is the holographic surface to a point (X', $Y_0$):

$$\int_{X_0}^{X'} f(X, Y_0) dX$$

Further, the following second term on the left side indicates a phase difference in the Y-direction of the grating period from the point (X', $Y_0$) to the point (X', Y'):

$$\int_{Y_0}^{Y'} g(X', Y) dY$$

With respect to the left side of the equation (20), the first term indicates a phase difference in the Y-direction of a grating period from the constant point ($X_0$, $Y_0$) in the XY plane which is the holographic surface to a point ($X_0$, Y'), and the second term indicates a phase difference in the X-direction of a grating period from the point ($X_0$, Y') to the point (X', Y'), as in the equation (19).

Herein, the respective left sides of the equations (19) and (20) indicate the same contents of calculation, although they differ in the order of integration. The sum of the phase difference in the X-direction and the phase difference in the Y-direction represents a grating phase difference from the constant point ($X_0$, $Y_0$) to the point (X', Y') on the XY plane (the holographic surface). Consequently, a plurality of equiphase lines (lines between which there is a grating phase difference of an integral multiple of $2\pi$) to be given, that is, a set of grating lines is a holographic pattern. When the constant C in the second terms on the right sides of the foregoing equations (19) and (20) is set to zero, and the constant point ($X_0$, $Y_0$) is taken as the origin (0, 0), the calculation becomes easy.

The equations (16) and (17) expressing the X-direction component f (X, Y) and the Y-direction component g (X, Y) of the grating vector K for performing predetermined diffraction are applied to the foregoing equations (19) and (20), thereby making it possible to design the holographic pattern.

In this case, an arbitrary point on the holographic surface is caused to correspond to a desired point on the light receiving surface of the photodetector in accordance with a predetermined rule, thereby making it possible to easily and accurately design holographic patterns in various holographic optical elements having not only an astigmatism adding function in the conventional example but also complicated functions such as the function of "twisting a light beam".

The procedure for calculation using various types of equations will be described with reference to FIG. 22 on the basis of the method of designing the holographic pattern, described above.

Figure 22:
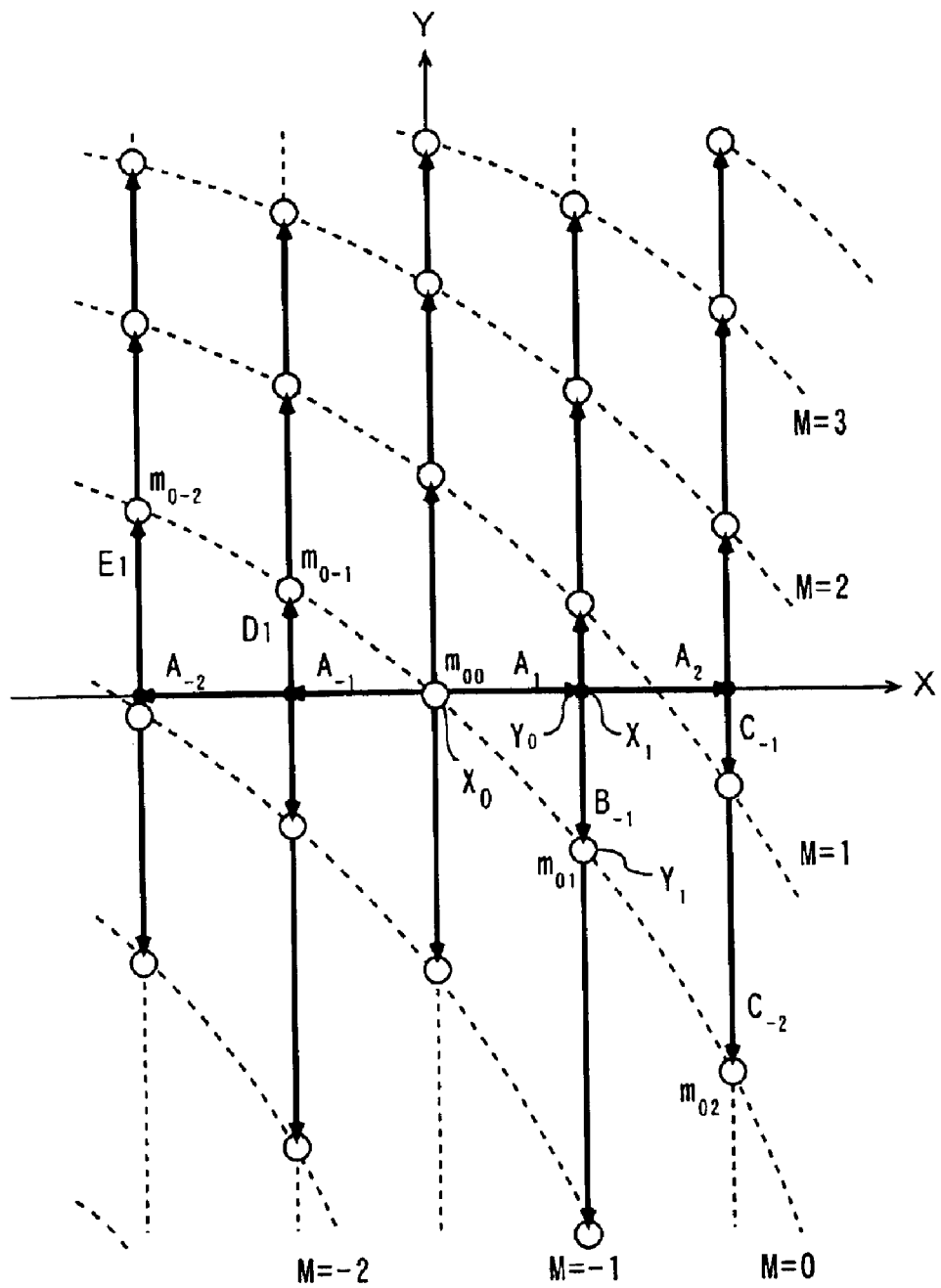
FIG. 22 is a diagram showing the procedure for determining a grating line in a design diagram of a holographic pattern.

FIG. 22 is a diagram showing the procedure for determining a grating line at the time of designing a holographic pattern.

The holographic pattern is designed by calculating a set of grating lines using the equation (19) or (20). Herein, in the equations (19) and (20), each of the grating lines is determined depending on the value of an integer M. The procedure for determining the grating lines in a case where M=0 using the equation (19) will be described.

In order to simplify the calculation, in the equation (19), a constant point ($X_0$, $Y_0$) on a holographic surface is taken as (0, 0), and a constant C in the second term on the right side is taken as 0.

In FIG. 22, a reference point of the grating line in a case where M=0 is taken as $m_{00}$ (0, 0). First, integration from $X_0$=0 to X'=$X_1$ (arbitrary) is performed, as shown in the first term on the left side of the equation (19). This work is indicated by an arrow $A_1$ in FIG. 22. Integration is then gradually performed in the Y direction from $Y_0$=0, as shown in the second term on the left side, to determine the value of Y' satisfying the equation (19). This work is indicated by an arrow $B_{-1}$ in FIG. 22.

By the foregoing work, a point $m_{01}$ is determined subsequently to the point $m_{00}$ on the grating line in the case where M=0. The above-mentioned work is repeatedly performed, thereby determining a plurality of points on the grating line in the case where M=0. For example, a point $m_{02}$ on the grating line in the case where M=0 is determined by integrating X-direction components indicated by arrows $A_1$ and $A_2$ and integrating Y-direction components indicated by arrows $C_{-1}$ and $C_{-2}$. Further, a point $m_{0-1}$ on the grating line in the case where M=0 is determined by integrating an X-direction component indicated by an arrow $A_{-1}$ and integrating a Y-direction component indicated by an arrow $D_1$, and a point $m_{0-2}$ is determined by integrating X-direction components indicated by arrows $A_{-1}$ and $A_{-2}$ and integrating a Y-direction component indicated by an arrow $E_1$.

The foregoing is the procedure for determining the grating line in the case where M=0 using the equation (19). Thereafter, as to cases other than the case where M=0, the same work as described above is also performed to determine a plurality of grating lines. Consequently, a set of grating lines can be obtained, thereby making it possible to design the holographic pattern.

The holographic pattern determined by the holographic pattern designing method is formed on a surface of a substrate composed of a transparent quartz glass by a photolithographic process and an etching process.

For example, a photoresist is applied over the surface of the substrate. The photoresist is patterned by being exposed to ultraviolet rays through a photomask, and the substrate is etched, thereby forming the holographic pattern on the substrate.

The specific procedure for designing holographic patterns having various functions will be described on the basis of the above-mentioned holographic pattern designing method.

First, the procedure for designing a holographic pattern having the function of twisting an incident light beam will be described on the basis of FIGS. 23 to 25.

Figure 23:
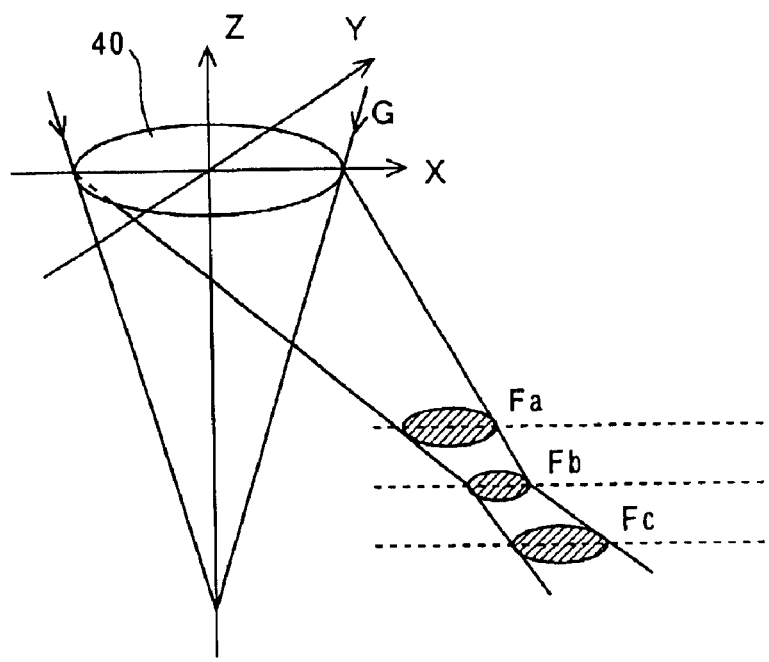
FIG. 23 is a schematic view showing situations where an incident light beam is diffracted in the direction of twisting by a holographic pattern.

FIG. 23 is a schematic view showing situations where an incident light beam is diffracted in the direction of twisting by the holographic pattern. FIG. 24 is a schematic view showing the shape of a light spot based on the diffracted light beam at a particular position shown in FIG. 23. In FIG. 23, XY-coordinates are defined parallel to the holographic pattern, and a Z-coordinate is defined in a direction perpendicular to the holographic pattern. FIG. 24 shows the shape of a light spot based on the diffracted light beam on a plane parallel to a plane having the XY-coordinates defined in FIG. 23.

Figure 24:
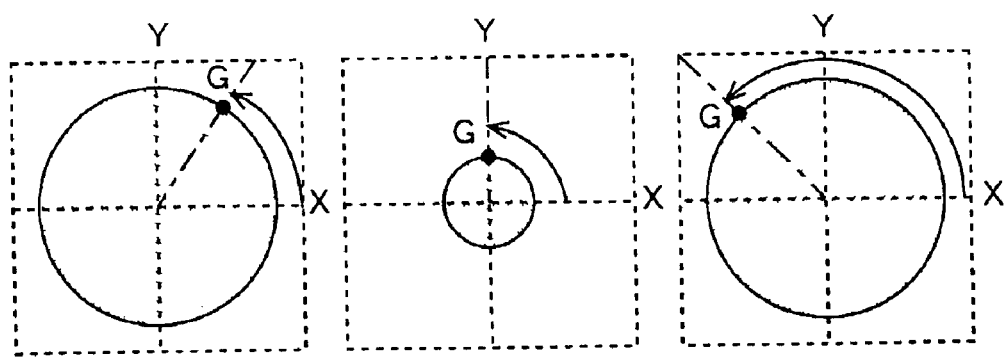
FIG. 24 is a schematic view showing the shape of a light spot based on a diffracted light beam at a particular position shown in FIG. 23.

In FIGS. 23 and 24, the incident light beam is converged while being twisted by being diffracted in the holographic pattern. The diffracted light beam from the holographic pattern forms a focal point at a position Fb.

Suppose a case where the holographic pattern has the function of twisting the incident light beam by 90° and converging the twisted incident light beam to a predetermined size.

As shown in FIG. 24(b), light impinging on a holographic pattern 40 in a direction indicated by an arrow G is twisted by 90° at a position Fb which is its focal point and is converged to a predetermined size. At a position Fa nearer from the focal point shown in FIG. 23, light impinging on the holographic pattern 40 in the direction indicated by the arrow G is twisted by an angle which is less than 90°, as shown in FIG. 24(a). Further, at a position Fc farther from the focal point shown in FIG. 23, light impinging on the holographic pattern 40 in the direction indicated by the arrow G is twisted by an angle exceeding 90°, as shown in FIG. 24(c). As shown in FIGS. 24(a) and 24(c), the incident light beam is not converged to a predetermined size at the positions Fa and Fc which are shifted from the focal point position.

Figure 25:
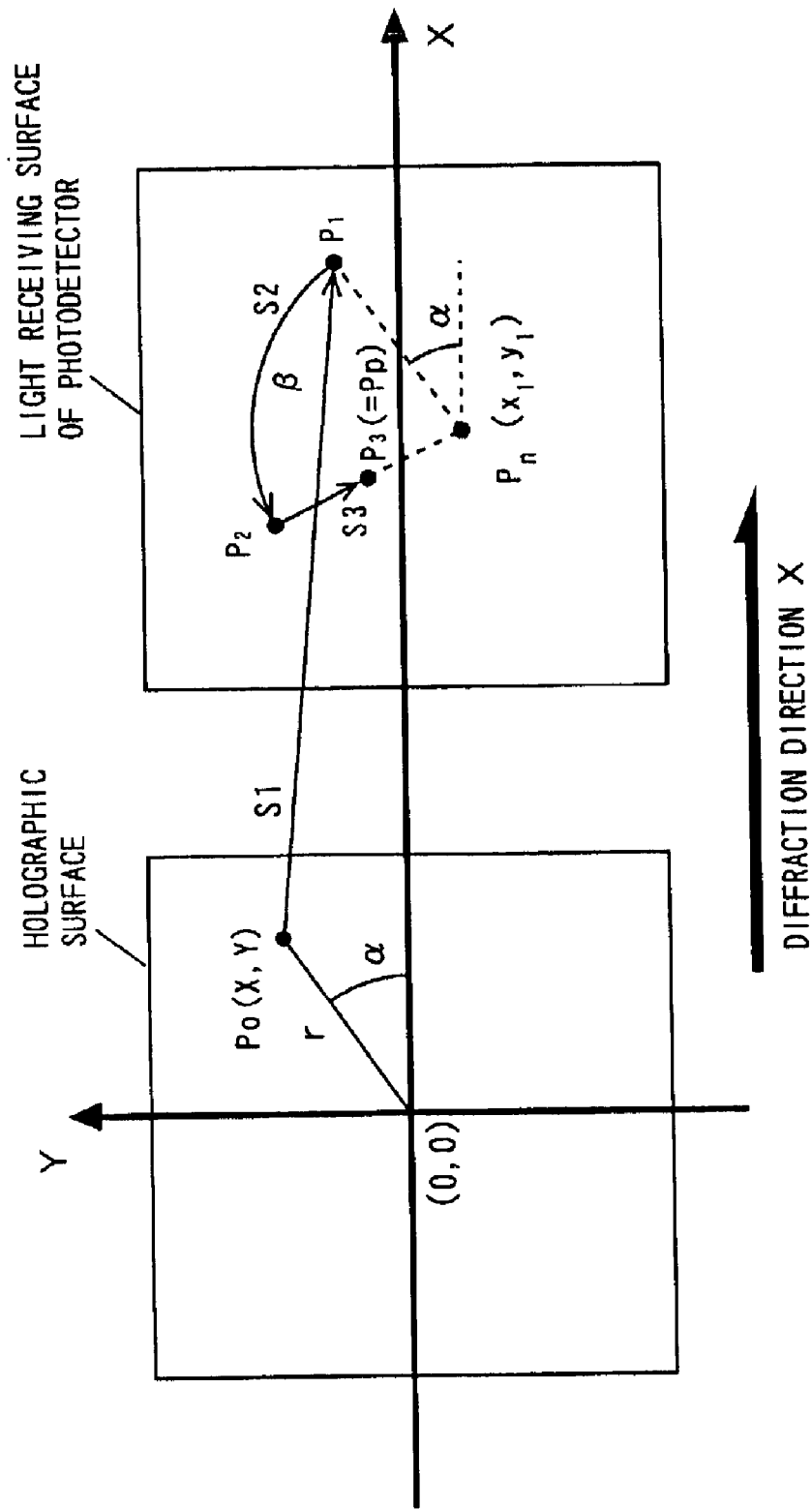
FIG. 25 is a plan view showing the position of a light ray impinging on a holographic surface and the position of a light ray, on a light receiving surface of a photodetector, which has been diffracted by a holographic pattern in a case where the holographic surface is defined as an XY plane.

FIG. 25 is a plan view showing the position of a light ray impinging on a holographic surface in a case where the holographic surface is defined as an XY plane and the position of a light ray, on a light receiving surface of a photodetector, while has been diffracted by the holographic pattern. In FIG. 25, displacement in the Z-axis direction will be ignored.

Herein, the object is to calculate a point $Pp$ ($Xp(X, Y)$, $Yp(X, Y)$), on the light receiving surface of the photodetector, which corresponds to an arbitrary point $P_0$ ($X, Y$) on the holographic surface.

First, consider which point on the light receiving surface of the photodetector corresponds to the arbitrary point $P_0$ ($X, Y$) on the holographic surface. Herein, the point $P_0$ is translated by $x_1$ in the X-axis direction and $y_1$ in the Y-axis direction to a position on the light receiving surface (step S1). ($X+x_1$, $Y+y_1$) determined in the step S1 is taken as a point $P_1$. Coordinates denoted by ($x_1$, $y_1$) are taken as a point $P_n$.

The point $P_1$, is then rotated through an angle of $\beta$ centered at the point $P_n$ (step S2). This operation corresponds to the function of "rotating (twisting)" a light beam. When a point after the movement is taken as a point $P_2$, the coordinates of the point $P_2$ are represented by ($r \cos(\alpha+\beta)+x_1$, $r \sin(\alpha+\beta)+y_1$).

Herein, r denotes a distance "$(X^2+Y^2)^{1/2}$" from the origin to the point $P_0$. On the other hand, $\alpha$ denotes an angle formed between a straight line connecting the point $P_0$ and the origin and the X-axis direction which is the diffraction direction, and is represented by "arctan(Y/X)".

Furthermore, the distance between the point ($x_1$, $y_1$) and the point $P_2$ is shortened (step S3). This operation is work for adjusting the size of a spot on the light receiving surface of the photodetector. That is, letting R be a reduction ratio, the coordinates of a point $P_3$ after the reduction are represented by ($Rr \cos(\alpha+\beta)+x_1$, $Rr \sin(\alpha+\beta)+y_1$). Herein, R denotes the reduction ratio, and is a value obtained by dividing "the distance from the point $P_n$ to the point $P_3$" by "the distance from the point $P_n$ to the point $P_2$".

From the foregoing, the XY-coordinates of the point $P_3$ ($Xp(X, Y)$, $Yp(X, Y)$) are respectively derived by the following equations (21) and (22):

$$Xp(X,Y)=R(X^2+Y^2)^{1/2} \cos[\arctan(Y/X)+\beta]+x_1 \qquad (21)$$

$$Yp(X,Y)=R(X^2+Y^2)^{1/2} \sin[\arctan(Y/X)+\beta]+y_1 \qquad (22)$$

In the above-mentioned embodiment, $y_1=0$, and $\beta=90°$

The X-direction component f (X, Y) and the Y-direction component g (X, Y) of the grating vector K are respectively derived by the equations (16) and (17) on the basis of the results found by the foregoing equations (21) and (22). Further, a holographic pattern having the function of twisting an incident light beam is obtained by using the equation (19) or (20) on the basis of the results.

Second, the procedure for designing a holographic pattern having the function of providing an incident light beam with astigmatism will be described on the basis of FIGS. 26 to 28.

Figure 26:
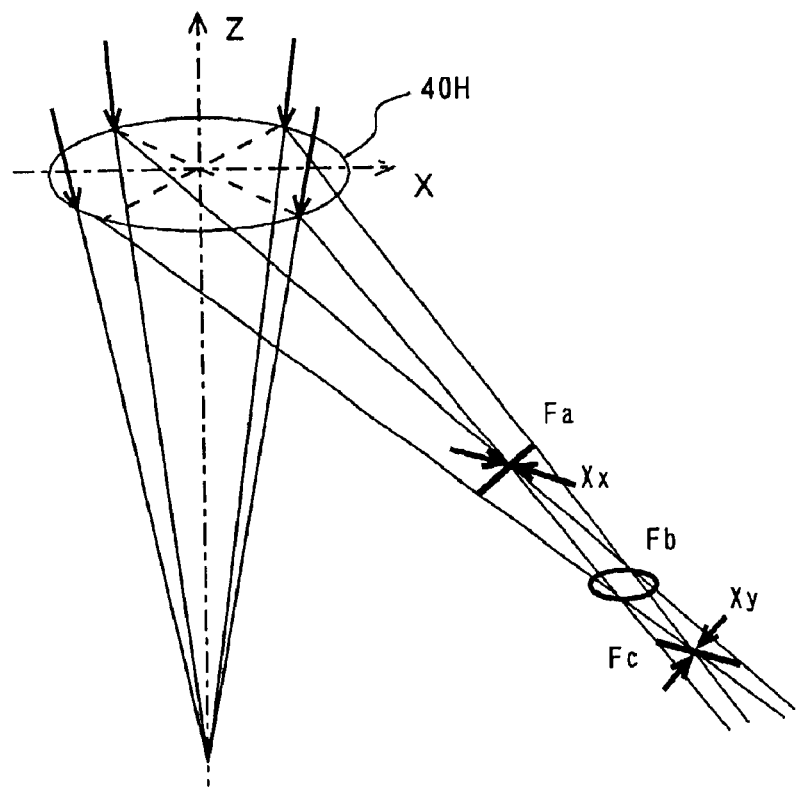
FIG. 26 is a schematic view showing situations where an incident light beam is provided with astigmatism by a holographic pattern.
Figure 27:
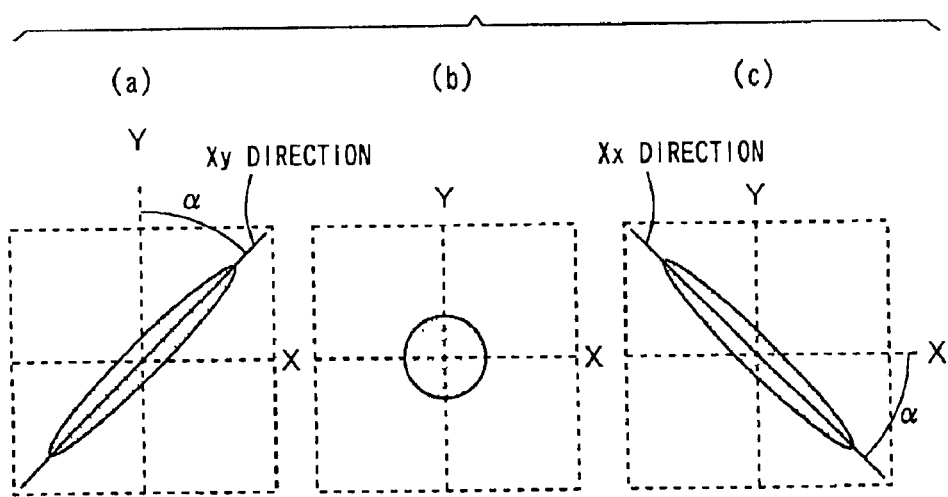
FIG. 27 is a schematic view showing the shape of a light spot based on a diffracted light beam at a particular position shown in FIG. 26.

FIG. 26 is a schematic view showing situations where an incident light beam is provided with astigmatism by a holographic pattern. FIG. 27 is a schematic view showing the shape of a light spot based on the diffracted light beam at a particular position shown in FIG. 26. In FIG. 26, XY-coordinates are defined parallel to the holographic pattern, and a Z-coordinate is defined in a direction perpendicular to the holographic pattern. FIG. 27 shows the shape of a light spot based on the diffracted light beam on a plane having the XY-coordinates defined in FIG. 26.

The diffracted light beam which has been provided with astigmatism by the holographic pattern differs in a focal point position between a direction Xx having a particular angle $\alpha$ to the diffraction direction X and a direction Xy perpendicular to the direction Xx. Therefore, the shape of the light spot is an ellipse extending in the Xy direction, as shown in FIG. 27(a), at a focal point position Fa in the Xx direction and is an ellipse extending in the Xx direction, as shown in FIG. 27(c), at a focal point position Fc in the Xy direction. The shape of the light spot is a circle, as shown in FIG. 27(b), at a position Fb intermediate between the focal point position Fa and the focal point position Fc.

Figure 28:
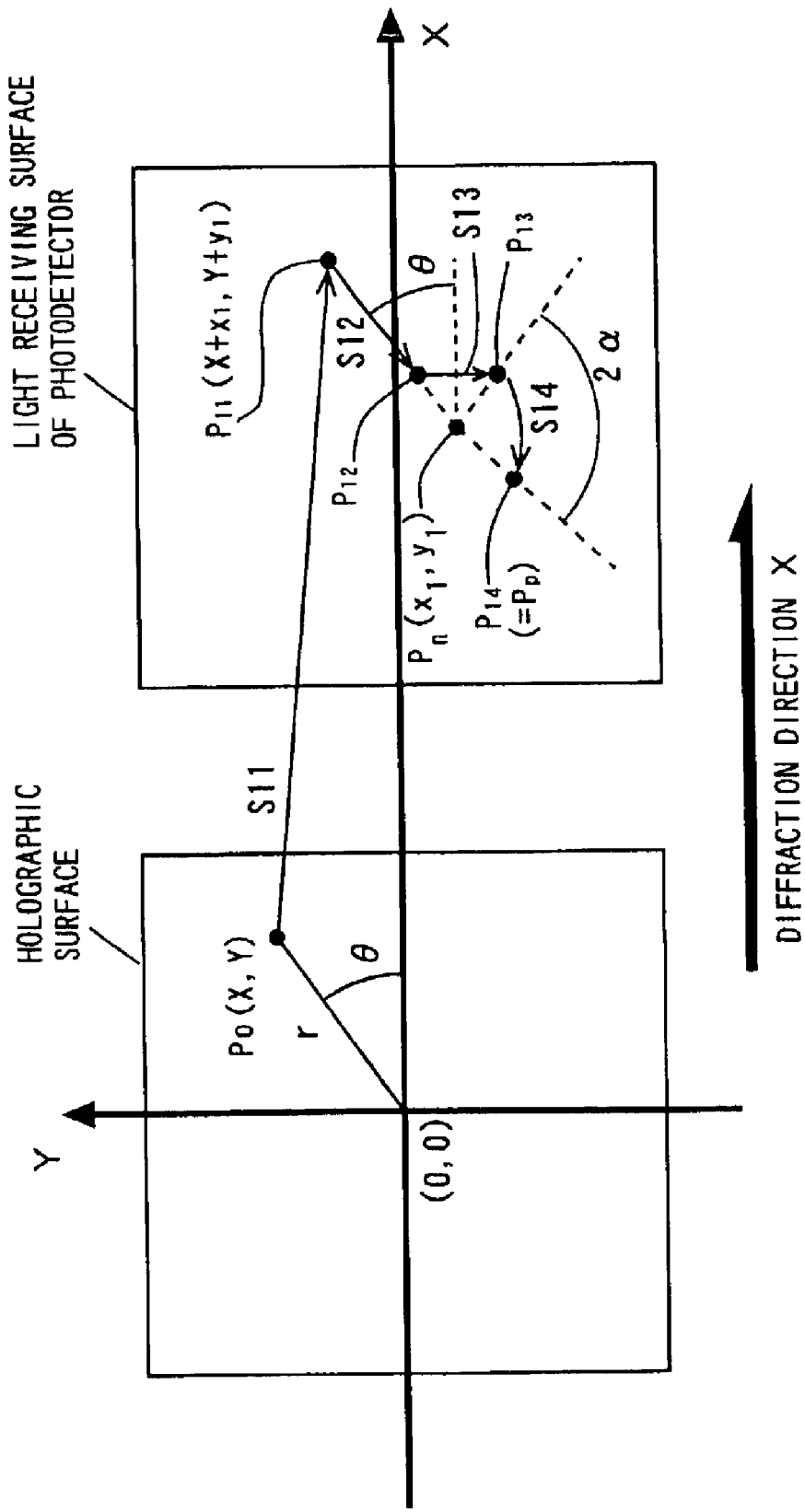
FIG. 28 is a plan view showing the position of a light ray impinging on a holographic surface and the position of a light ray, on a light receiving surface of a photodetector, which has been diffracted by a holographic pattern in a case where the holographic surface is defined as an XY plane.

FIG. 28 is a plan view showing the position of a light ray impinging on a holographic surface in a case where the holographic surface is defined as an XY plane and the position of a light ray, on a light receiving surface of a photodetector, which has been diffracted by the holographic pattern. In FIG. 28, displacement in the Z-axis direction will be ignored.

Herein, the object is to calculate a point Pp (Xp(X, Y), Yp(X, Y)), on the light receiving surface of the photodetector, which corresponds to an arbitrary point $P_0$ (X, Y) on the holographic surface.

First, consider which point on the light receiving surface of the photodetector corresponds to the arbitrary point $P_0$ (X, Y) on the holographic surface. Herein, the point $P_0$ is translated by $x_1$ in the X-axis direction and $y_1$ in the Y-axis direction to a position on the light receiving surface (step S11). The coordinates of a point $P_{11}$ determined in the step S11 is taken as $(X+x_1, Y+y_1)$. Coordinates denoted by $(x_1, y_1)$ are taken as a point $P_n$.

The point $P_{11}$ is then moved so as to approach the point $P_n$ in order to converge a light beam on a straight line connecting the point $P_{11}$ and the point $P_n$ (step S12). When a point after the movement in the step S12 is taken as a point $P_{12}$, the coordinates of the point $P_{12}$ are represented by (Rr $\cos(\theta)+x_1$, Rr $\sin(\theta)+y_1$). Herein, R denotes a reduction ratio, and is a value obtained by dividing "the distance from the point $P_n$ to the point $P_{12}$" by "the distance from the point $P_n$ to the point $P_{11}$". r denotes a distance "$(X^2+Y^2)^{1/2}$" from the origin to the point $P_0$. On the other hand, $\theta$ denotes an angle formed between a straight line connecting the point $P_0$ and the origin and the X-axis direction which is the diffraction direction, and is represented by "arctan(Y/X)".

Thereafter, the point $P_{12}$ determined in the step S12 is inverted with respect to a line parallel to the X-axis after passing through the point $P_n$. This operation corresponds to the function of "providing astigmatism" for a light beam. Consequently, the coordinates of a point $P_{13}$ after the inversion are (Rr $\cos(-\theta)+x_1$, Rr $\sin(-\theta)+y_1$).

By the above-mentioned operations in the steps S11 to S13, the light beam is provided with astigmatism, so that the light beam is converged. An operation for determining the aberration direction of astigmatism will be further described.

Suppose a case where the aberration direction of astigmatism which is provided for the light beam is set to a direction at an angle $\alpha$ to the X-axis. In this case, the point $P_{13}$ determined in the step S13 is moved by an angle of $2\alpha$ centered at the point $P_n$ (step S14). The coordinates of a point $P_{14}$ after the movement are (Rr $\cos(2\alpha-\theta)+x_1$, Rr $\sin(2\alpha-\theta)+y_1$). In the foregoing, when a counterclockwise direction is a positive direction, $\alpha$ has a negative value in the example shown in FIG. 28.

From the foregoing, the XY-coordinates of the point $P_P$ (Xp(X, Y), Yp(X, Y)), which corresponds to the point $P_0$ (X, Y) are respectively derived by the following equations (23) and (24):

$$Xp(X,Y)=R(X \cos 2\alpha+Y \sin 2\alpha)+x_1 \qquad (23)$$

$$Yp(X,Y)=R(X \sin 2\alpha-Y \cos 2\alpha)+y_1 \qquad (24)$$

The X-direction component f (X, Y) and the Y-direction component g (X, Y) of the grating vector K are respectively derived by the equations (16) and (17) on the basis of the results found by the foregoing equations (23) and (24). Further, a holographic pattern having the function of providing a light beam with astigmatism is obtained by using the equation (19) or (20) on the basis of the results.

Third, the procedure for designing a holographic pattern having the function of converging an incident light beam in an annular shape will be described on the basis of FIGS. 29 to 31.

Figure 29:
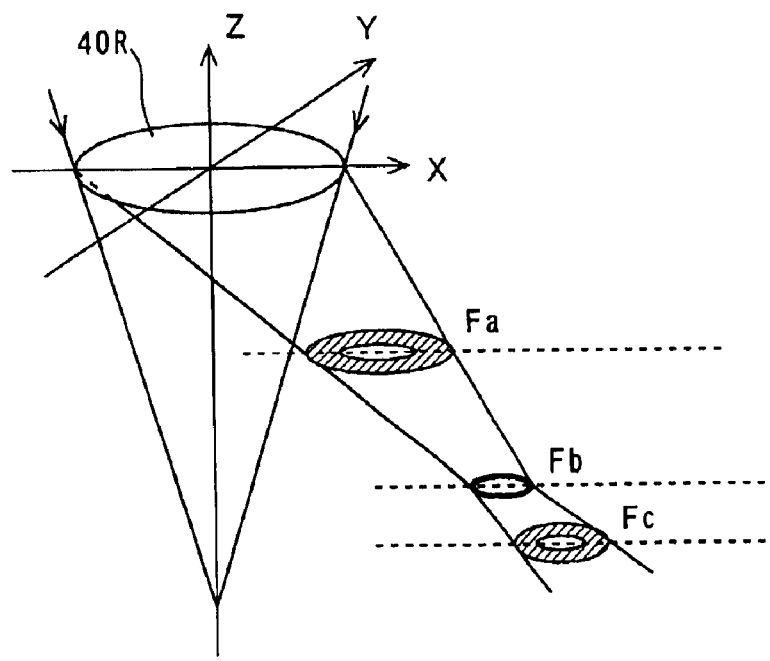
FIG. 29 is a schematic view showing situations where an incident light beam is converged in an annular shape by a holographic pattern.
Figure 30:
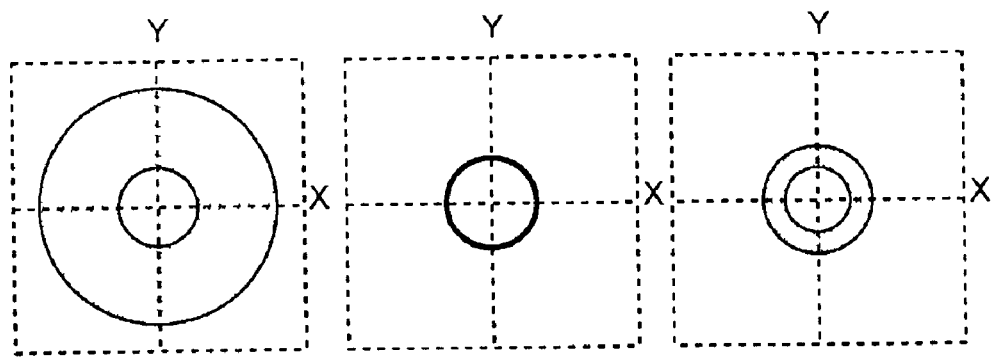
FIG. 30 is a schematic view showing the shape of a light spot based on a diffracted light beam at a particular position shown in FIG. 29.

FIG. 29 is a schematic view showing situations where an incident light beam is converged in an annular shape by a holographic pattern. FIG. 30 is a schematic view showing the shape of a light spot based on the diffracted light beam at a particular position shown in FIG. 29. In FIG. 29, XY-coordinates are defined parallel to the holographic pattern, and a Z-coordinate is defined in a direction perpendicular to the holographic pattern. FIG. 30 shows the shape of a light spot based on the diffracted light beam on a plane parallel to a plane having the XY-coordinates defined in FIG. 29.

As described in the foregoing, the incident light beam is converged in an annular shape by being diffracted in the holographic pattern. The diffracted light beam from the holographic pattern forms a focal point at a position Fb.

As shown in FIG. 30(b), light impinging on the holographic pattern forms an annular light spot composed of thin lines at a certain position Fb which is a focal point position. At a position Fa nearer from the focal point in FIG. 29, light impinging on the holographic pattern forms an annular light spot having a width. Further, at a position Fc farther from the focal point in FIG. 24, light impinging on the holographic pattern forms an annular light spot having a width, similarly to the shape of the diffracted light beam shown in FIG. 30(a).

Figure 31:
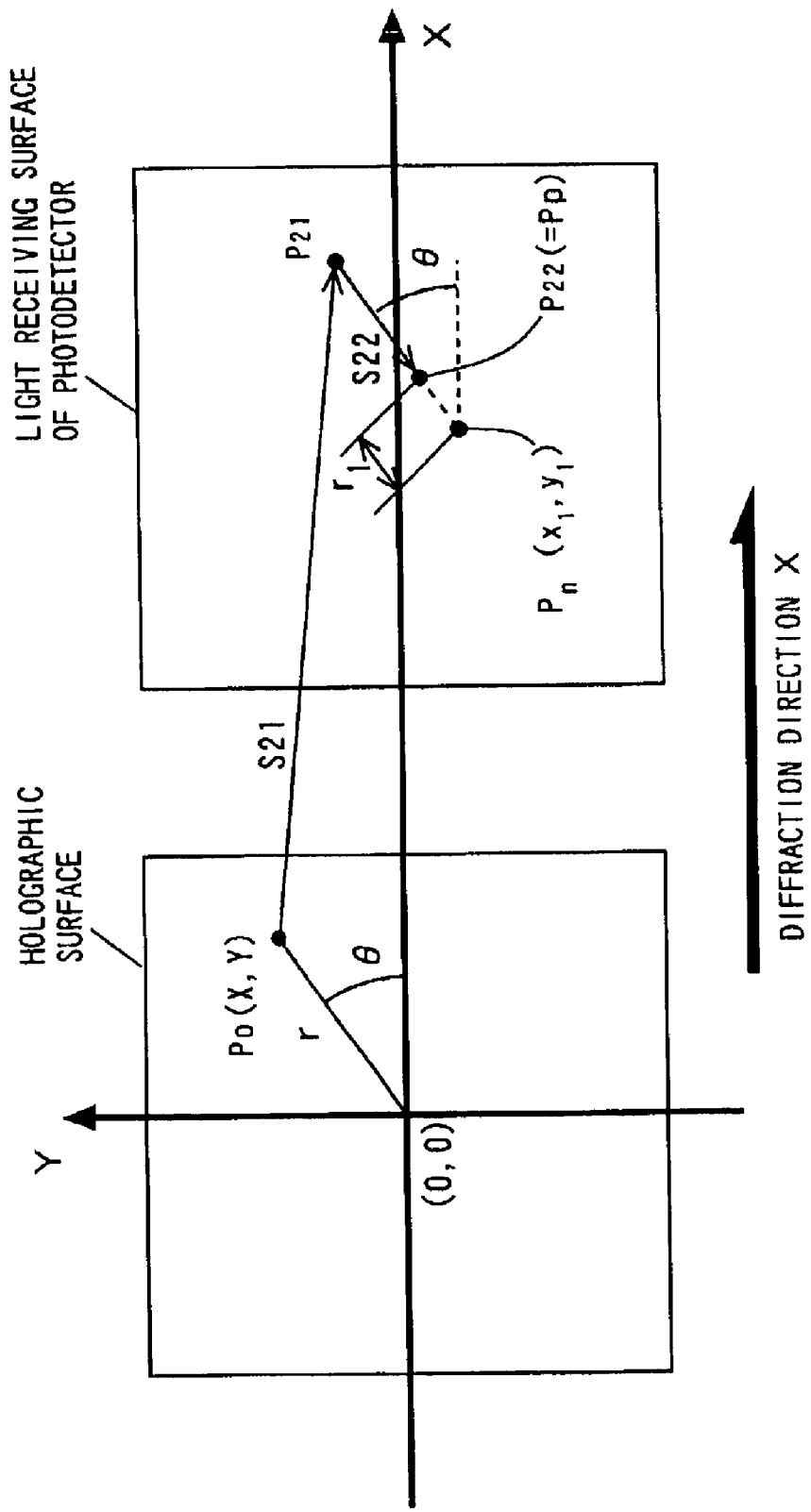
FIG. 31 is a plan view showing the position of a light ray impinging on a holographic surface and the position of a light ray, on a light receiving surface of a photodetector, which has been diffracted by a holographic pattern in a case where the holographic surface is defined as an XY plane.
Figure 32:
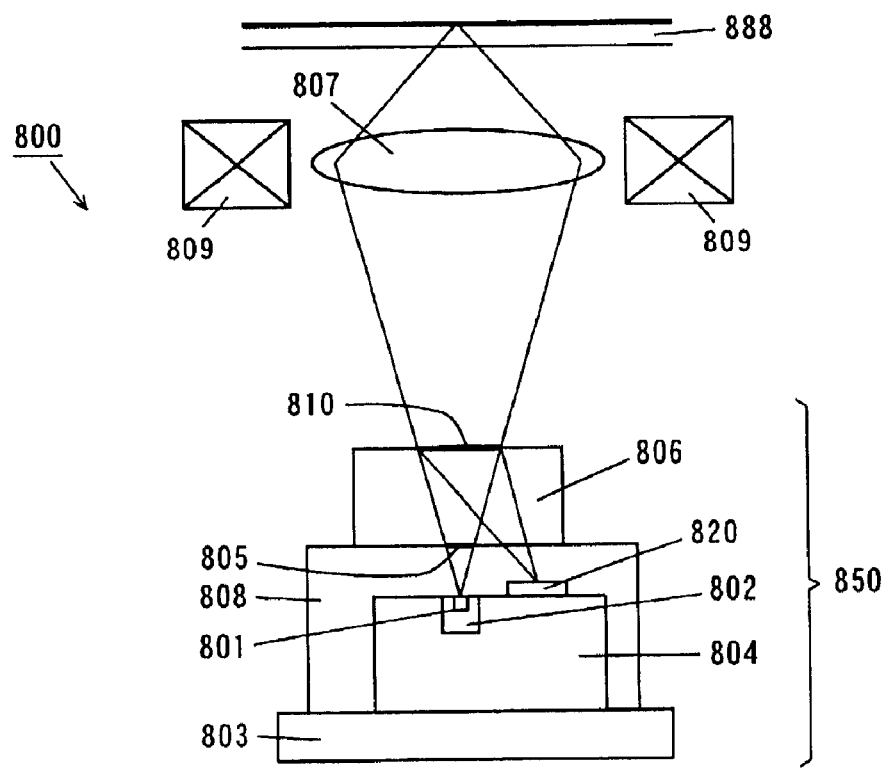
FIG. 32 is a schematic view of an optical pickup apparatus having a transmission-type holographic optical element disclosed in JP03-760355, A.
Figure 33:
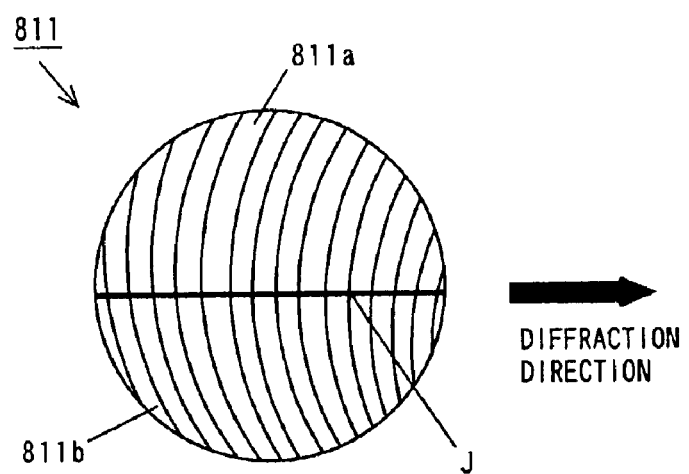
FIG. 33 is a schematic view showing an example of a holographic pattern of a holographic surface used in an optical pickup apparatus.
Figure 34:
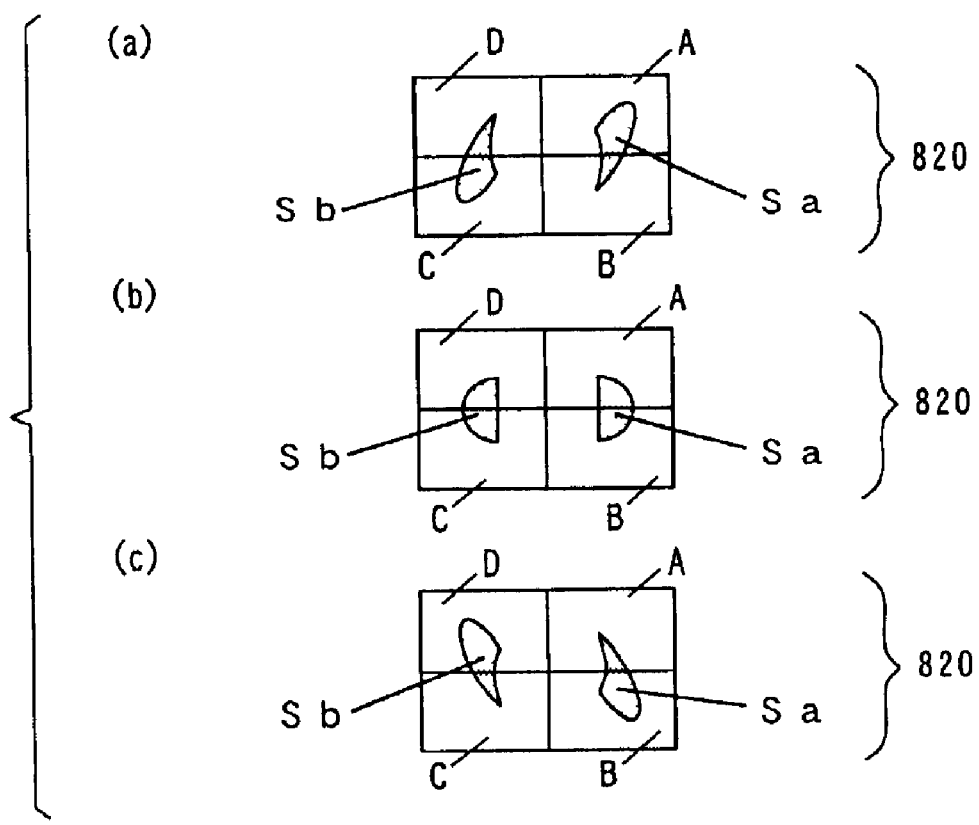
FIG. 34 is a schematic plan view showing an example of the respective shapes of light spots on four-segment photodetection parts on a photodetector in a case where the astigmatism method is applied thereto.
Figure 35:
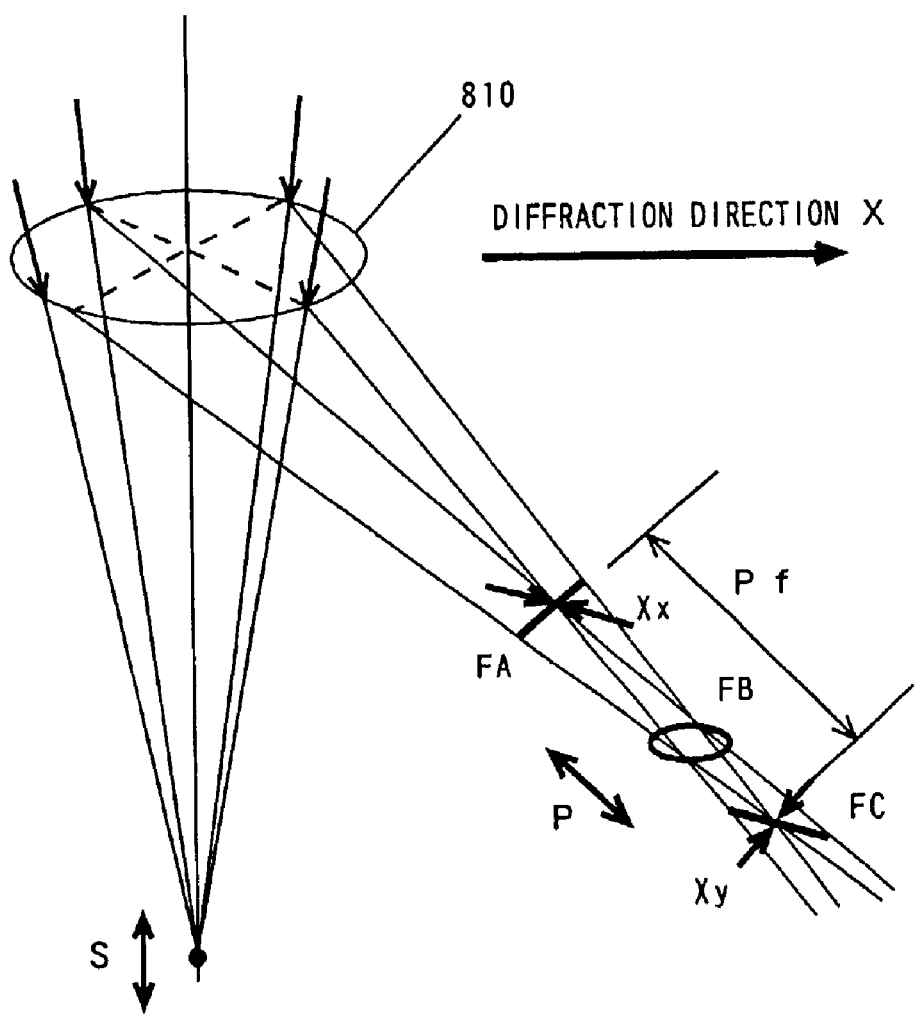
FIG. 35 is a schematic view for explaining the principle of the astigmatism method.
Figure 36:
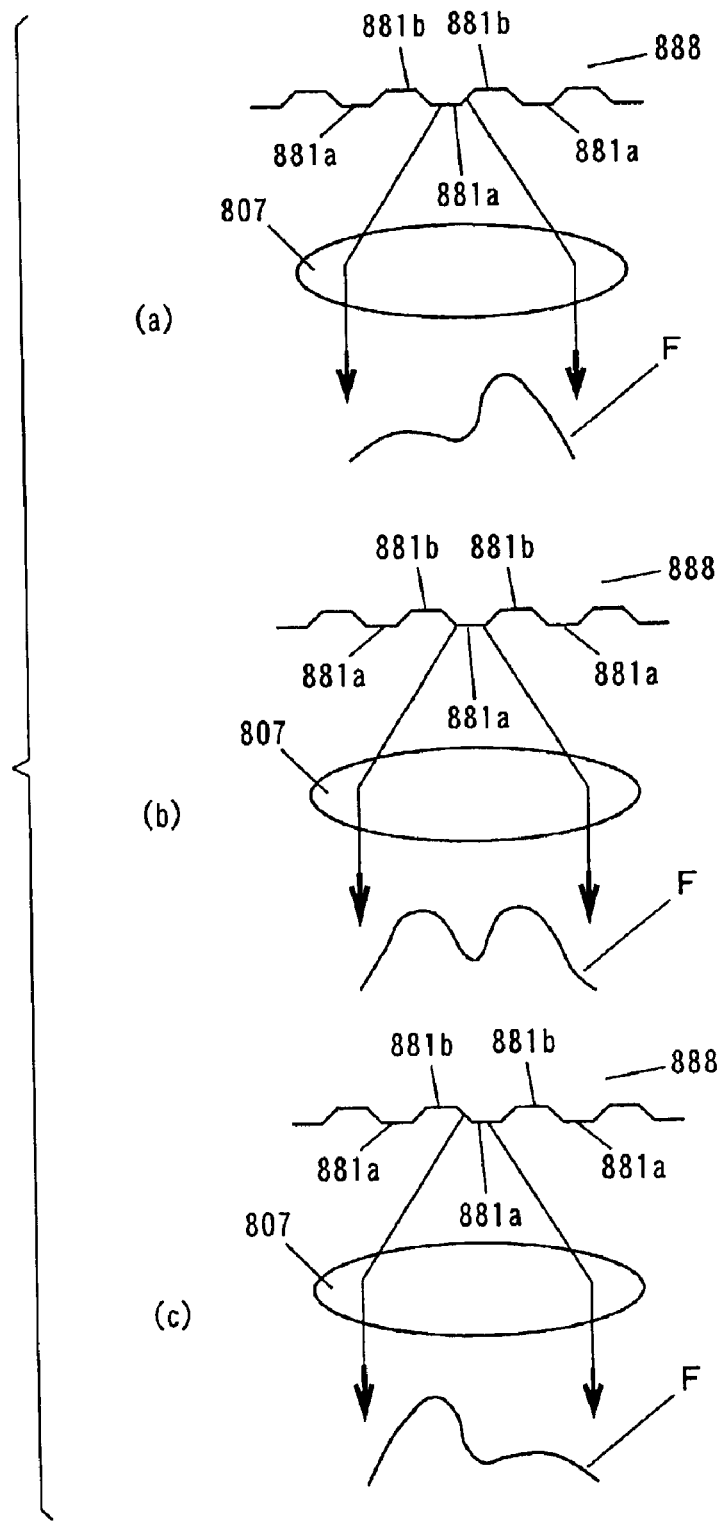
FIG. 36 is a diagram showing how the intensity distribution of a reflected light beam changes on a recording medium surface.
Figure 37:
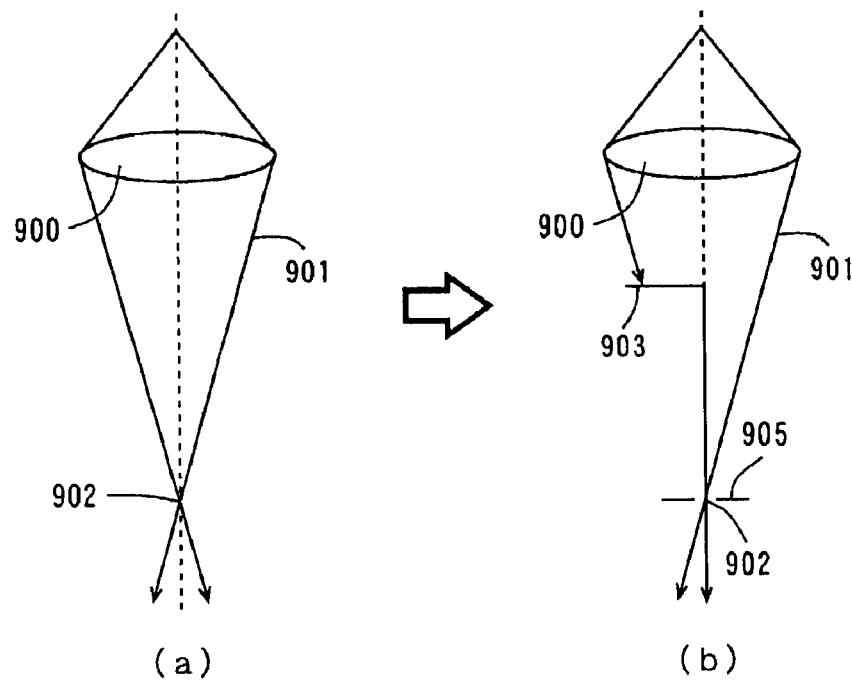
FIG. 37 is a schematic view for explaining the principle of the knife edge method.
Figure 38:
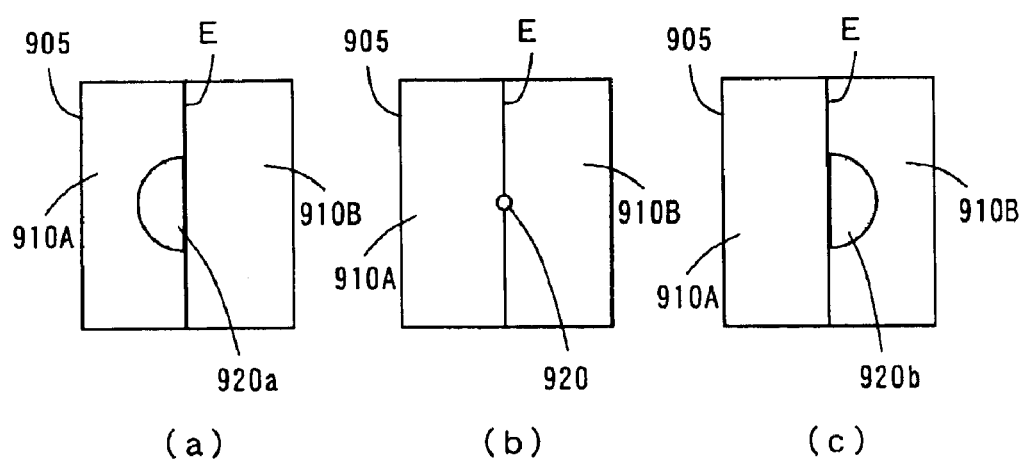
FIG. 38 is a schematic view showing respective changes in the shapes of light spots condensed on two-segment photodetection parts by the knife edge method.

FIG. 31 is a plan view showing the position of a light ray impinging on a holographic surface in a case where the holographic surface is defined as an XY plane and the position of a light ray, on a light receiving surface of a photodetector, which has been diffracted by the holographic pattern. In FIG. 31, displacement in the Z-axis direction will be ignored.

Herein, the object is to calculate a point Pp (Xp(X, Y), Yp(X, Y)), on the light receiving surface of the photodetector, which corresponds to an arbitrary point $P_0$ (X, Y) on the holographic surface.

First, consider which point on the light receiving surface of the photodetector corresponds to the arbitrary point $P_0$ (X, Y) on the holographic surface. Herein, the point $P_0$ is translated by $x_1$ in the X-axis direction and $y_1$ in the Y-axis direction to a position on the light receiving surface (step S21). $(X+x_1, Y+y_1)$ determined in the step S21 is taken as a point $P_{21}$. Coordinates denoted by $(x_1, y_1)$ are taken as a point $P_n$.

The point $P_{21}$ is then moved to a position spaced a distance $r_1$ apart from the point $P_n$ in order to converge a light beam in an annular shape having a radius $r_1$ on a straight line connecting the point $P_{21}$ and the point $P_n$ (step S22). When a point after the movement in the step S22 is taken as a point $P_{22}$, the coordinates of the point $P_{22}$ are represented by ($r_1 \cos(\theta)+x_1$, $r_1 \sin(\theta)+y_1$).

Herein, $\theta$ denotes an angle formed between a straight line connecting the point $P_0$ and the origin and the X-axis direction which is the diffraction direction.

From the foregoing, the XY-coordinates of the point $P_0$ (Xp(X, Y), Yp(X, Y)), on the light receiving surface of the photodetector, which corresponds to the point $P_0$ (X, Y) are respectively derived by the following equations (25) and (26):

$$Xp(X,Y)=r_1 \cos \theta+x_1 \qquad (25)$$

$$Yp(X,Y)=r_1 \sin \theta+y_1 \qquad (26)$$

The X-direction component f (X, Y) and the Y-direction component g (X, Y) of the grating vector K are respectively derived by the equations (16) and (17) on the basis of the results found by the foregoing equations (25) and (26). Further, a holographic pattern having the function of converging a light beam in an annular shape is obtained by using the equation (19) or (20) on the basis of the results.

Although in each of the above-mentioned embodiments, a rugged pattern is illustrated as the grating shape of the holographic pattern, the sectional shape of the holographic pattern need not be the rectangular shape. For example, it may be a grating shape having a wave shape, a mountain shape, or the like. Further, it may be a transmission intensity modulation type black-and-white pattern.

Although in the above-mentioned first to sixth embodiments, the transmission-type holographic optical element 4 is used, a reflection-type holographic optical element may be used depending on the object.

Although the holographic optical element 4 has two holographic patterns by one dividing line, the holographic pattern may be further divided if required as the shape of light impinging on the photodetection part. Further, the number of segments of the photodetection part may be also increased as required in the photodetector.

Although in the above-mentioned first to sixth embodiments, an example in which the spot diameter is made larger than that in a case using the astigmatism method in order to stabilize a focus error signal is illustrated, it goes without saying that the spot diameter may be made smaller than that in the case using the astigmatism method depending on the object.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A holographic optical element comprising:

a diffraction surface that diffracts an incident light beam, said diffraction surface having in at least its part a holographic pattern having a function of twisting said diffracted light beam using an optical axis of the diffracted light beam as an axis of rotation;

wherein said diffraction surface is divided into a first region and a second region, at least one of said first and second regions having said holographic pattern;

wherein said first region has a first holographic pattern having the function of twisting said diffracted light beam in a clockwise direction using the optical axis of the diffracted light beam as an axis of rotation, and said second region has a second holographic pattern having the function of twisting said diffracted light beam in a counterclockwise direction using the optical axis of the diffracted light beam as an axis of rotation.

2. The holographic optical element according to claim 1, wherein when said diffraction surface is defined by XY-coordinates comprising the X-axis and the Y-axis which are orthogonal to each other, and letting $(X_0, Y_0)$ be a point to be a basis on said diffraction surface, $(X, Y)$ be an arbitrary point on said diffraction surface, $f(X, Y)$ be an X-direction component of a grating vector for performing predetermined diffraction at the point $(X, Y)$ on said diffraction surface, and $g(X, Y)$ be a Y-direction component of said grating vector, said holographic pattern is represented by a set of points $(X', Y')$ satisfying the following equation:

$$\int_{X_0}^{X'} f(X, Y_0) dX + \int_{Y_0}^{Y'} g(X', Y) dY = 2\pi M + C \quad (19)$$

or $$\int_{Y_0}^{Y'} g(X_0, Y) dY + \int_{X_0}^{X'} f(X, Y') dX = 2\pi M + C, \quad (20)$$

where M is an integer and C is a constant;

when a Z-axis coordinate perpendicular to said diffraction surface is defined at the origin of said XY-coordinates, and letting $(X, Y, 0)$ be an arbitrary point on said diffraction surface, $(Xp(X, Y), Yp(X, Y), Zp)$ be a point on a predetermined detection surface on which a diffracted light beam diffracted by said diffraction surface impinges, $(Xr, Yr, Zr)$ be the coordinates of a light emitting point of a light source for emitting a light beam to said diffraction surface, $\lambda$ be the wavelength of the light beam, and n be the refractive index of a substrate including said holographic pattern, the X-direction component $f(X, Y)$ and the Y-direction component $g(X, Y)$ of the grating vector for performing predetermined diffraction at the point $(X, Y, 0)$ on said diffraction surface are respectively set so as to satisfy the following equations:

$$f(X, Y) = -(2\pi/\lambda) \cdot [(X - Xp(X, Y)) \cdot \quad (16)$$
$$\{(X - Xp(X, Y))^2 + (Y - Yp(X, Y))^2 + Zp^2\}^{-1/2} -$$
$$n(X - Xr) \cdot \{(X - Xr)^2 + (Y - Yr)^2 + Zr^2\}^{-1/2}]$$

$$g(X, Y) = -(2\pi/\lambda) \cdot [(Y - Yp(X, Y)) \cdot \{(X - Xp(X, Y))^2 +$$
$$(Y - Yp(X, Y))^2 + Zp^2\}^{-1/2} -$$
$$n(Y - Yr) \cdot \{(X - Xr)^2 + (Y - Yr)^2 + Zr^2\}^{-1/2}]$$

when the ratio of the size of a light spot on said detection surface to the size of a light spot on said diffraction surface is taken as a reduction ratio R, a point $(Xp, Yp)$ on said detection surface obtained by moving the light beam impinging on the arbitrary point $(X, Y)$ on said diffraction surface by $x_1$ in the X-axis direction and moving the light beam by $y_1$ in the Y-axis direction, and rotating the light beam by an angle of $\beta$ centered at a point $(x_1, y_1)$ is set so as to satisfy the following equations:

$$Xp(X,Y) = R(X^2+Y^2)^{1/2} \cos[\arctan(Y/X)+\beta]+x_1 \quad (21)$$

$$Yp(X,Y) = R(X^2+Y^2)^{1/2} \sin[\arctan(Y/X)+\beta]+y_1 \quad (22).$$

3. A method of fabricating a holographic optical element comprising a diffraction surface having in at least its part a holographic pattern for diffracting an incident light beam, comprising:

the step of representing, when said diffraction surface is defined by XY-coordinates comprising the X-axis and the Y-axis which are orthogonal to each other, and letting $(X_0, Y_0)$ be a point to be a basis on said diffraction surface, $(X, Y)$ be an arbitrary point on said diffraction surface, $f(X, Y)$ be an X-direction component of a grating vector for performing predetermined diffraction at the point $(X, Y)$ on said diffraction surface, and $g(X, Y)$ be a Y-direction component of said grating vector, said holographic pattern by a set of points (X', Y') satisfying the following equation:

$$\int_{X_0}^{X'} f(X, Y_0)dX + \int_{Y_0}^{Y'} g(X', Y)dY = 2\pi M + C \quad (19)$$

or $$\int_{Y_0}^{Y'} g(X_0, Y)dY + \int_{X_0}^{X'} f(X, Y')dX = 2\pi M + C, \quad (20)$$

where M is an integer and C is a constant;

setting, when a Z-axis coordinate perpendicular to said diffraction surface is defined at the origin of said XY-coordinates, and letting (X, Y, 0) be an arbitrary point on said diffraction surface, (Xp(X, Y), Yp(X, Y), Zp) be a point on a predetermined detection surface on which a diffracted light beam diffracted by said diffraction surface impinges, (Xr, Yr, Zr) be the coordinates of a luminescent point of a light source for emitting a light beam to said diffraction surface, λ be the wavelength of the light beam, and n be the refractive index of a substrate including said holographic pattern, the X-direction component f(X, Y) and the Y-direction component g (X, Y) of the grating vector for performing predetermined diffraction at the point (X, Y, 0) on said diffraction surface, respectively, so as to satisfy the following equations:

$$f(X, Y) = -(2\pi/\lambda) \cdot [(X - Xp(X, Y)) \cdot \quad (16)$$
$$\{(X - Xp(X, Y))^2 + (Y - Yp(X, Y))^2 + Zp^2\}^{-1/2} -$$
$$n(X - Xr) \cdot \{(X - Xr)^2 + (Y - Yr)^2 + Zr^2\}^{-1/2}]$$

$$g(X, Y) = -(2\pi/\lambda) \cdot [(Y - Yp(X, Y)) \cdot \{(X - Xp(X, Y))^2 + \quad (17)$$
$$(Y - Yp(X, Y))^2 + Zp^2\}^{-1/2} -$$
$$n(Y - Yr) \cdot \{(X - Xr)^2 + (Y - Yr)^2 + Zr^2\}^{-1/2}];$$

and the step of forming said holographic pattern set by said equations (16), (17), (19), and (20) on said diffraction surface by a photolithographic process and an etching process.

4. The method according to claim 3, comprising the step of setting, when the ratio of the size of a light spot on said detection surface to the size of a light spot on said diffraction surface is taken as a reduction ratio R, and such diffraction that the light beam impinging on the arbitrary point (X, Y) on said diffraction surface is moved by $x_1$ in the X-axis direction and by $y_1$ in the Y-axis direction, and is rotated through an angle of β centered at a point ($x_1$, $y_1$) is performed, said holographic pattern such that a point (Xp, Yp) on said detection surface obtained by the diffraction satisfies the following equations:

$$Xp(X,Y)=R(X^2+Y^2)^{1/2} \cos[\arctan(Y/X)+\beta]+x_1 \quad (21)$$

$$Yp(X,Y)=R(X^2+Y^2)^{1/2} \sin[\arctan(Y/X)+\beta]+y_1. \quad (22)$$

5. The method according to claim 3, comprising the step of setting, when the ratio of the size of a light spot on said detection surface to the size of a light spot on said diffraction surface is taken as a reduction ratio R, and such diffraction that the light beam impinging on the arbitrary point (X, Y) on said diffraction surface is moved by $x_1$ in the X-axis direction and by $y_1$ in the Y-axis direction, is inverted with respect to a straight line parallel to the X-axis passing through the point ($x_1$, $y_1$), and is further rotated through an angle of 2α. centered at the point ($x_1$, $y_1$) is performed, said holographic pattern such that a point (Xp, Yp) on said detection surface obtained by the diffraction satisfies the following equations:

$$Xp(X,Y)=R(X \cos 2\alpha+Y \sin 2\alpha)+x_1 \quad (23)$$

$$Yp(X,Y)=R(X \sin 2\alpha-Y \cos 2\alpha)+y_1 \quad (24).$$

6. The method according to claim 3, comprising the step of setting, when the ratio of the size of a light spot on said detection surface to the size of a light spot on said diffraction surface is taken as a reduction ratio R, and an angle which a straight line connecting the arbitrary point (X, Y) and the origin on said diffraction surface makes with the X-axis is taken as θ, and such diffraction that the light beam impinging on the arbitrary point (X, Y) on said diffraction surface is moved by $x_1$ in the X-axis direction and by $y_1$ in the Y-axis direction, and is moved, on a straight line connecting a point (X+$x_1$, Y+$y_1$) and the point ($x_1$, $y_1$), to a position spaced $r_1$ apart from the point ($x_1$, $y_1$) is performed, said holographic pattern such that a point (Xp, Yp) on said detection surface obtained by the diffraction satisfies the following equations:

$$Xp(X,Y)=r_1 \cos \theta+x_1 \quad (25)$$

$$Yp(X,Y)=r_1 \sin \theta+y_1 \quad (26).$$

7. A holographic optical element comprising:

a diffraction surface that diffracts an incident light beam, said diffraction surface having in at least its part a holographic pattern having a function of twisting said diffracted light beam using an optical axis of the diffracted light beam as an axis of rotation;

wherein when said diffraction surface is defined by XY-coordinates comprising the X-axis and the Y-axis which are orthogonal to each other, and letting ($X_0$, $Y_0$) be a point to be a basis on said diffraction surface, (X, Y) be an arbitrary point on said diffraction surface, f(X, Y) be an X-direction component of a grating vector for performing predetermined diffraction at the point (X, Y) on said diffraction surface, and g (X, Y) be a Y-direction component of said grating vector, said holographic pattern is represented by a set of points (X', Y') satisfying the following equation:

$$\int_{X_0}^{X'} f(X, Y_0)dX + \int_{Y_0}^{Y'} g(X', Y)dY = 2\pi M + C \quad (19)$$

or $$\int_{Y_0}^{Y'} g(X_0, Y)dY + \int_{X_0}^{X'} f(X, Y')dX = 2\pi M + C, \quad (20)$$

where M is an integer and C is a constant;

when a Z-axis coordinate perpendicular to said diffraction surface is defined at the origin of said XY-coordinates, and letting (X, Y, 0) be an arbitrary point on said diffraction surface, (Xp(X, Y), Yp(X, Y), Zp) be a point on a predetermined detection surface on which a diffracted light beam diffracted by said diffraction surface impinges, (Xr, Yr, Zr) be the coordinates of a light emitting point of a light source for emitting a light beam to said diffraction surface, λ be the wavelength of the light beam, and n be the refractive index of a substrate including said holographic pattern, the X-direction component f (X, Y) and the Y-direction component g (X, Y) of the grating vector for performing predetermined diffraction at the point (X, Y, 0) on said diffraction surface are respectively set so as to satisfy the following equations:

$$f(X, Y) = -(2\pi/\lambda) \cdot \big[(X - Xp(X, Y)) \cdot \{(X - Xp(X, Y))^2 + (Y - Yp(X, Y))^2 + Zp^2\}^{-1/2} - n(X - Xr) \cdot \{(X - Xr)^2 + (Y - Yr)^2 + Zr^2\}^{-1/2}\big] \quad (16)$$

$$g(X, Y) = -(2\pi/\lambda) \cdot \big[(Y - Yp(X, Y)) \cdot \{(X - Xp(X, Y))^2 + (Y - Yp(X, Y))^2 + Zp^2\}^{-1/2} - n(Y - Yr) \cdot \{(X - Xr)^2 + (Y - Yr)^2 + Zr^2\}^{-1/2}\big]$$

when the ratio of the size of a light spot on said detection surface to the size of a light spot on said diffraction surface is taken as a reduction ratio R, a point (Xp, Yp) on said detection surface obtained by moving the light beam impinging on the arbitrary point (X, Y) on said diffraction surface by $x_1$ in the X-axis direction and moving the light beam by $y_1$ in the Y-axis direction, and rotating the light beam by an angle of β centered at a point $(x_1, y_1)$ is set so as to satisfy the following equations:

$$Xp(X,Y) = R(X^2+Y^2)^{1/2} \cos[\arctan(Y/X)+\beta] + x_1 \quad (21)$$

$$Yp(X,Y) = R(X^2+Y^2)^{1/2} \sin[\arctan(Y/X)+\beta] + y_1 \quad (22).$$

* * * * *